(12) United States Patent
Aspuru-Guzik et al.

(10) Patent No.: US 12,511,571 B2
(45) Date of Patent: Dec. 30, 2025

(54) METHOD AND SYSTEM FOR EFFICIENT QUANTUM OPTICAL DESIGN USING NON-LINEAR MAPPINGS

(71) Applicant: THE GOVERNING COUNCIL OF THE UNIVERSITY OF TORONTO, Toronto (CA)

(72) Inventors: Alan Aspuru-Guzik, Toronto (CA); Mario Krenn, Toronto (CA); Jakob Kottmann, Toronto (CA)

( * ) Notice: Subject to any disclaimer, the term of this patent is extended or adjusted under 35 U.S.C. 154(b) by 746 days.

(21) Appl. No.: 17/787,709

(22) PCT Filed: Dec. 22, 2020

(86) PCT No.: PCT/CA2020/051785
§ 371 (c)(1),
(2) Date: Jun. 21, 2022

(87) PCT Pub. No.: WO2021/127779
PCT Pub. Date: Jul. 1, 2021

(65) Prior Publication Data
US 2023/0040234 A1    Feb. 9, 2023

Related U.S. Application Data

(60) Provisional application No. 62/952,356, filed on Dec. 22, 2019.

(51) Int. Cl.
*G06N 10/60* (2022.01)
*G06N 10/70* (2022.01)

(52) U.S. Cl.
CPC ............ *G06N 10/60* (2022.01); *G06N 10/70* (2022.01)

(58) Field of Classification Search
USPC ........................................................ 716/104
See application file for complete search history.

(56) References Cited

U.S. PATENT DOCUMENTS

| | | |
|---|---|---|
| 2019/0095561 A1 | 3/2019 | Pednault et al. |
| 2020/0185120 A1* | 6/2020 | Keesling Contreras ..... G21K 1/093 |

FOREIGN PATENT DOCUMENTS

| | | |
|---|---|---|
| WO | WO 2006/066415 A1 | 6/2006 |
| WO | WO 2016/044917 A1 | 3/2016 |
| WO | WO 2019/014589 A1 | 1/2019 |

OTHER PUBLICATIONS

M. Krenn, X. Gu, and A. Zeilinger, Quantum Experiments and Graphs: Multiparty States as Coherent Superpositions of Perfect Matchings. Physical Review Letters, 2017, 119 (24), p. 240403-1-240403-6.

(Continued)

*Primary Examiner* — Bryce M Aisaka
(74) *Attorney, Agent, or Firm* — HEER LAW; Christopher D. Heer

(57) ABSTRACT

The present invention relates generally to the design of quantum optical configurations and more specifically to using graph theory mapping and fidelity optimization to design optimal quantum optical configurations that have maximal fidelity between the designed optimal quantum optical configuration and the target quantum state. The target quantum state may include resource-efficient heralded multi-photonic quantum states, heralded high-dimensional entanglement, resource states for quantum gates, and high-dimensional multi-photonic GHZ states without ancilla photons.

20 Claims, 88 Drawing Sheets

(56) References Cited

OTHER PUBLICATIONS

X. Gu, M. Erhard, A. Zeilinger, and M. Krenn, Quantum experiments and graphs II: Quantum interference, computation, and state generation. PNAS, Mar. 5, 2017, 116:10, 4147-4155.

International Searching Authority, PCT Written Opinion of the International Searching Authority for PCT/CA2020/051785, Mar. 23, 2021, p. 1-4.

* cited by examiner $$f_0(\omega) = \langle 00\ldots 0|\Phi(\omega)\rangle$$
$$f_1(\omega) = \langle 00\ldots 1|\Phi(\omega)\rangle$$
$$\vdots$$
$$f_n(\omega) = \langle 11\ldots 1|\Phi(\omega)\rangle$$

$$
\begin{aligned}
&\phantom{+}\ 0.0955128\ a[0]\ b[0]\\
&+ 0.0132901\ a[1]\ b[0]\\
&- 0.0687828\ a[0]\ c[0]\\
&+ 0.0657497\ a[1]\ c[0]\\
&+ 0.0607863\ a[1]\ c[1]\\
&- 0.0999297\ c[0]\ d[0]\\
&- 0.0978053\ a[0]\ e[0]\\
&- 0.0885105\ a[1]\ e[0]\\
&+ 0.0881289\ b[1]\ e[0]\\
&- 0.0244942\ c[0]\ e[0]\\
&- 0.0952693\ a[0]\ f[0]\\
&+ 0.0624649\ a[1]\ f[0]\\
&+ 0.0017612\ b[1]\ f[0]\\
&+ 0.00115425\ e[0]\ f[0]\\
&- 0.0989676\ a[0]\ g[0]\\
&- 0.0998683\ a[1]\ g[0]\\
&- 0.0937109\ b[1]\ g[0]\\
&+ 0.0668954\ c[0]\ g[0]\\
&+ 0.00387396\ e[0]\ g[0]\\
&+ 0.00106431\ f[0]\ g[0]\\
&- 0.0915521\ c[1]\ h[0]\\
&- 0.0994484\ b[0]\ i[0]\\
&+ 0.0933605\ b[1]\ i[0]\\
&- 0.00205828\ c[0]\ i[0]\\
&+ 0.0331445\ c[1]\ i[0]\\
&- 0.00214237\ d[0]\ i[0]\\
&+ 0.00337525\ e[0]\ i[0]\\
&- 0.00313698\ g[0]\ i[0]\\
&+ 0.00145905\ h[0]\ i[0]\\
&+ 0.1\ b[0]\ j[0]\\
&+ 0.0724726\ b[1]\ j[0]\\
&- 0.0490606\ c[1]\ j[0]\\
&- 0.00221472\ d[0]\ j[0]\\
&+ 0.00187116\ e[0]\ j[0]\\
&- 0.00272281\ g[0]\ j[0]
\end{aligned}
$$

$$(-|1,0\rangle + |1,1\rangle) + (|1,0\rangle + |1,1\rangle)$$
$$= |1,1\rangle_{b,c}$$

METHOD AND SYSTEM FOR EFFICIENT QUANTUM OPTICAL DESIGN USING NON-LINEAR MAPPINGS

STATEMENT REGARDING FEDERALLY SPONSORED RESEARCH OR DEVELOPMENT

This invention was made with government support under Prime Contract No. DE-AC02-05CH11231 (Subcontract No. 7427174) awarded by the Department of Energy. The government has certain rights in the invention.

FIELD OF THE INVENTION

The present specification relates generally to a tool to aid in the design of quantum optical equipment such as but not limited to quantum processors, quantum memory and quantum communications equipment and more specifically to a system and method of using graph theory mapping and design optimization to determine optimal quantum optical configurations.

BACKGROUND OF THE INVENTION

Entanglement was first coined by Erwin Schrödinger to describe non-classically correlated quantum systems. Entangled quantum systems have overthrown the classical (local-realistic) world view, first contemplated by the thought experiments of Albert Einstein, Boris Podolsky, and Nathan Rosen and later understood by John Bell as an observable consequence of laboratory experiments. These ruminations were observed in the early 1970s by Stuart Freedman and John Clauser and now form the foundation of quantum information science.

More complex quantum systems, which involve more than two parties that are entangled in more than two levels, have led to phenomena that increasingly deviate from the classical world view. In addition to generating academic interest, complex entangled systems have become the basis of modern quantum technology. For example, multi-partite quantum entanglement has become the foundation for quantum computation and quantum simulation. Additionally, entangled photon pairs are used for secure communications, even across great distances and between different continents.

Consequently, laboratory experimentation has become inevitable in furthering the scientific community's understanding of the fundamental consequences of quantum entanglement and its practical relevance to emerging technology. However, due to the complexity of these entangled states, the design of novel experiments is becoming ever more difficult for human scientists to devise alone. For that reason, computational methods have been introduced to assist and facilitate the design of quantum experiments.

In the field of quantum optics, automated design algorithms started to emerge in 2016. Several solutions involving these programs have been implemented in multiyear laboratory efforts and allow novel properties of nature to be observed. Furthermore, several machine-learning methods have attempted to extend the scientific community's capacity to design quantum optical experiments in recent years. These include online learning approaches, genetic algorithms, deep recurrent neural networks, and hybrid machine learning approaches. Unfortunately, because of the complexity and size of both the Hilbert space and potential experimental configurations, many open questions in quantum optics are not solved by these approaches.

Innovative quantum communication protocols are of significant interest in developing new technologies because they permit guaranteed detection of eavesdroppers in a communication channel. Photons have several advantages when used in communication protocols since it is possible to exchange them over large distances and they can carry more information than regular qubits. However, in order to fully capitalize on the potential of photons in long distance quantum communication, one must be able to create the corresponding entangled initial states and implement necessary operations with optical setups.

Similar interest has arisen with respect to photonic quantum computing. Matter-based quantum computers, like ion traps or machines based on superconducting qubits, usually encode information into qubits then perform a sequence of operations on those qubits before the final result is read out. Typically, those protocols start with an easy to prepare non-entangled state which is transformed into an entangled state during the computation. As a final step, the individual qubits are read out, leading to the collapse of the entangled many-qubit wavefunction into a specific non-entangled state, which is the final result of the computation.

Current matter-based qubits are often noisy since they interact with their surroundings and a vast amount of current experimental research and funding is directed to isolating the qubits from their environment. Protocols for fault-tolerant quantum computation exist but usually require a logical qubit to be represented by multiple physical qubits which with current quantum error correction codes estimates are in the order of thousands.

One of the primary advantages of photonic systems is their resistance to stochastic noise introduced by their environment. On the other hand, and for the same reasons, it remains a challenging task to introduce controlled interactions between different photons. Designing such optical setups is challenging since they do not directly introduce interactions between two photons but entangle them with additional ancillary photons which are measured thereafter. The outcome of the measurement on the ancillary photons then provides information about which effective operation was performed on the remaining photons.

The idea of forming entanglement subsequently measuring subsystems to introduce a specific operation on the remaining system gives rise to another way of doing quantum computation, known as measurement-based quantum computation. Measurement-based quantum computation is an alternative approach which starts with a highly entangled state, often referred to as the cluster state, and the computation is performed by measuring specific qubits in the entangled many-qubit wavefunction.

As such, photonic systems are a promising technology for measurement-based quantum computation due to the simplicity of measuring individual photonic paths in the setup without introducing noise to the rest of the setup. However, one of the remaining challenges is creating highly entangled initial states.

Accordingly, there remains a need for improvements in the art.

SUMMARY OF THE INVENTION

According to an embodiment of the present invention, there is a system and method for determining quantum optical configurations using graph theory. Quantum optical configurations or experiments are mapped or transformed into the language of graph theory. Experiments with probabilistic photon sources and linear optics are mapped to graphs, and post-selected quantum states are calculated by matching graphs.

According to an embodiment of the present invention, a weighted graph is constructed where each edge represents a photon pair source with the weight describing the pump amplitude, and each vertex represents a photon path. The quantum state emerging from the configuration can then be approximated as a sum of products of weights emerging from the edges in the graph.

According to an embodiment of the present invention, there is provided a method for designing quantum optical configurations or experiments. The method starts with the most general graph that can be created by a quantum optical experiment with n output paths and d dimensional quantum systems. For each possible term in a quantum state $\Psi(\omega)$, a corresponding non-linear combination of weights ($\omega$) is determined. Therewith, the overlap with a target state in terms of weights of the graph is determined. According to an embodiment, a loss function is defined that maximizes fidelity. According to further embodiment, $L_1$ regularization is used to maximize the number of edges that vanish from the optimized graph to simplify the resulting experimental setup.

According to an embodiment of the present invention, the present invention may produce optimal design configurations for target states that include resource-efficient heralded multi-photonic quantum states (which are necessary for quantum computation and active multiplexing), heralded high-dimensional entanglement (which are important for quantum communication tasks), resource states for quantum gates, and high-dimensional multi-photonic Greenberger-Horne-Zeilinger (GHZ) states without ancilla photons.

According to an embodiment of the present invention, there is provided a method of optimizing a quantum optical configuration, the method comprising: providing an initial quantum optical configuration for creating a quantum state; mapping the initial quantum optical configuration to a weighted graph having a set of independent weights; determining a fidelity between a target quantum state and the quantum state of the initial quantum optical configuration using the set of independent weights; determining an optimized set of independent weights to minimize loss of fidelity; and mapping the optimized set of independent weights to a path identified quantum optical configuration having a quantum state that has maximal fidelity with the target quantum state.

According to a further embodiment of the present invention, there is provided a system for optimizing a quantum optical configuration, the system comprising: a light-emitting device having an initial quantum optical configuration for creating a quantum state; a computing device comprising a processor and a non-transitory computer-readable memory with instructions thereon which when executed carry out the steps of: receiving the initial quantum optical configuration for creating the quantum state; mapping the initial quantum optical configuration to a weighted graph having a set of independent weights; determining a fidelity between a target quantum state and the quantum state of the initial quantum optical configuration using the set of independent weights; determining an optimized set of independent weights to minimize loss of fidelity; and mapping the optimized set of independent weights to a path identified quantum optical configuration having a quantum state that has maximal fidelity with the target quantum state; wherein the light-emitting device may be reconfigured to use the path identified quantum optical configuration to create a quantum state with maximal fidelity with the target quantum state.

According to an embodiment of the present invention, there is provided a method of representing a quantum state, comprising: representing the quantum state as a graph having one or more edges connecting two or more vertices, wherein the representing comprises optimizing the weights to of the one or more edges, wherein the optimizing comprises: minimizing a loss function, wherein the loss function is $L(\omega)=(1-F(\omega))+\alpha\cdot|\omega|_1$, wherein positive real coefficient $\alpha<1$, wherein $F(\omega)$ is an objective function of the one or more weights $\omega$ of the graph.

According to a further embodiment of the present invention, there is provided a system for representing a quantum state, the system comprising: one or more photon sources; and a computing device comprising a processor and a non-transitory computer-readable memory with instructions thereon which when executed carry out the steps of: representing the quantum state as a graph having one or more edges connecting two or more vertices, wherein the representing comprises optimizing the weights to of the one or more edges, wherein the optimizing comprises: minimizing a loss function, wherein the loss function is $L(\omega)=(1-F(\omega))+\alpha\cdot|\omega|_1$, wherein positive real coefficient $\alpha<1$, wherein $F(w)$ is an objective function of the one or more weights $\omega$ of the graph; wherein the one or more photon sources are configured to create the graph.

Other aspects and features according to the present application will become apparent to those ordinarily skilled in the art upon review of the following description of embodiments of the invention in conjunction with the accompanying figures.

BRIEF DESCRIPTION OF THE FIGURES

The principles of the invention may better be understood with reference to the accompanying figures provided by way of illustration of an exemplary embodiment, or embodiments, incorporating principles and aspects of the present invention, and in which:

FIGS. 5(a) to 5(f) show an embodiment of a method for designing quantum optical experiments with graph theory and gradient descent;

FIGS. 6(a) to 6(d) show pump powers for embodiments of a method for generating heralded high-dimensional Bell and GHZ states;

DETAILED DESCRIPTION OF EMBODIMENTS OF THE INVENTION

Figure 1A:
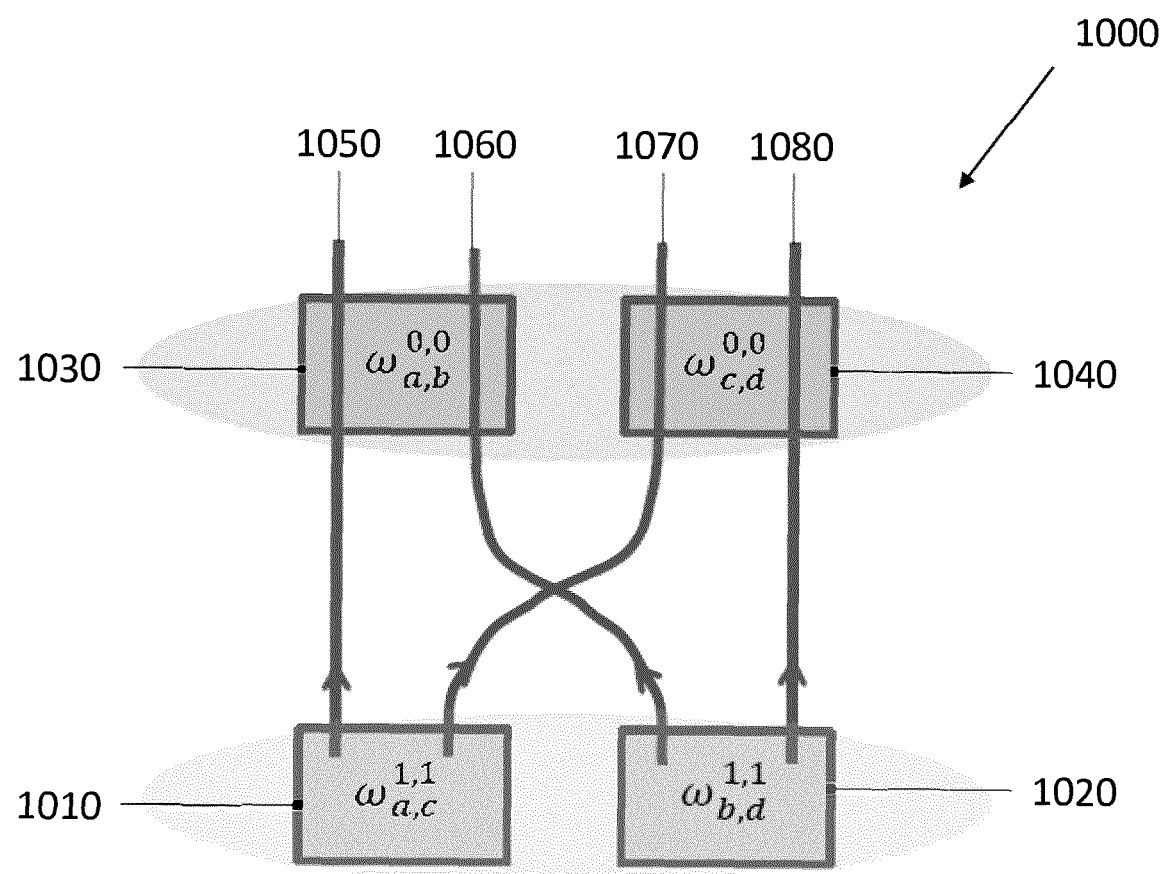
FIGS. 1(a) and 1(b) show an experimental quantum optical configuration embodiment for creating an entangled quantum state and the corresponding weighted graph.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order to more clearly to depict certain features of the invention.

This description relates to methods for designing quantum optic configurations (or experiments), such as per the designs in D1 (M. Krenn, J. Kottmann, and A. Aspuru-Guzik. Designing Quantum Optical Experiments by Means of Non-Linear Mappings), the entirety of which is hereby incorporated by reference.

This description relates to methods for designing quantum optical configurations (or experiments), such as per the designs in D2 (M. Krenn, J. S. Kottmann, N. Tischler, and A. Aspuru-Guzik. Conceptual Understanding Through Efficient Inverse-Design of Quantum Optical Experiments), the entirety of which is hereby incorporated by reference.

The present description relates to transforming experimental configurations for state generation of quantum transformations into the language of graph theory. Arbitrary quantum optical setups with probabilistic or deterministic photon sources, linear optics, and (non-)photon-number resolving detectors can be described as a weighted graph. The emerging quantum state, whether post-selected or non-post-selected, as well as general transformation properties may be calculated with features of the graph.

According to an embodiment, the present description relates to a gradient-based approach to optimizing the parameters of a weighted graph and mapping the graph back to a quantum optical experiment. According to other embodiments, other optimization methods may be used.

According to an embodiment, the present description relates to methods for determining the optimal configurations for target quantum states including resource-efficient heralded multi-photonic quantum states (which are necessary for quantum computation and active multiplexing), heralded high-dimensional entanglement (which are important for quantum communication tasks), resource states for quantum gates, and high-dimensional multi-photonic GHZ states without ancilla photons.

According to an embodiment, the present description relates to a method for determining the configurations for more efficient photonic entanglement sources, which is applicable in quantum metrology and quantum-enhanced imaging.

Artificial intelligence (AI) has the potential to advance physics. However, to date it is entirely unclear how AI can help scientists obtaining new conceptual understanding and scientific insights. So far, AI has only been able to rediscover well-known scientific concepts. Embodiments described herein present an AI algorithm in the domain of quantum optics that can solve long-lasting problems and present the solutions such that human scientists can learn new concepts and insights. First, the solutions and concepts can significantly advance quantum photonics. Second, embodiments described herein demonstrate a first path of how AI can contribute in physics at a conceptual level, and thereby significantly accelerate scientific progress. This has been demonstrated using embodiments described herein to solve long-standing questions in the field, including how to create key resources for universal photonic quantum computation.

Recent years have seen a plethora of applications of AI in various fields of physics. They are used to identify new exoplanets in astronomy, identify interesting events in high-energy particle colliders, and quantum computing devices, to name just a few. While these applications have great potential for accelerating future scientific and technological progress, it is still unknown how researchers can learn new scientific understanding with the help of AI tools. Several proposals have shown progress in re-discovering well-understood physical concepts, but it remains unclear how those techniques can be generalized to yet unsolved questions.

Embodiments described herein provide a method that can solve open questions in quantum optics design. It can present solutions in such a way that human scientists can interpret them and understand their conceptual cores, thanks to a physics-inspired interpretable representation of quantum optics and discrete optimization. In demonstrating this method, embodiments described herein show a new quantum interference concept and the first experimental blueprints for several essential quantum states. This includes the first feasible method to generate a vital resource state for photonic quantum computing, according to some embodiments. The solutions according to some embodiments provide conceptual insight that can immediately be generalized.

Embodiments described herein provide at least three key contributions: First, the newly discovered designs can readily be implemented in photonics laboratories and can advance progress in photonic quantum technology. Second, the possibility to extract new scientific concepts with the help of computer algorithms according to some embodiments will advance fundamental understanding of quantum optics. Third, embodiments described herein can provide an example of how AI can contribute to science at a conceptual level, and can be used in other fields.

Graph Theory Mapping

According to an embodiment, quantum optical experiments are transformed into the language of graph theory. According to an embodiment, experiments with probabilistic photon sources and linear optics are mapped to graphs, and post-selected quantum states are calculated by matching graphs. According to an embodiment, quantum states may also be calculated without post-selection. According to an embodiment, arbitrary quantum states can be calculated using a new Graph-Φ function. According to a further embodiment, such a method permits the application of deterministic photon sources, which allows for arbitrary optical elements accessible in quantum optical laboratories.

According to an embodiment, non-linear photon-pair sources are pumped coherently with complex weights (ω) and the output paths of the pair sources overlapped. In a corresponding weighted graph, each edge represents a photon pair source with the weight describing the pump amplitude, and each vertex represents a photon path. The quantum state emerging from the embodiment's configuration can be approximated as a sum of products of weights emerging from the edges in the graph. Such an approximation is termed the Graph-Φ function Φ(ω), which directly corresponds to the weak pump approximation of spontaneous parametric down-conversion (SPDC). According to an embodiment, if one restricts the state being of second-order SPDC and conditioning the result to events where all four detectors have one click, the GHZ state is recovered if all weights (ω) are equal.

Figure 1B:
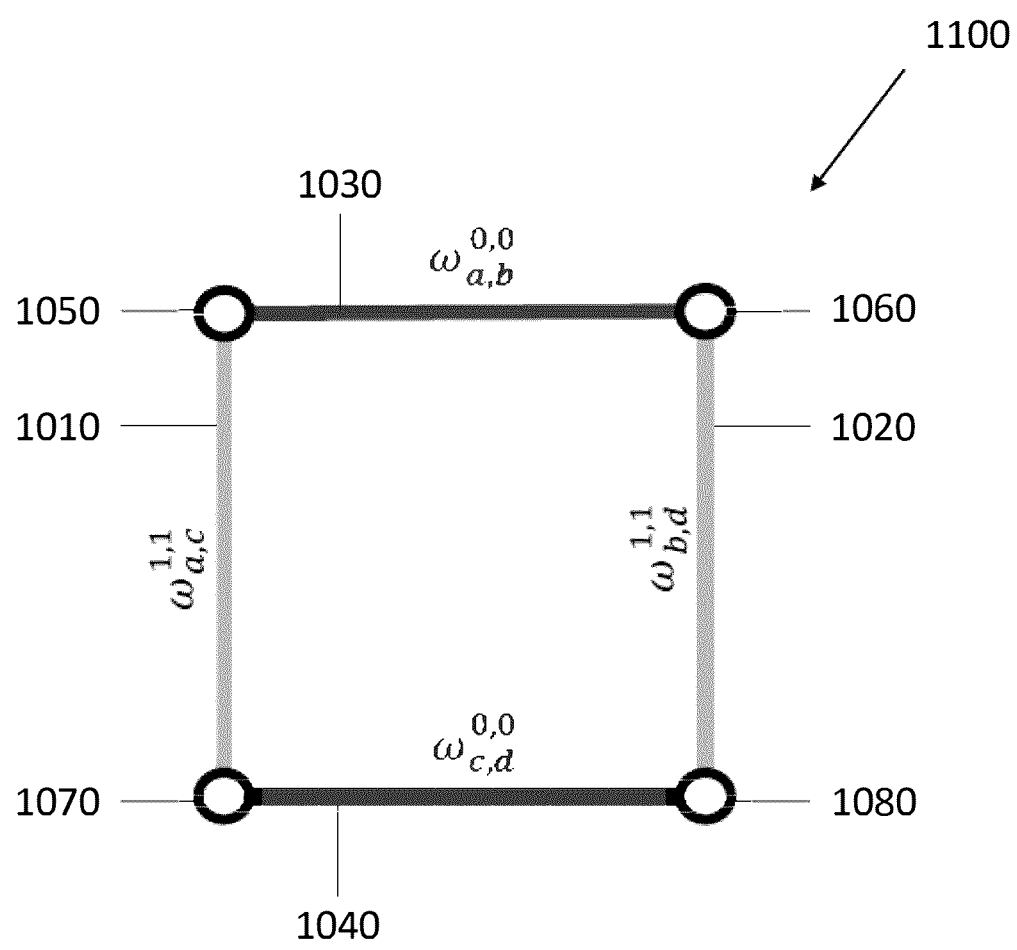

According to a further embodiment as shown in FIGS. 1(a) and (b), there is provided an experimental quantum optical configuration 1000 for creating a 2-dimensional 4-particle entangled quantum state and a corresponding weighted graph 1100. Per the embodiment shown in FIG. 1(a), a laser (not depicted) pumps four nonlinear crystals 1010, 1020, 1030, 1040 coherently with different complex weights $\omega^{i,j}_{p1,p2}$ (with $|\omega|<1$). According to an embodiment, each crystal can create a photon pair in the output path $p_1$ and $p_2$ with mode numbers i and j, respectively. Per the corresponding graph in FIG. 1(b), every vertex 1050, 1060, 1070, 1080 represents a photon's path and every edge represents a correlated photon pair produced by a nonlinear crystal. The shading of the edge represents the mode number of the photon pair. According to the embodiment in FIG. 1(b), dark and light edges correspond to states with $|00\rangle$ and $|11\rangle$, respectively. Per function (1), the quantum state Φ(ω) corresponds to the sum of all power (n) of all weights (ω) in the graph.

$$\Phi(\omega) \approx \sum_{n=0} (\omega^{0,0}_{a,b} a^\dagger_0 b^\dagger_0 + \omega^{0,0}_{c,d} c^\dagger_0 d^\dagger_0 + \omega^{1,1}_{a,c} a^\dagger_1 d^\dagger_1 + \omega^{1,1}_{a,c} b^\dagger_1 c^\dagger_1)^n \xrightarrow{n=2\&FF} \quad (1)$$

$$(\omega^{0,0}_{a,b} \cdot \omega^{0,0}_{c,d} |0,0,0,0\rangle + \omega^{1,1}_{a,c} \cdot \omega^{1,1}_{b,d} |1,1,1,1\rangle)$$

According to a further embodiment, the quantum state of second order, conditioned on one photon in each of the four paths, has exactly two terms. If all weights are equal such that $\omega=2^{-1/4}$, it corresponds to a 4-photonic 2-dimensional GHZ state $\Psi(\omega)=\frac{1}{2}(|0,0,0,0\rangle+|1,1,1,1\rangle)$.

Simple Setup Embodiments

According to an embodiment, the optimization of a general quantum optical setup can create a 2-dimensional four particle GHZ state. The two dimensions are the local dimensions of each photon, meaning that each photon can be in a superposition of two basic states denoted by $|0\rangle$ and $|1\rangle$. Higher dimensional degrees of freedom are possible for photons, which is one of the key advantages photons offer in comparison to other physical systems. According to an embodiment, the photons have the same degrees of freedom as any other qubit realization. According to an embodiment, a simple system can be illustrated by choosing a 2-dimensional realization.

Figure 2A:
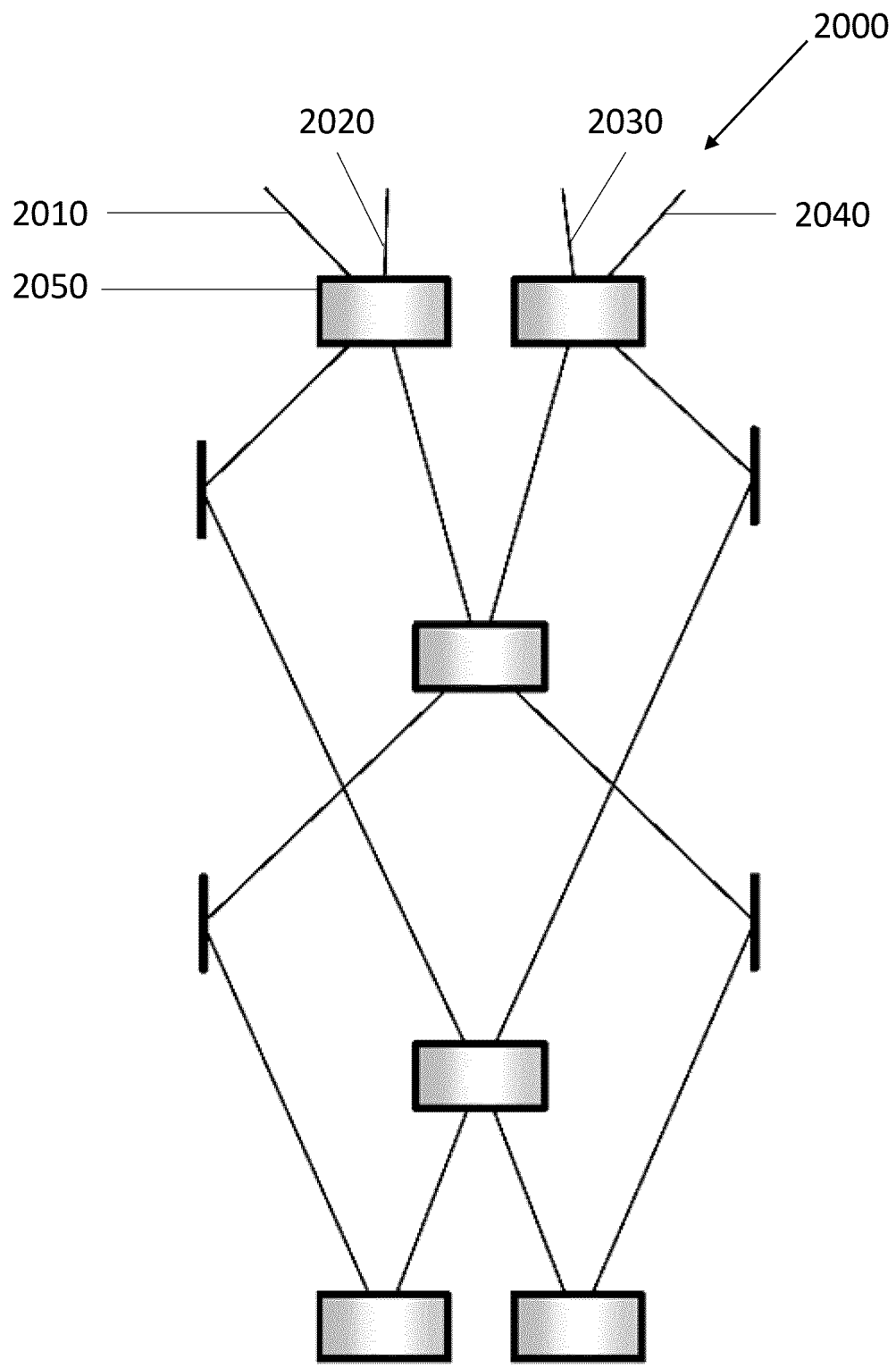
FIGS. 2(a) and 2(b) show a four-photon setup embodiment with abstract parameterized crystals using a simplified notation and the corresponding weighted graph.
Figure 2B:
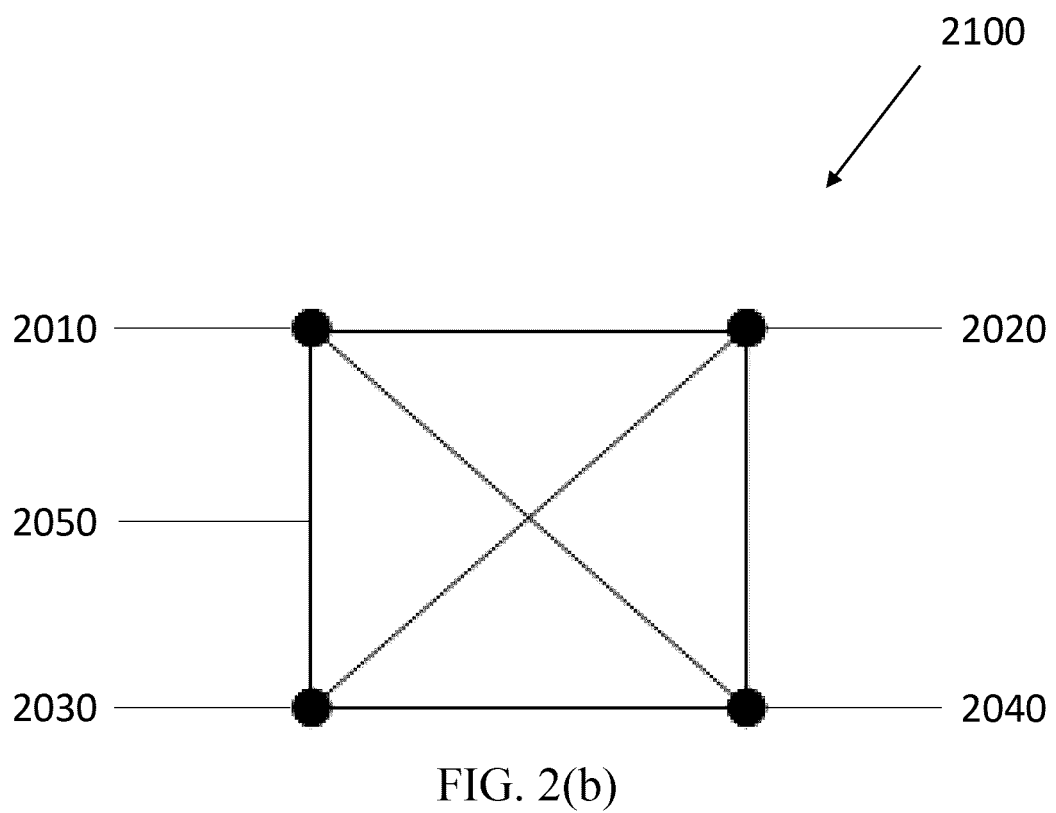

According to an embodiment as shown in FIG. 2(a), a general four-photon 2010, 2020, 2030, 2040 setup 2000 is represented with abstract parameterized crystals 2050, which provide enough information to build such setups. The embodiment in FIG. 2(a) uses a simplified notation where each edge corresponds to all four possibilities of shading and vice versa the abstract crystal corresponds to four different crystals. The embodiment in FIG. 2(a) can be represented by the graph shown in FIG. 2(b) 2100 with four vertices and several edges, where every vertex represents a photon detector or photonic path 2010, 2020, 2030, 2040 and every edge represents an abstract crystal 2050.

Figure 3A:
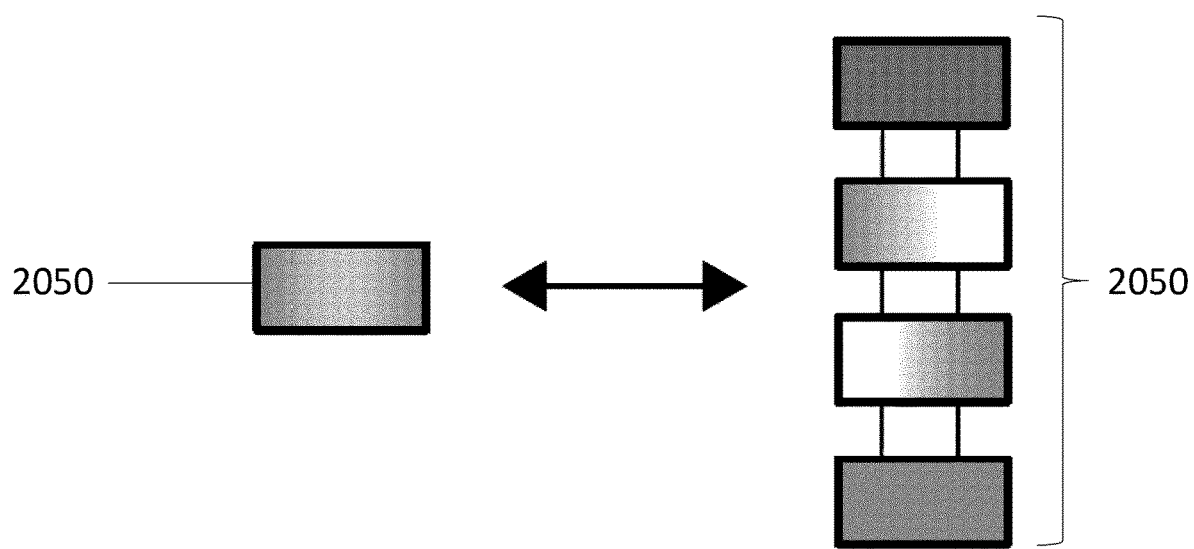
FIGS. 3(a) and 3(b) show how simplified notation for abstract crystals and non-optimized edges.
Figure 3B:
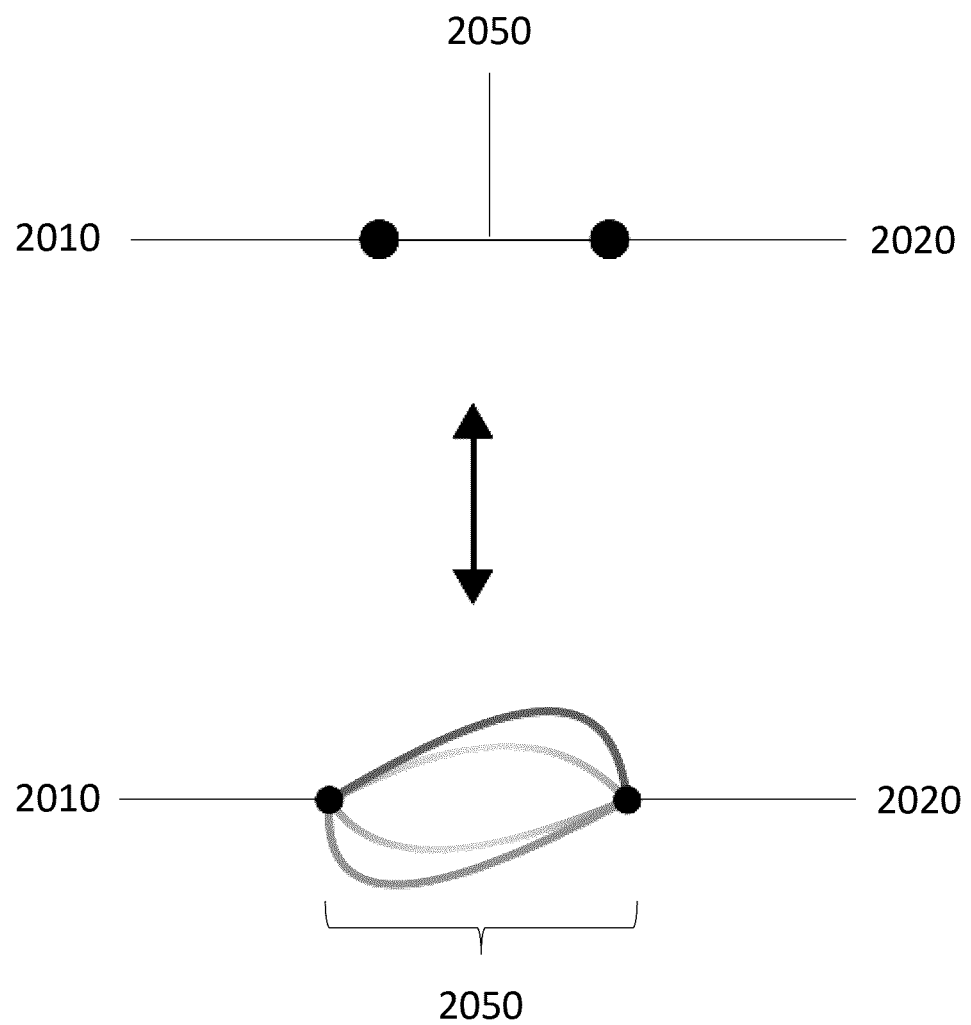

Note that non-optimized graphs and setups are denoted in a simplified way. Since the non-optimized graph is fully connected with all possible shading or colouration of the edges, all possible edges between two vertices are represented with just one black edge, as well as the corresponding crystals. According to the embodiment shown in FIGS. 2(a) and 2(b), such a simplified notation means every crystal corresponds to four abstract crystals and every edge therein is actually four edges per FIGS. 3(a) and 3(b), respectively.

According to an embodiment, we can deduce how the outgoing quantum state of a generalized setup can be described from the corresponding graph. Formally, this can be written as a product of unitary operations which act on the vacuum state as defined in function (2).

$$|\Psi(\omega)\rangle = \Pi U(\omega)|vac\rangle \quad (2)$$

Where each unitary operation (U) corresponds to one edge of the graph. The operations are parameterized and the parameters are denoted as w. Those parameters are weights which are assigned to every edge in the graph and which are unknown beforehand. According to a further embodiment, a simple setup can be optimized to produce the GHZ state as defined in function (3).

$$|GHZ\rangle = 1/\sqrt{2}(|0000\rangle + |1111\rangle). \quad (3)$$

According to an embodiment, the weights of a graph are optimized by optimizing the fidelity of the setup with respect to the targeted state. According to a further embodiment, the targeted state can be the GHZ state. The fidelity (F) describes the probability to measure the targeted state when the setup is executed and it is given by the absolute square of the overlap between the state the parameterized embodiment setup produces and the targeted state per function (4).

$$F=|\langle\Psi(\omega)|GHZ\rangle|^2. \quad (4)$$

Note that the function which is actually optimized is defined in function (5).

$$L=(1-F)+\|\omega\|_1 \quad (5)$$

Where the first term reformulates the maximization of the fidelity into a minimization problem and the second term favours solutions with less parameters.

Figure 4A:
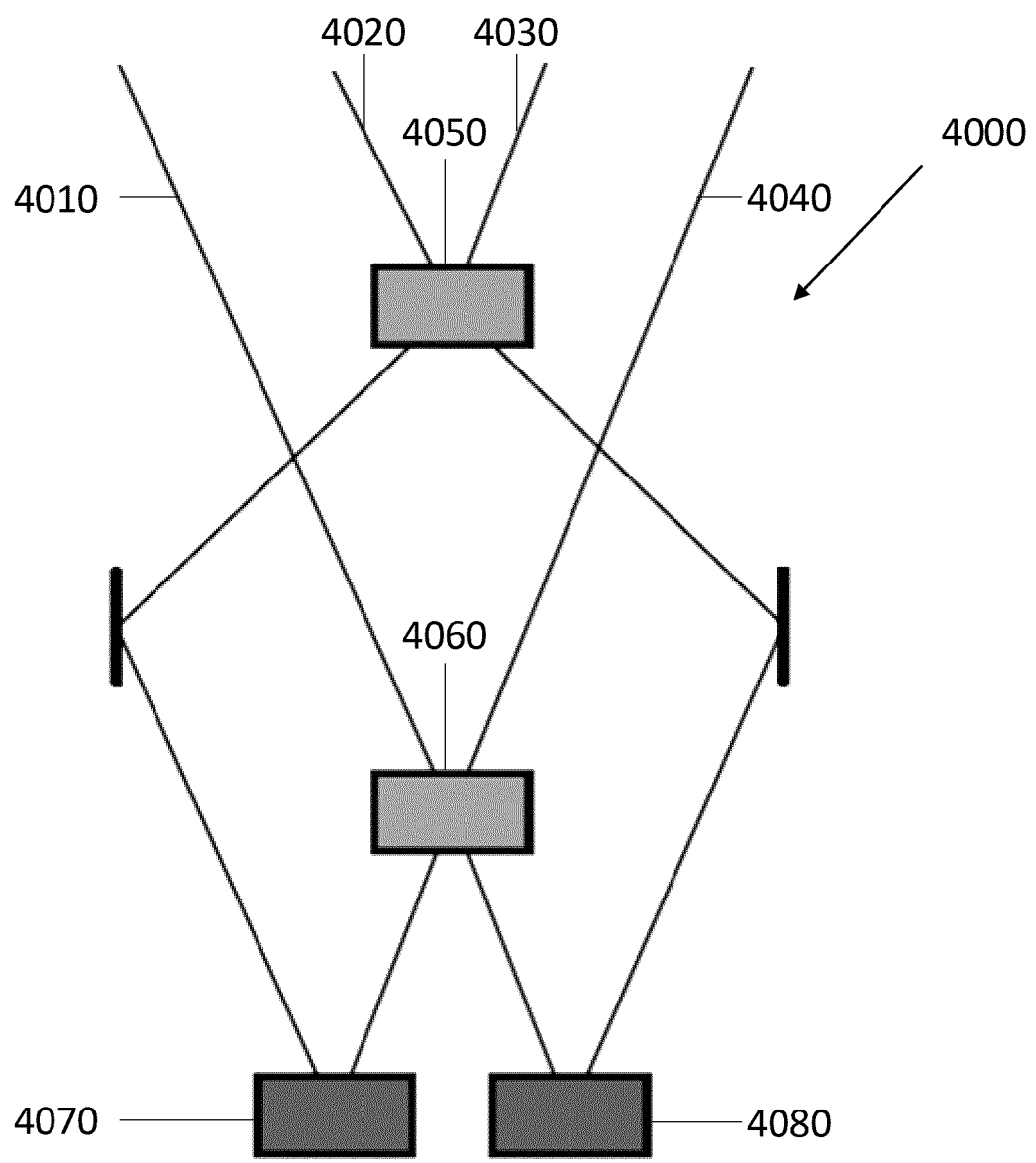
FIGS. 4(a) and 4(b) show an embodiment of one of the possible solutions of an optimized setup for the GHZ state with four photons and its corresponding graph.
Figure 4B:
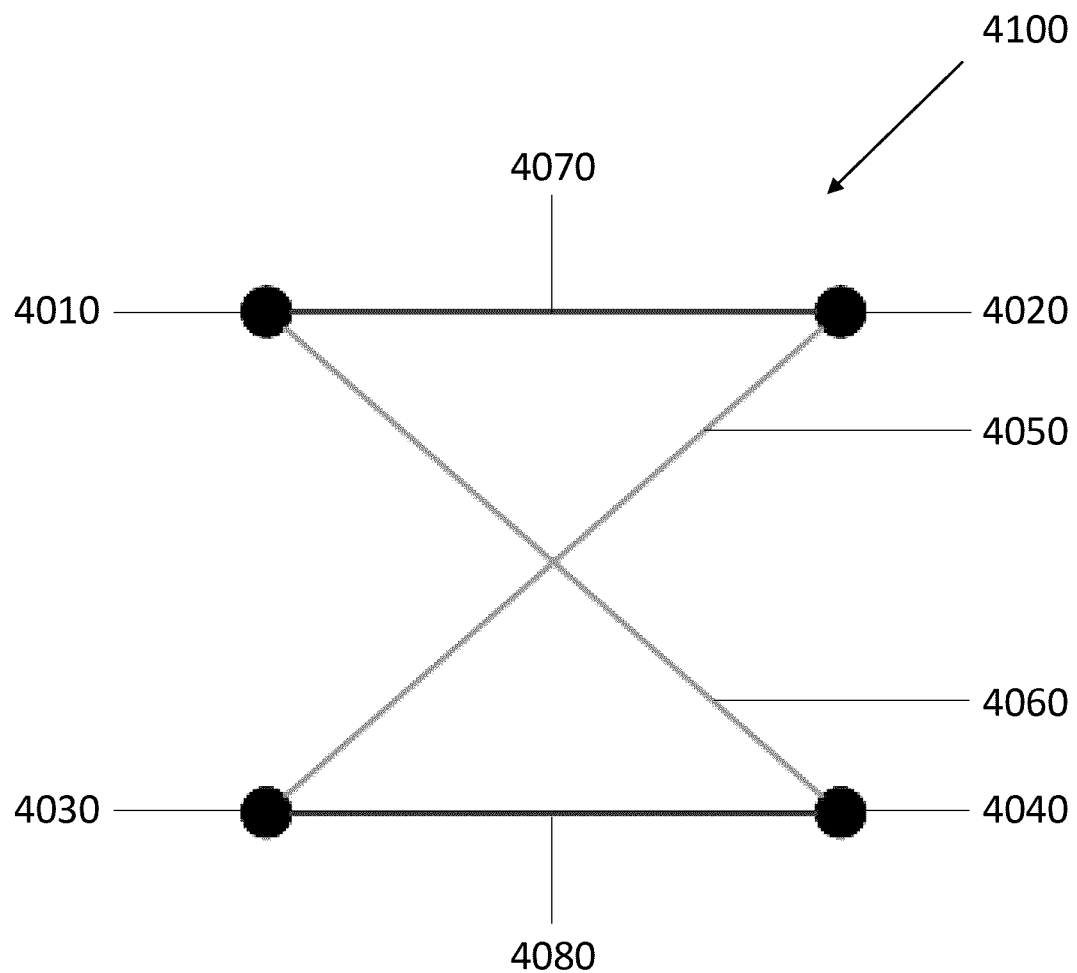

According to a further embodiment, one of the possible solutions of an optimized setup 4000 for the GHZ state with four photons 4010, 4020, 4030, 4040 and its corresponding graph 4100 are shown in FIGS. 4(a) and 4(b), respectively. The graph in FIG. 4(b) has less edges than the original fully connected graph, meaning that a lot of the weights ended up being zero after optimization. Note that in the optimized graph, every edge is displayed and that the number of edges was reduced from 24 to just four, leading to the much simpler setup shown in FIG. 4(a) with four crystals 4050, 4060, 4070, 4080 instead of 24.

Design Processes for Quantum Optical Configurations or Experiments

According to an embodiment, there is a design process for quantum optical configurations (or experiments). According to an embodiment, the design process starts with the most general graph that can be created by a quantum optical experiment with n output paths and d dimensional quantum systems. For each possible term in a quantum state $\Psi(\omega)$, a corresponding non-linear combination of weights ($\omega$) is determined. Therewith, the overlap with a target state in terms of weights of the graph ($\omega$) is determined. According to an embodiment, a loss function is defined that leads to maximization of the fidelity. According to an embodiment, $L_1$ regularization is used to maximize the number of edges that vanish from the optimized graph to simplify the resulting experimental setup. According to an embodiment, the loss function can be minimized with various optimization approaches including gradient descent, quasi-Newton schemes such as the Broyden-Fletcher-Goldfarb-Shanno (BFGS) optimization scheme, and truncated Newton schemes. Gradient-free optimization methods may also be used such as Nelder-Mead or Powell. According to a further embodiment, Baesian optimization might be applied where one wishes to find many possible solutions within one setup. According to an embodiment, optimization of fidelity is stopped once fidelity reaches F≥0.995. According to further embodiments the fidelity may be lower or higher, as desired.

Figure 5A:
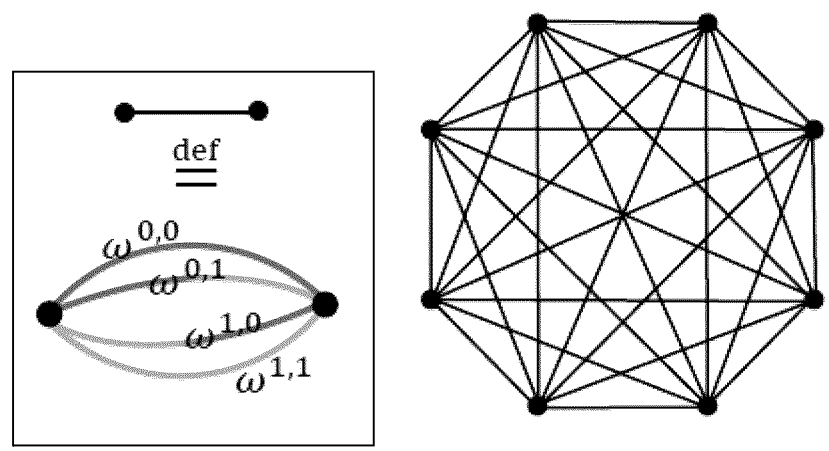

According to a further embodiment depicted in FIGS. 5(a) to 5(d), there is a method of designing quantum optical experiments with graph theory and gradient descent. FIG. 5(a) shows the most general state one can create in quantum optics that can be described as a complete graph. According to an embodiment, the number of vertices corresponds to the individual paths of a photon, with n=8 paths depicted in FIG. 5(a). According to an embodiment, an edge between two vertices can consist of $d^2$ edges with independent weights, where d is the local dimensionality of the photon. According to an embodiment, d=2, which corresponds to the qubit case, and the number of independent weights scales with $$\#(\omega) = d^2 \frac{n(n-1)}{2}.$$

FIG. 5(b) shows that every term in the quantum state can be written as a sum of products of weights. According to an embodiment where one photon is in each of the output modes, each product corresponds to perfect matchings of graphs. Embodiments with more general states, such as those with fewer photons than paths or with more than one photon per path can also be written as a sum of products of weights. Function (6) shows that for a given target state (|target⟩), the fidelity between the target and the state $\Phi(\omega)$ can be calculated in terms of $\omega$.

|target⟩=$\Sigma_i c_i |i\rangle$

Fidelity=$|\Sigma_i c_i f_i(\omega)|^2$ (6)

In addition to the fidelity target for optimization, the $L_1$ regularization under function (5) can be added to the loss function. Consequently, sparse outputs are expected in terms of the number of non-zero weights. As the number of non-zero edges corresponds to the number of optical elements in the quantum experimental setup, less complex embodiments are designed.

Figure 5C:
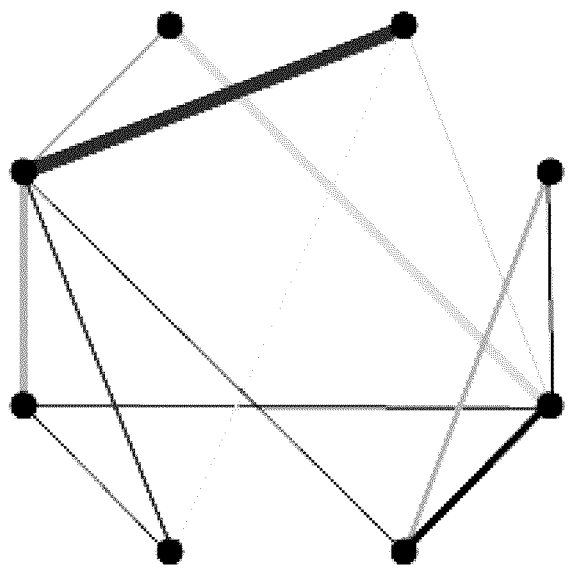
Figure 5D:
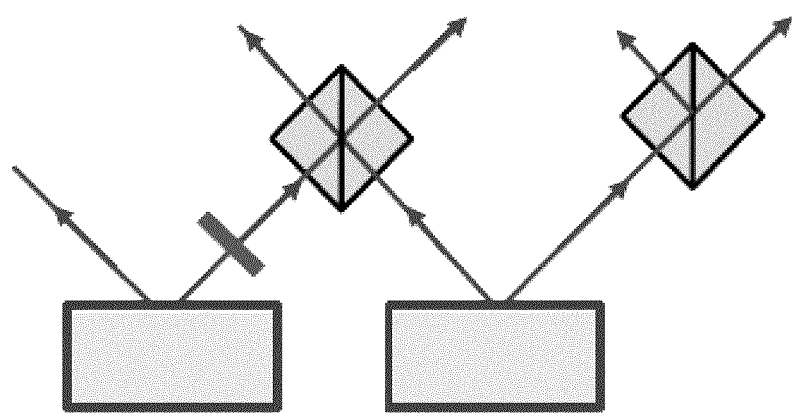
Figure 5E:
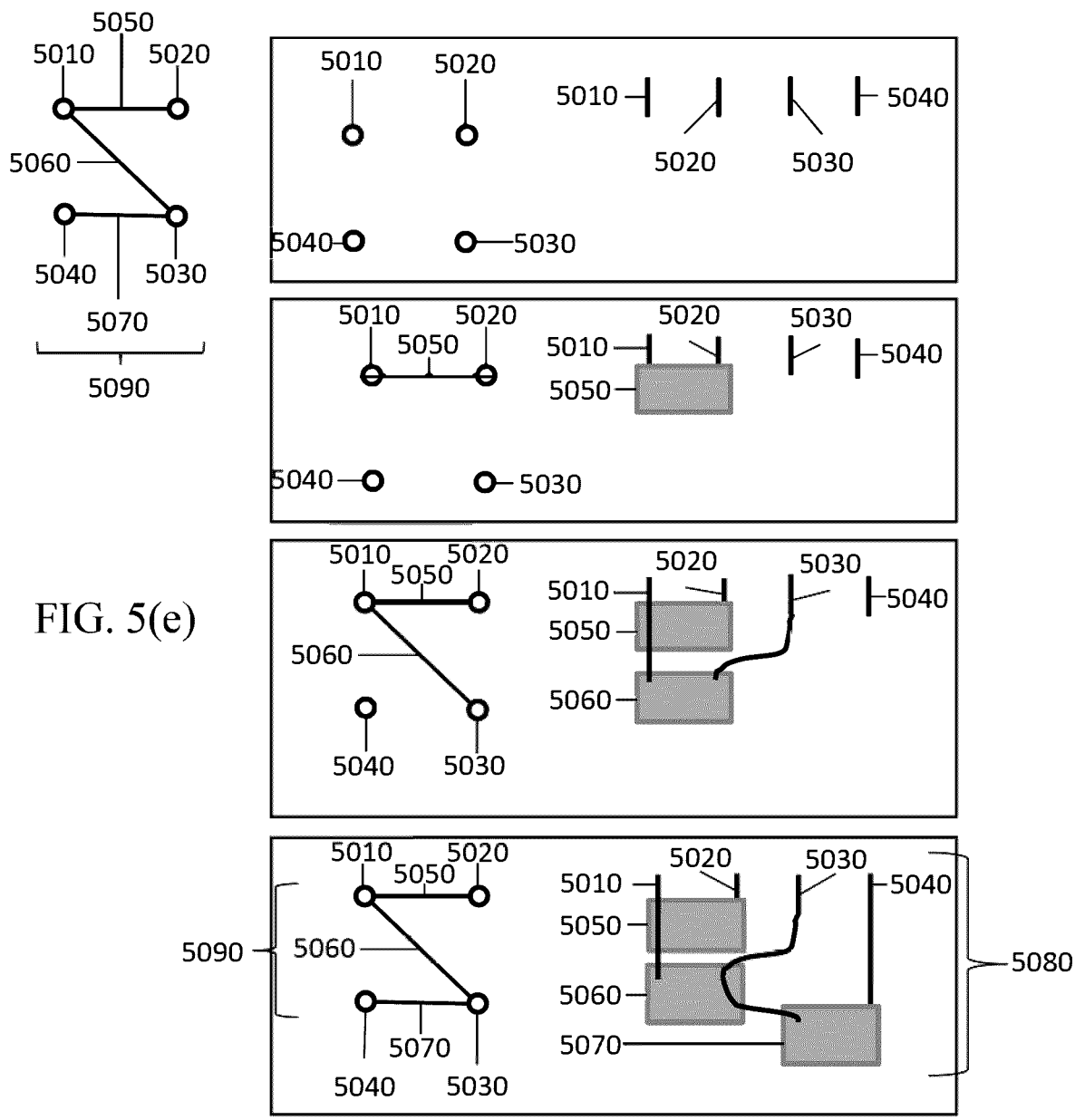

According to an embodiment, gradient descent minimizes the loss, i.e. min $\omega i, j_{P1,P2}$ Loss($\omega$), producing a final graph, such as the one shown in FIG. 5(c), whose corresponding quantum state has a maximal fidelity. According to an embodiment, the graph acts as a recipe for writing an experimental setup, such as the one shown in FIG. 5(d), in that one can directly translate a graph to path identified setups since the connection between path-identified crystals is bijective. According to an embodiment, the path identified setups can further be simplified using linear optics. According to an embodiment, every vertex corresponds to a path and every edge corresponds to a crystal that emits two photons. According to an embodiment, one can draw N paths for a graph that has N vertices, for instance 5010, 5020, 5030, 5040 as shown in FIG. 5(e), and depict a crystal for each edge. According to an embodiment shown in FIG. 5(e), for the first edge 5050 connecting 5010 and 5020, a crystal 5050 emitting in 5010, 5020 is placed on 5020 and the process repeats for subsequent edges/crystals 5060, 5070 until the optical experiment configuration 5080 for the target graph 5090 is completely mapped. According to the embodiment shown in FIG. 5(e), subsequent crystals 5060 and 5070 are emitting in 5010, 5030 and 5030, 5010 respectively.

Figure 5F:
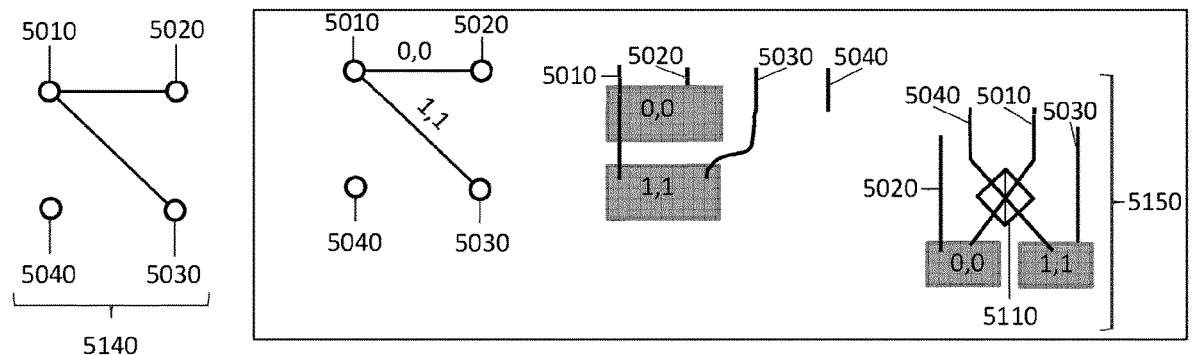
Figure 5F:
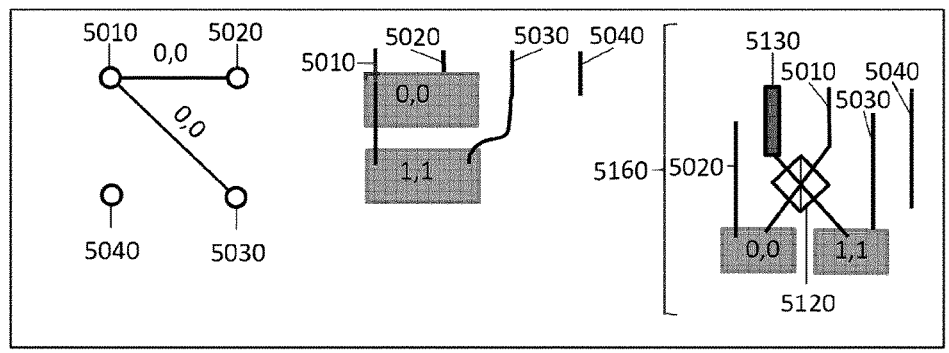

According to a further embodiment, if path identification is not used one may create graphs with only standard optical elements. According to an embodiment shown in FIG. 5(f), a polarizing beam splitter 5110, where 5040 is empty, or a non-polarizing beam splitter 5120 with loss 5130 can be used to combine modes when mapping a target graph 5140 to an optical experiment configuration 5150 and 5160, respectively. According to a further embodiment, a mapping to external modes instead of internal is possible too and may be useful for on-chip-developments.

Application of Design Process

According to an embodiment, a design process can be applied to open questions about the creation of quantum states. According to a further embodiment, a design process is applied to four open questions about the reaction of quantum states, the first two of which consider heralded entangled photon states.

Standard sources of photonic entanglement, such as SPDC or spontaneous four-wave mixing, are entirely probabilistic. Photons are produced at random times, and only after the detection of the photon state can it be known that they were created. Thus, the generation of heralded sources would permit event-ready schemes, which are essential in photonic quantum computation and quantum communication. Experimentally, two-dimensional Bell states have been generated using four ancilla photons, but it is not known in the prior art how to generate heralded high-dimensional Bell states.

Figure 6A:
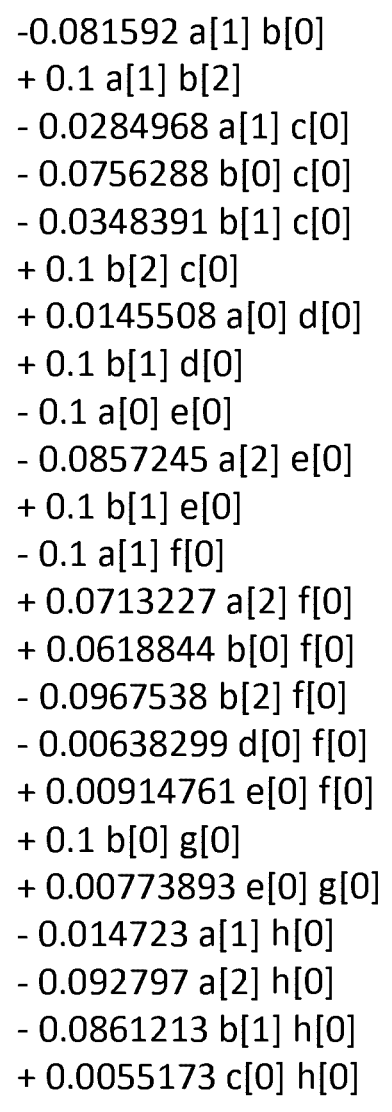

According to an embodiment, there is a method for generating heralded high-dimensional Bell and GHZ states. According to an embodiment depicted in FIG. 6(a), a theoretically perfect solution is found which requires four simultaneous SPDC events, a feat that is within modern experimental capabilities. In particular, FIG. 6(a) shows the pump powers for a heralded 2-photon 3-dimensional Bell state in path a, b with 23 crystals that results if trigger detectors c-h all fire together, where the output in path a, b is $|\Psi\rangle = 1/\sqrt{3}(|0, 0\rangle + |1, 1\rangle + |2, 2\rangle)$, where $|\ell\rangle$ represents the orbital angular momentum of photons.

According to an embodiment, a simplified experimental configuration is proposed to produce higher-number heralded photon numbers through a process that requires fewer resources and which is within reach of modern experimental capabilities. According to an embodiment shown in FIG. 6(b), there are the pump powers for a heralded 2-dimensional GHZ state in path a, b, c, with 35 crystals that result if trigger detectors d-j all fire together, where the output in path a, b, and c is $|\Psi\rangle = 1/\sqrt{2}\ (|0, 0, 0\rangle + |1, 1, 1\rangle)$, where $|0\rangle (|1\rangle)$ represents a horizontally (vertically) polarized photon.

Figure 6C:
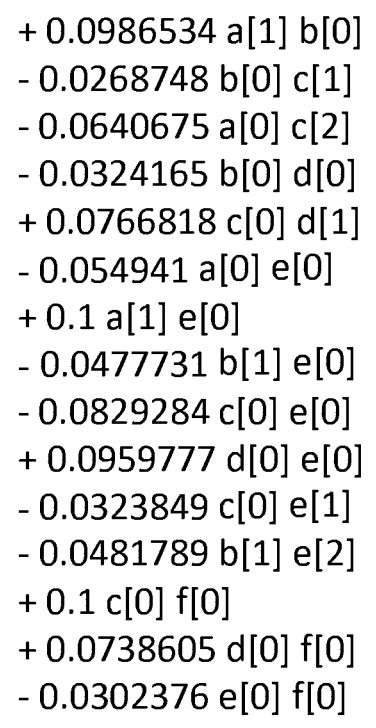

According to an embodiment depicted in FIG. 6(c), resource states can be determined for high-dimensional CNOT transformations which were previously unanswered. In particular, FIG. 6(c) shows the pump powers for a resource state for a 3-dimensional CNOT operation with 15 crystals, conditioning on a photon in path a-f where the output is $|\Psi\rangle = 1/\sqrt{7}|0\rangle\ (|0, 0\rangle|0, 0, 0\rangle + |1, 0\rangle (|1, 0, 0\rangle + |0, 1, 0\rangle + |0, 0, 1\rangle) + |0, 1\rangle (|2, 0, 0\rangle + |0, 2, 0\rangle + |0, 0, 2\rangle))$, where $|\ell\rangle$ once more represents the orbital angular momentum of photons.

According to an embodiment depicted in FIG. 6(d), the design process can be applied to the search for high-dimensional GHZ states. In particular, FIG. 6(d) shows the pump powers for individual crystals for a solution as a 3-dimensional 6-photon GHZ state where $|\Psi\rangle = 1/\sqrt{3}\ (|0, 0, 0, 0, 0, 0\rangle + |1, 1, 1, 1, 1, 1\rangle + |2, 2, 2, 2, 2, 2\rangle)$. According to an embodiment, the experimental solution can be created without using ancilla photons, overcoming a graph theoretical limitation on the dimensionality of large GHZ states. However, the state may be susceptible to noise. The fidelity can be increased at the cost of lower count rates, where in the limit of perfect fidelity the expected count rates vanish.

Multi-Photonic Quantum Transformations

According to an embodiment, the design process described herein can identify multi-photonic quantum transformations. The underlying principle is to encode the information of multiple states into the graph, which is possible due to individual states being connected via unitary transformations. This permits the efficient discovery of transformations, which is difficult with other approaches.

Figure 7A:
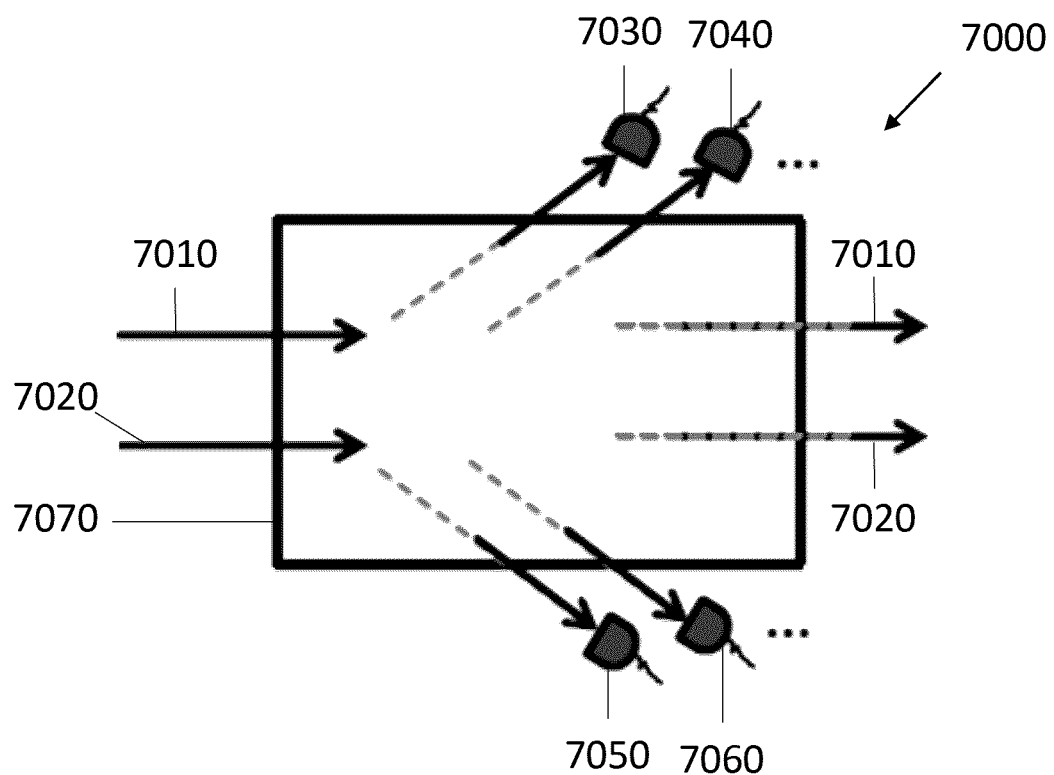
FIGS. 7(a) to 7(d) show embodiments of a design process that can be used to find novel, efficient gates for high-dimensional quantum computation.

According to a further embodiment, the design process described herein can be used to find novel, efficient gates that are required for high-dimensional quantum computation. Since photons do not directly interact, one embodiment uses ancilla photons. As shown in FIG. 7(a), a general setup 7000 has photons 7010 and 7020 in paths entering a black box 7070, in which several ancilla photons 7030, 7040, 7050, 7060 are created. According to an embodiment, a click in each of the ancillary detectors indicates that the photons that exist have undergone the correct transformation.

Figure 7B:
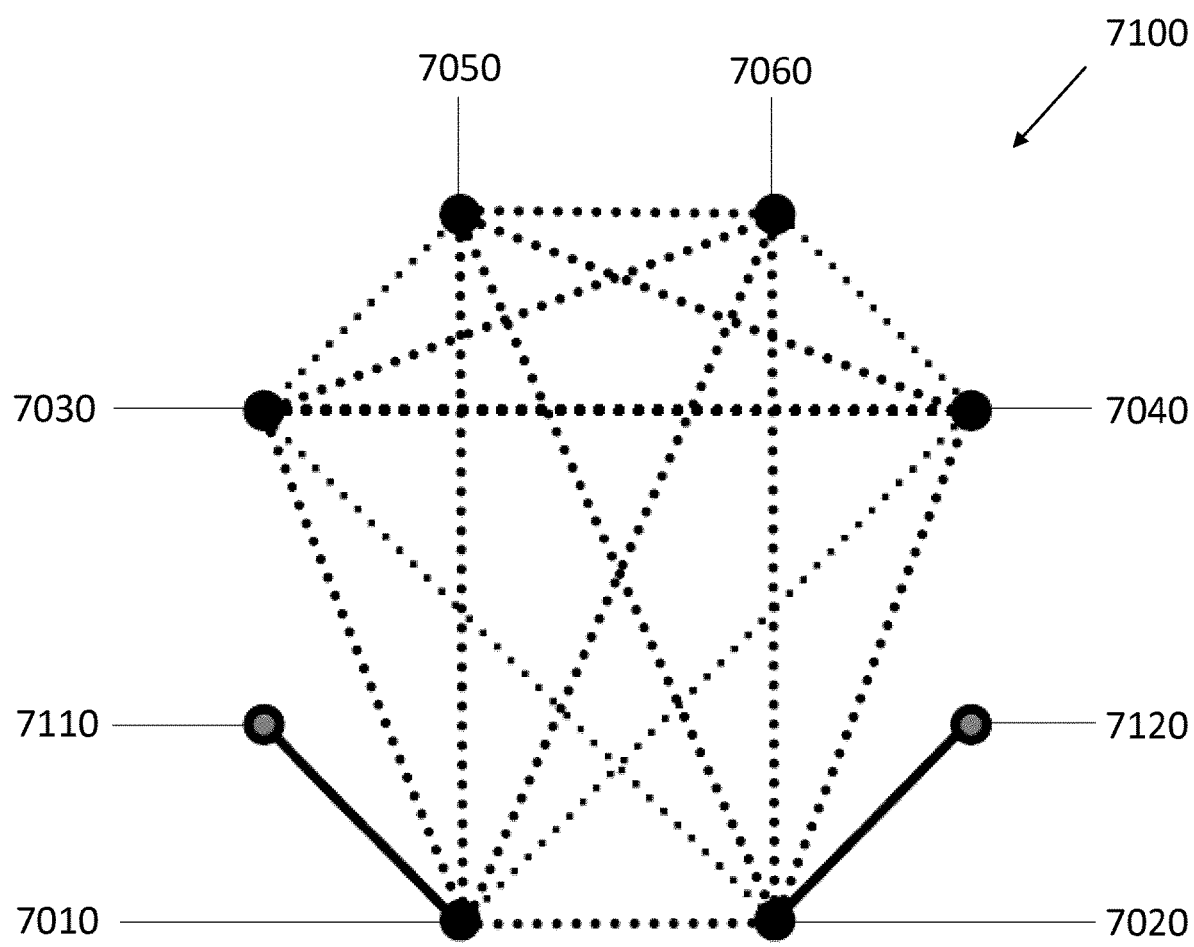

According to an embodiment shown in FIG. 7(b), the experimental configuration can be understood as a graph 7100 with the addition of virtual vertices 7110 and 7120 to simulate deterministic processes, like deterministic single-photon input states, in graphs. According to an embodiment, each valid term in the quantum state has exactly one incoming edge to each virtual vertex.

Figure 7C:
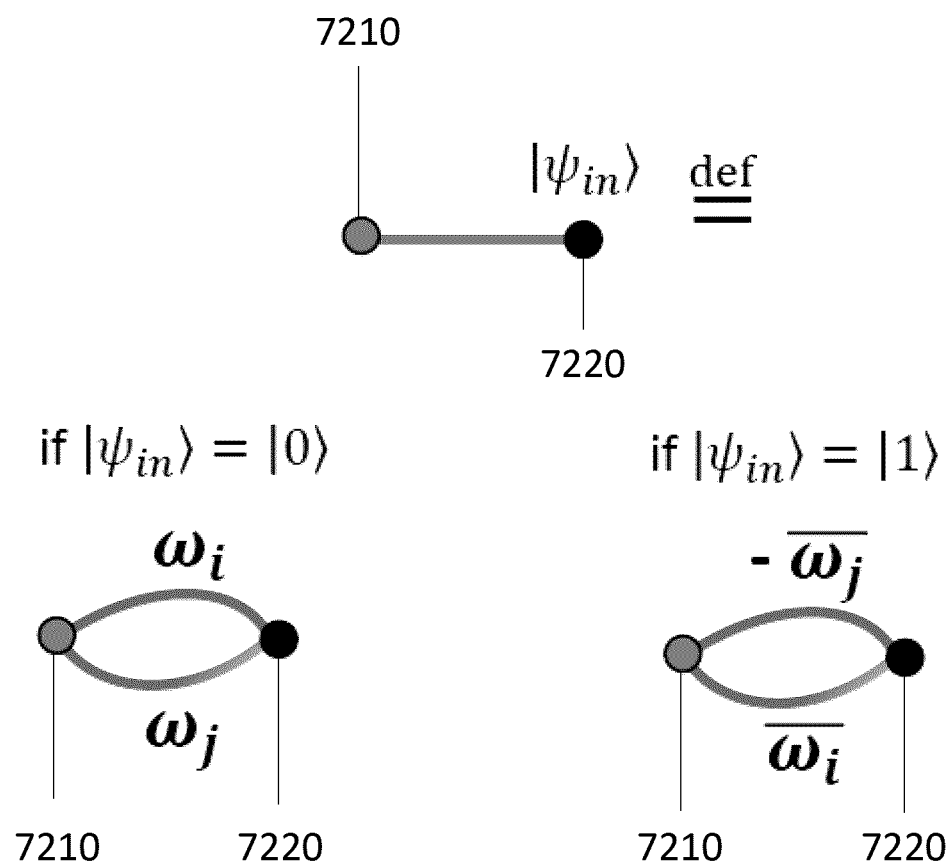

According to an embodiment, the entire transformation can be represented in a single graph where virtual vertices 7210 are connected with the input photons 7220, an example of which is shown in FIG. 7(c). Thus, a gate transformation changes the edge between a virtual vertex and one of the other vertices. Since an input photon can go to any of the other vertices and, according to an embodiment, single-photon transformations are constrained to be unitary, the weights for different input modes can be constrained. For example, if an input photon in mode $|0\rangle$ is transformed to $(\omega^{0,0}|0\rangle = \omega^{0,1}|1\rangle)$, then an input $|1\rangle$ is transformed to $(\omega^{0,1}|0\rangle + \omega^{0,0}|1\rangle)$, as depicted by a lighter shaded edge.

Figure 7D:
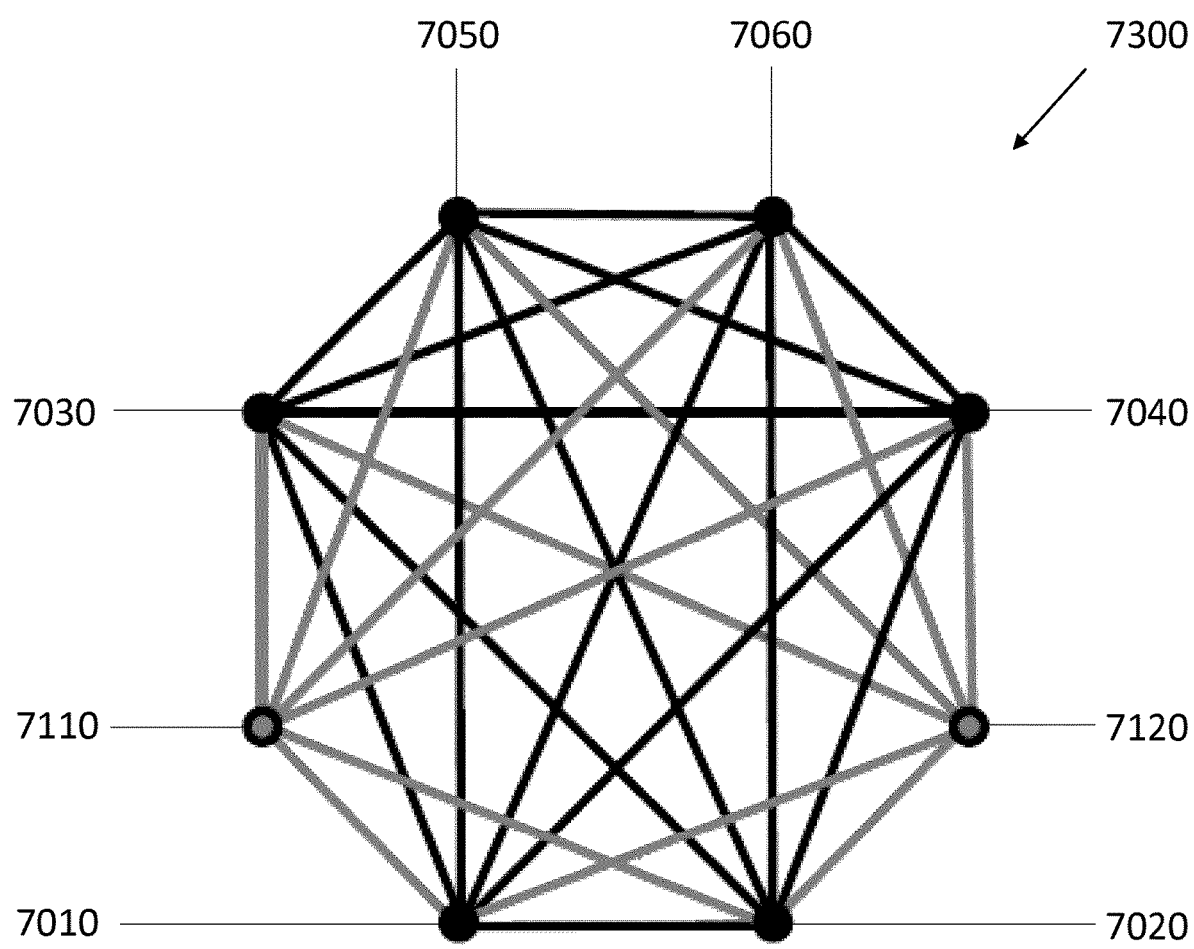
Figure 8A:
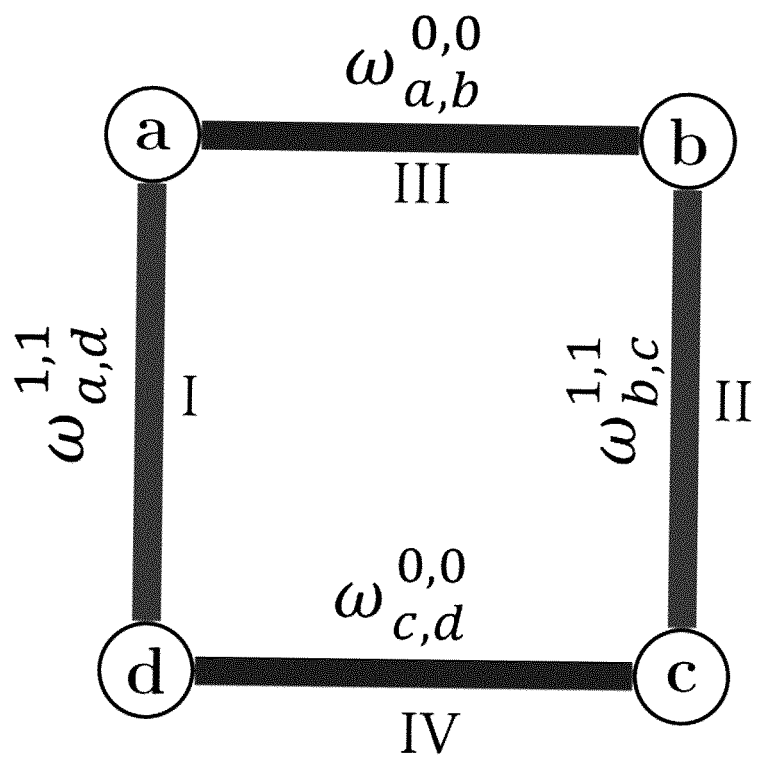
FIGS. 8(a) to (d) shows a graphical description of the link according to some embodiments.
Figure 8B:
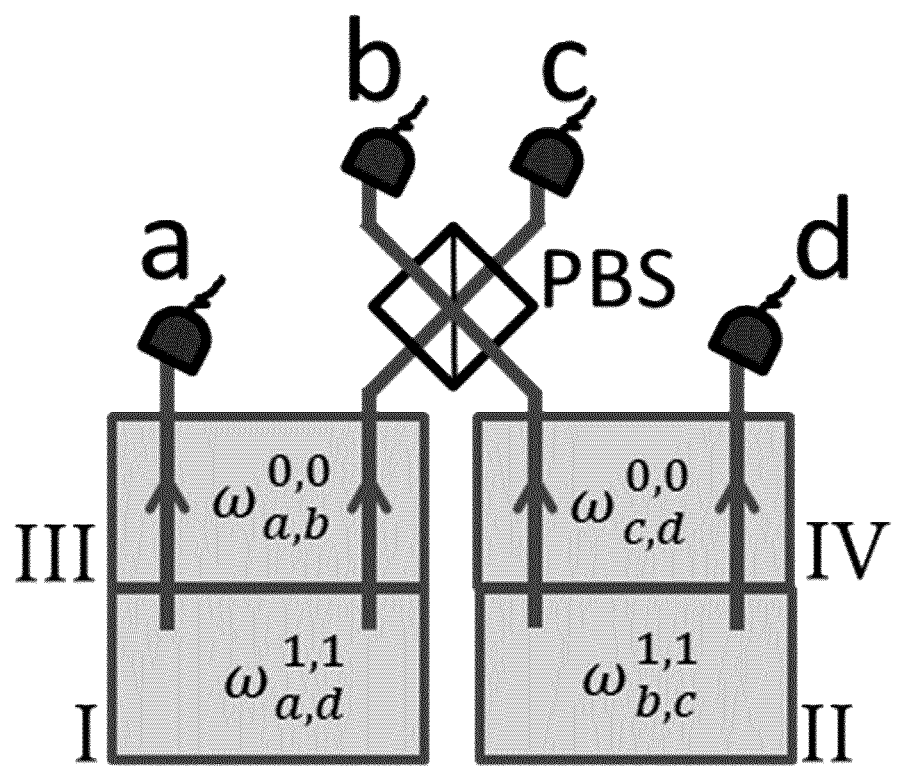
Figure 8C:
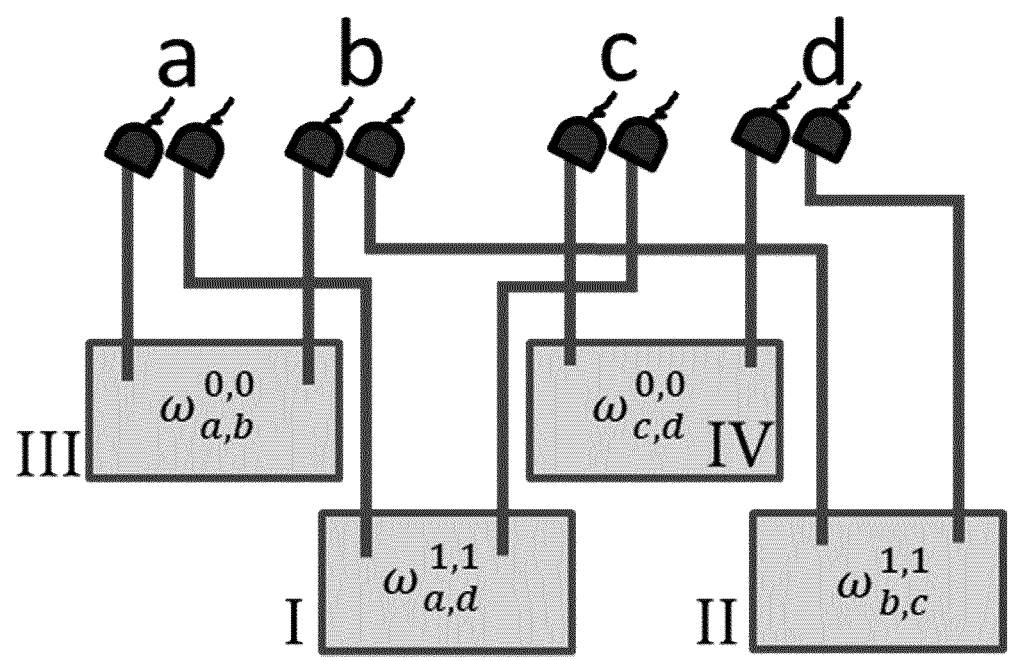
Figure 8D:
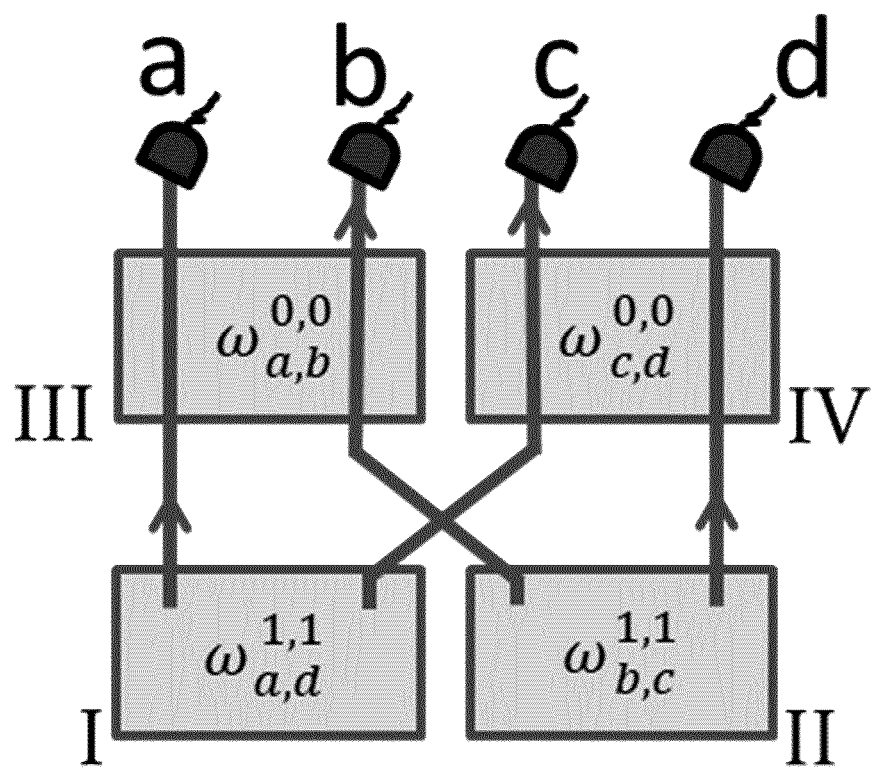

According to an embodiment, the input photons can go to any of the outputs and all other paths can be occupied by ancillary photons. As shown in FIG. 7(d), a completed graph 7300 may be depicted with edges connected to virtual vertices 7110, 7120 that represent parametrized linear optics elements shown in a lighter shade and path identified crystals as edges in a darker shade between input photons 7010, 7020 and ancilla photons 7030, 7040, 7050, 7060.

According to an embodiment, for gate creation tasks every possible input state must be transformed correctly. As shown in function (7) below, each input combination fidelity can be evaluated, and the total gate-fidelity is equal to the sum of all individual fidelities.

$$\text{Gate-Fidelity} = \sum_{i \in \{00, 01, 10, 11\}} \text{Fidelity}(i) \quad (7)$$

$$\text{Loss} = (1 - \text{Gate-Fidelity}) + \|\omega\|_1$$

The loss function for gradient descent is similar to function (5), but with the more complex gate fidelity term incorporated. According to an embodiment, the resulting graph can be translated to optical setups.

Low-Noise Multi-Photonic Entanglement Sources

According to an embodiment, the method provided may be used to generate multi-photonic entanglement sources. In the past, one reason it has been challenging to generate multi-photonic entanglement sources is because of the probabilistic nature of spontaneous parametric down-conversion (SPDC) sources, which causes intrinsic noise. According to an embodiment, the method described herein may suppress noise level to small values than the previous intrinsic noise levels. By reducing noise levels, the present method may also be employed in enhancing the quality of photonic quantum simulators and quantum computers.

Heralded Multi-Photonic Quantum Entanglement with SPDC and Quantum Dots

According to an embodiment, the present method may be used to better identify general concepts for heralded photons. The main source of entangled photon pairs is SPDC, which is an intrinsically probabilistic source, meaning that one does not know when an entangled pair of photons is created. While there are methods for generating heralded entangled photon pairs, which gives timing information of the emitted particles, they are at present limited to the simplest entangled states. According to a further embodiment, the present method may be useful in the generation of quantum entanglement from deterministic photon sources such as single photon emitters from quantum dots.

Increasing Image Quality of Telescopes

According to an embodiment, the present method may also be employed to improve the quality of imaging schemes of telescopes. It may be the case that the image quality of astronomical telescopes is enhanced by manipulating the photon-number statistics of the incoming light. This is based on experiments which have already been conducted to reduce the number of photons which gave a slight improvement in the image quality. However, increasing the number of photons ought to allow for a greater improvement in image quality. The present method may allow for the efficient exploration of the space of relevant optical configurations and optimize potential solutions guided by gradients of the target function. This may help with manipulating the photon-number statistics of light and in particular adding photons to arbitrary light fields. This may be useful for light fields with thermal photon number distribution, such as in imaging systems, which are used in the astronomical domain. The present method may help discover a method to add coherently single photons to a target beam which may lead to an increase in signal-to-noise ratios in various optical applications. Moreover, such a method may also improve measurement devices in the astronomical or biological domain and might have both considerable scientific and economic significance.

Conceptual Understanding Through Efficient Inverse-Design of Quantum Optical Experiments According to an embodiment, inverse-design of quantum optical experiments are provided.

One crucial question within artificial intelligence (AI) research is how AI technology can be used to discover new scientific concepts and ideas. According to an embodiment, an explainable AI method and algorithm is provided that can provide new conceptual understanding. According to an embodiment, the method provides four significant contributions: (i) an interpretable representation of quantum optical experiments amenable to algorithmic use; (ii) an inverse-design method for new quantum experiments, which is orders of magnitudes faster than the best previous methods; (iii) solutions to several crucial open questions in quantum optics, which is expected to advance photonic technology; and finally, and most importantly, (iv) interpretable representation and drastic speedup that enable producing solutions that a human scientist can interpret outright to discover new scientific concepts. According to an embodiment, the method will become an essential tool in quantum optics and photonic hardware, with potential applicability to other quantum physical disciplines.

Photons are at the core of many quantum technologies that promise advances for imaging applications, efficient metrological schemes, fundamentally secure communication protocols as well as simulation and computation techniques that are beyond the capabilities of their classical counterparts. Besides, photons are also among the core players in the experimental investigation of fundamental questions about the local and realistic nature of our universe.

Motivated by these opportunities, dramatic advances in quantum optical technology can be provided, which include highly complex operations in integrated photonic chips, generation of complex multiphotonic entanglement and its application, and the development and application of high-quality deterministic single-photon emitters and highly efficient photon-number resolving detectors.

To advance technological and fundamental progress further and to enable the exploration of numerous proposed ideas in the laboratories, new experimental concepts and ideas are instrumental. Frequently, however, the design of experimental setups even for well-defined targets is challenging for the intuitions of human experts, and existing systematic schemes to date only provide solutions for specific experimental scenarios. For that reason, computational design methods for quantum optical experiments can be used, in the form of topological search augmented with machine learning, genetic algorithms, active learning approaches, and optimization of parametrized setups. Unfortunately, due to the complexity and size of the Hilbert space as well as the breadth of quantum optical applications, those algorithms may have severe drawbacks, such as inefficient discovery rates, requirements of a huge amount of training data or specialization on narrow sets of problems. Most importantly, no method so far has shown how to systematically extract scientific ideas, concepts and understanding from the solutions of the computer algorithm.

According to an embodiment, an inverse-design method and algorithm for quantum optics is provided with highly interpretable representation that allows to scientists to rationalize the solutions quickly. According to an embodiment, the method is generally applicable to discrete-variable quantum optics problems (including post-selected and heralded states, probabilistic and deterministic photon sources), does not need training data, and is orders of magnitude faster than previous comparable approaches. According to an embodiment, speed-up allows for the application of topological optimization, which the method can use to uncover the conceptual cores underlying the solution. Physicists can then interpret, understand and generalize the underlying ideas and concepts. These advances according to an embodiment allow us to apply the method to solve several previously open questions about quantum experiments. For example, concretely, experiments described herein implementing the method are used to illustrate and investigate complex multiphotonic entanglement, the generation of heralded entanglement and complex photonic quantum transformations. In all of these cases, the method is used to uncover previously unknown generalizable patterns and new experimental ideas and interpretations, according to an embodiment.

According to an embodiment, the method differs significantly from others that try to employ machine learning to extract scientific concepts. An important difference is that these applications so far have been applied to rediscover previously known concepts. Examples involve the identification of astronomical concepts such as the heliocentric worldview which has already been considered by Copernicus, the arrow of time and related thermodynamical concepts that were discovered in the 20th century or the identification of certain interferometric devices that are used by optical physicists for many years. Those are significant works that indicate great future possibility. However, they come with a grain of salt: It is not clear how much prior knowledge the scientists implicitly use to identify those concepts from the computer algorithms. Therefore, it is unclear how to extend these methods to actual open questions. Instead, according to an embodiment, the method is configured to advantageously enable the uncovering of conceptual cores underlying a solution to an open question, such as using topological optimization.

In quantum optics, in two works new concepts have been identified using a brute-force computational search algorithm. There, 10,000s of CPU-hours were necessary to arrive at a useful design. Those solutions were represented directed as a sequence of optical elements, which are very unintuitive to interpret conceptually. Moreover, the sequences were highly non-optimized because they emerged through random processes. As a consequence, it required scientists weeks or even months to rationalize the underlying principles.

In contrast to those previous approaches, according to an embodiment, the method provides for the first time an algorithm that produces highly interpretable solutions, which can be applied according to embodiments of the method to unsolved problems in science. The solutions discovered by the method allow human scientists to rationalize the new, underlying concepts in quasi-real-time. This is demonstrated by experiments implementing embodiments of the method, where the experiments show embodiments of the method solving several previously unresolved questions. In all of those cases, the method according to an embodiment can provide for the interpretation and extraction of underlying design concepts outright. According to an embodiment, the method provides the first algorithm that can provide targeted and systematically new conceptual understanding in a scientific domain. According to an embodiment, the method provides is an important advance towards the goal of interpretable and explainable AI (XAI) in science that will assist human researchers at a conceptual level.

According to an embodiment, the method provides an improved computer implementing an ability to design quantum experiments or determine experimental configurations. Further, the experimental configurations can be represented in more easily understandable configurations, such as graph representations of a state, the graph optimized for their edge weights. According to an embodiment, the method provides a computerized representation of quantum optics orders of magnitude faster than other approaches, where a conceptual core of a solution is determined, generated and represented (e.g., using topological optimization of the graph representation of a state). According to an embodiment, the method is interpretable and generalizable (e.g., understandable) in a wide variety of cases.

According to an embodiment, the method enables the improved encoding of information, and, in particular, quantum information. This can enable the encoding of larger systems (e.g., 4-dimensional DNA), spatial modes of light (e.g., Laguerre-Gauss beams LGp,1), photons, as well as experimental configurations requiring representation and/or manipulation of same.

Graph Theory—Quantum Experiment Mapping

FIG. 8 shows a weighted edge-shaded graph as an abstract and efficient representation of the quantum information of a large variety of quantum optics experiments. FIG. 8(a) shows a specific example of a graph with four vertices and four shaded and weighted edges. The vertices a-d correspond to photonic paths, the edges correspond to correlated photon pairs, the edge shades stand for mode numbers, and weights $\omega \in C$ stand for complex coefficients. Probabilistic sources create the photon pairs (edges). Thus the entire information about the quantum state is represented by $\Phi(\omega)$, with $x_k^\dagger$ being a creation operator of a photon in path x with mode number k. The information carried in the graph can be translated to different schemes of quantum optical experiments, such as shown in FIG. 8(b) standard bulk optics, for example with path encoding, or as shown in FIG. 8(c) polarisation encodings as the carrier of quantum information (e.g., integrated photonics) or as shown in FIG. 8(d) entanglement by path identity. The results of these quantum experiments implementing the method according to an embodiment can directly be calculated from the information of the graph. For example, a technique is to condition the state on detecting a photon in each of the four detectors (post-selection). The equivalent formulation according to the method in terms of graphs is the sum of all subsets of edges that contain every vertex exactly once. This reduces the example quantum state to two terms. If all weights are equal, the resulting quantum state is a four-qubit GHZ state. Access to $\Phi(\omega)$ allows for the optimisation of non-postselected, heralded and triggered quantum states too, as shown by examples described herein. The graph represented in FIG. 8(a) can be represented as follows:

$$\Phi(\omega) \approx \sum_m 1/m! \left( \omega_{a,b}^{0,0} a_0^\dagger b_0^\dagger + \omega_{c,d}^{0,0} c_0^\dagger d_0^\dagger + \omega_{a,d}^{1,1} a_1^\dagger d_1^\dagger + \omega_{b,c}^{1,1} b_1^\dagger c_1^\dagger \right)^m$$

and $$|\psi\rangle = \left( \omega_{a,b}^{0,0} \cdot \omega_{c,d}^{0,0} |0,0,0,0\rangle + \omega_{a,d}^{1,1} \cdot \omega_{b,c}^{1,1} |1,1,1,1\rangle \right)$$

Weighted shaded graphs generated by the method according to an embodiment (such as shown in FIG. 8 can encode the information produced by a photonic quantum experiment involving probabilistic photon pair sources and linear optical components. The vertices correspond to spatial photon paths and edges between vertex v1 and v2 stand for probabilistic photon pairs in path v1 and v2. The edge shade represents the internal mode number of the photons and edge weights $\omega$ stand for amplitudes. Advantageously, this description is not only applicable to post-selected states. For example, as shown in FIG. 8, according to an embodiment, the method can represent a state as a graph, where each vertex represents a photonic path, each edge represents a photon pair, each amplitude represents an edge weight, and each shade of each edge represents a photonic mode.

According to an embodiment, the method significantly extends the abstract description of quantum optics experiments as shaded weighted graphs, demonstrating how general quantum optics technology and questions can be raised and solved using the new framework provided by the method. The extensions allow for the first time the use of a framework of weighted shaded graphs for computational design of quantum optical experiments and hardware.

According to an embodiment, the method provides a weight function $\Phi(\omega)$ that gives access to the complete information of quantum optical experiments (rather than only post-selected states), and allows the generalization of the scope of the method significantly. According to an embodiment, the method allows for the description of non-postselected states, triggered and heralded photonic states, states with multiple excitations per mode (such as NOON states) and general quantum transformations. Furthermore, according to an embodiment, the method enables the description of photon-number sensitive and insensitive detectors (which correspond to different projections of $\Phi(\omega)$ and deterministic photon sources such as quantum dots.

According to an embodiment, the method provides the creation of graphs that can be directly translated to several different schemes of photonic quantum optics, such as standard bulk optics integrated photonics or entanglement by path identity. According to an embodiment, the method provides a graph and a given graph can be translated in multiple ways to quantum experimental setups, while each setup corresponds to precisely one graph. According to an embodiment, the method these extensions provide a graph-theoretical description as a tool for the inverse-design of quantum experiments that are feasible in state-of-the-art quantum photonics laboratories.

Graph-Based Inverse-Design of Quantum Experiments

The abstract and general representation of quantum experiments as graphs using the method according to an embodiment allows the creation of a new method for inverse-designing quantum experiments. According to an embodiment, the method provides an optimisation objective function in terms of weights $\omega$ of the graph. For example, according to an embodiment, the method is configured to enable creation of an experimental setup that produces a specific quantum state, where the objective function is the fidelity of the state encoded as a graph. As another example, according to an embodiment, the method is configured to enable finding transformation, where the objective function is the gate fidelity. Importantly, according to an embodiment, the method can be used for more general optimization targets, where neither the quantum state nor the quantum experiments are known beforehand. Examples are quantum metrology, where the objective function can be the Fisher-Information (written in terms of weights $\omega$), or quantum-enhanced imaging technologies, where the objective function can be a signal-to-noise ratio (again, in terms of weights ω).

Figure 9:
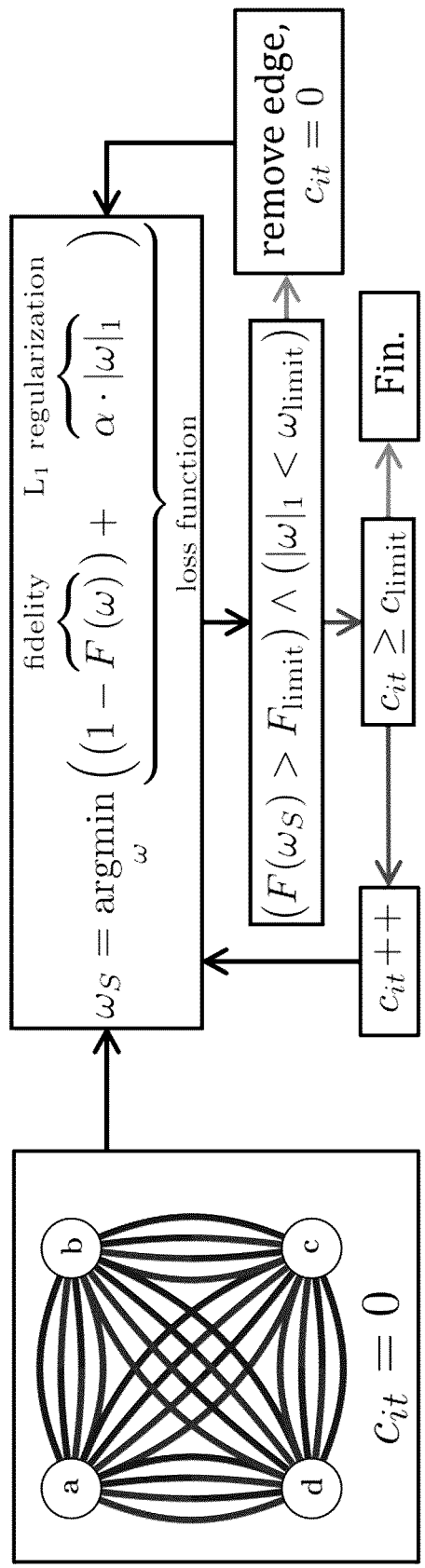
FIG. 9 shows graphical representations of an algorithm according to some embodiments.

According to an embodiment, the method is configured to enable creation of a graph describing a quantum state. For example, the most general quantum state corresponds to a complete graph with all possible multi-shaded weighted edges between each vertex (such as shown in FIG. 9). According to an embodiment, a step of the method includes constructing the objective (e.g., state fidelity) in terms of weights, F(ω). While the entire quantum state Φ(ω) is directly defined by the edge weights according to an embodiment, conditioning measurements can be used to obtain more intricate states and to overcome the lack of single-photon nonlinearities. Examples for such measurements are conditioning on the simultaneous detection of one photon in each path (I) or conditioning on the detection of ancilla photons (II). According to an embodiment, a graph represented by the method such as shown in FIG. 9 can represent a quantum state and/or provide an experimental configuration or setup. The objective (ω) (e.g., fidelity (ω)) can be represented or determined by the method, for example.

FIG. 8 shows an example construction according to an embodiment of the method of the fidelity for a 4-photon GHZ state $|GHZ\rangle = 1/\sqrt{2}(|0, 0, 0, 0\rangle + |1, 1, 1, 1\rangle)_{a-d}$, where $|0\rangle$ and $|1\rangle$ stand for one photon in the internal mode 0 and 1 (such as horizontal or vertical polarisation), respectively. The subscript a-d means one photon is in each of the four paths a, b, c and d. Under the condition of simultaneous detection (I), the term $|0, 0, 0, 0\rangle$ can be generated according to an embodiment of the method by three different subgraphs: two blue horizontal edges, vertical edges or crossed edges. The weight of a subgraph (e.g., subgraph weight) is the product of all its edge weights (e.g., weights of each edge included in the subgraph). The weight of the whole term is the sum of all weights of the subgraphs. Therefore, the weight of $|0, 0, 0, 0\rangle$ is shown in function (8):

$$\omega_{|0,0,0,0\rangle} \omega_{a,b}^{0,0} \omega_{c,d}^{0,0} + \omega_{a,c}^{0,0} \omega_{b,d}^{0,0} + \omega_{a,d}^{0,0} \omega_{b,c}^{0,0} \quad (8)$$

In an equivalent way, the amplitude of $|1, 1, 1, 1\rangle$ can be written in terms of ω. As a result, this can be as shown in function (9):

$$F(\omega) = \frac{|\omega_{|0,0,0,0\rangle} + \omega_{|1,1,1,1\rangle}|^2}{2 \cdot N(\omega)^2} \quad (9)$$

where N(ω) is a normalisation constant of the state emerging from the graph and which corresponds to a 2 dimensional GHZ state, but may be more generally represented by the objective function $$F(\omega) = \frac{\left|\sum_{i=1}^{n} \omega_{\psi_n}\right|^2}{n \cdot N(\omega)}$$

where n is the number of terms in the quantum state, and $\Psi_n$ being the n-th term of the quantum state.

According to an embodiment, the weights of the graph are optimised by minimising a loss function constructed from the fidelity and an additional L1 regularisation term. The loss function can be as shown in function (10):

$$L(\omega) = (1-F(\omega)) + \alpha \cdot |\omega|_1 \quad (10)$$

with positive real coefficient α<1. Inclusion of the $L_1$ regularization term can drive the optimisation towards a solution with smaller amplitudes, thereby opening ways to further reduce the edges of the graph by removing edges with small weights (e.g., by removing edges having weights less than a threshold value). For optimisation, according to an embodiment, the method uses the Broyden-Fletcher-Goldfarb-Shanno algorithm, an iterative gradient-descent method that approximates Hessians to solve non-linear optimization problems. Other algorithms or methods can be used. According to an embodiment, as an example, the method can identify a solution with F(ω) above a limit (e.g., $F_{limit}=0.95$) and small weights ω (e.g., $\omega_{limit}=1$), and thereby determine a suitable experimental setup candidate. According to an embodiment, as the loss minimization is fast, the method can perform a topological optimisation. According to an embodiment, the method reduces the size of the graph by iteratively removing individual edges. For example, the edge can be chosen from a distribution that depends on the magnitude of the weights of the previous solution (e.g., with two special cases: choosing entirely randomly, or always choosing the edge with the smallest weight magnitude). The new, smaller graph can be used by the method according to an embodiment to minimize the loss function in eq. (3). The topological optimisation reduces the size of the graph iteratively according to an embodiment.

According to an embodiment, the topological optimisation used by the method distills small structures (e.g., generates smaller graphs representing an objective function) such that human scientists can interpret and understand the underlying physical principles, and use the new knowledge to solve other cases. According to an embodiment, the method can be demonstrated to enable use of these insights to find straight-forward generalizations to an infinitely large classes of situations. This is in stark contrast to other AI applications in the natural sciences, where the solution of a parameter optimisation is the final product, without enabling the discovery of new scientific ideas.

FIG. 9 shows the method according to an embodiment. An initial graph generated according to an embodiment contains all possible edges between each vertex, leading to $$|G| = d^2 \frac{n(n-1)}{2}$$

edges (with n vertices and d different edge colors or shadings), each of them having an independent complex weight $\omega_{v_1,v_2}^{m_1,m_2}$. An important step of the method according to an embodiment is a minimization of the loss function, which contains the quantum fidelity in terms of weights of the graph. Additionally, an $L_1$ regularization term controls the magnitude of the weights. If the weights identified by the optimisation, ωs, lead to fidelities larger than a $F_{limit}$, and the magnitude of the weights is smaller than $\omega_{limit}$, then one edge of the graph is removed according to the method of an embodiment, and the optimization continues with the smaller graph. On the other hand, if the criteria are not fulfilled, the same graph is optimized (with different starting conditions) until the discovery of a suitable solution, or the number of iterations exceeds $c_{limit}$, according to an embodiment of the method. The result of an embodiment of the method is a weighted graph that leads to sufficiently large fidelities, with a small number of edges. According to an embodiment, this topological optimisation enables the scientific interpretation and understanding of results.

Benchmarking

According to an embodiment, the speed of the method has been compared with other approaches, using classes of high-dimensional multipartite states called Schmidt-Rank Vectors (SRV) as a benchmark. In particular, using the method according to an embodiment, the method can be used to discover maximally entangled three-party quantum states such as of up to ten local dimensions. As an example state can be $$|\psi\rangle = \frac{1}{2}(|0, 0, 0\rangle + |1, 0, 1\rangle + |2, 1, 0\rangle + |3, 1, 1\rangle).$$

This task is well understood theoretically, thus it represents a good benchmark. There are 81 unique entangled structures that could be generated using linear optics. A pure topological circuit search using 150 CPU-hours has discovered 51 out of 81 different states in the set. A reinforcement learning algorithm has identified 17 out of 81 different states, with speed comparable to a topological search algorithm. In contrast, according to an embodiment, the method discovers 76 different states within 2 hours, where the first 17 are identified within two seconds, and the first 51 states in less than 15 minutes. This results in a speed-up of a factor 600 according to an embodiment.

An embodiment of the method can be illustrated using a second benchmarking task: the identification of high-dimensional CNOT gates. The identification of the first photonic high-dimensional controlled operation can otherwise take 150,000 CPU-hours. According to an embodiment, the method finds a solution that is experimentally quantitatively simpler, within 1 CPU-second. This results in a speedup of a factor 108. FIG. 12 shows the method providing an example identification of quantum transformations according to an embodiment.

Scientific Discovery and Understanding

According to an embodiment, the method provides an improvement in speed and enables the discovery of new scientific targets and the development of new scientific insights and understanding. Scientific understanding is essential to the epistemic aims of science, but rarely addressed in applications of artificial intelligence to the natural sciences. In the philosophy science, pragmatic criteria have been found for scientific understanding. Scientists can understand a phenomenon if they can recognise qualitatively characteristic consequences without performing exact calculations. According to an embodiment, the method enables discoveries, such as the first high-dimensional six-photonic GHZ states, which have been conjectured to be not constructible with linear optics. According to an embodiment, the method generates a representation of the underlying concept and uses it to construct a simple method to generate high-dimensional GHZ states with an arbitrary number of photons. According to an embodiment, the method is used to discover the first solutions of heralded three-dimensional Bell states. According to an embodiment, the method provides an understand of the underlying concept, which, among others, contains an idea to destructively interfere vacuum terms. According to an embodiment, the method can be used to generalize the concept to arbitrary-dimensional Bell states—without additional calculations. According to an embodiment, the method provides experimental setups (e.g., optimized graph representations) for heralded GHZ states that need fewer resources than other methods, which could form the building blocks for photonic quantum computation. According to an embodiment, the method can be used on multiphotonic transformations. According to an embodiment, the method provides a new way to interpret and construct photonic qubit operations such as $C_{NOT}$ gates. According to an embodiment, the method enables the discovery of high-dimensional $C_{NOT}$ operations that need quantitatively fewer resources than other methods. According to an embodiment, the method provides the source of scientific understanding for multiple instances.

High-dimensional GHZ states—A d-dimensional n-partite GHZ quantum state is written as shown in function (11):

$$|\psi\rangle = \frac{1}{\sqrt{d}}\sum_{i=0}^{d-1}|i, i, i, \ldots\rangle \text{ where } i, i, i, \ldots \text{ continues } n \text{ times} \quad (11)$$

These states are studied in the interplay between quantum and local-realistic theories, and have found potential applications in quantum communication tasks.

Graph-theoretical arguments have shown that perfect high-dimensional GHZ states can be generated only for 4-photon states, because terms in addition to those in eq. (4) necessarily emerge. According to an embodiment, the method enables the discovery of the first example that circumvents the no-go theorem (see e.g., FIG. 10). According to an embodiment, the method identifies solutions with fidelities arbitrarily close to one, by adjusting the edge weights such that unwanted terms have arbitrarily small weights (albeit at the expense of lower count rates). According to an embodiment, the method provides a solution that can immediately be generalized to GHZ states (and other states) with higher dimensions and a larger number of particles, by identifying subgraphs of additional terms whose edges are multiplied with <1.

According to an embodiment, no further computations or optimisations are necessary, demonstrating that the method enables scientific understanding based on a computational optimisation in the appropriate representation of the problem at hand. According to an embodiment, the method enables and/or simplifies the computer representation of new quantum states.

Figure 10A:
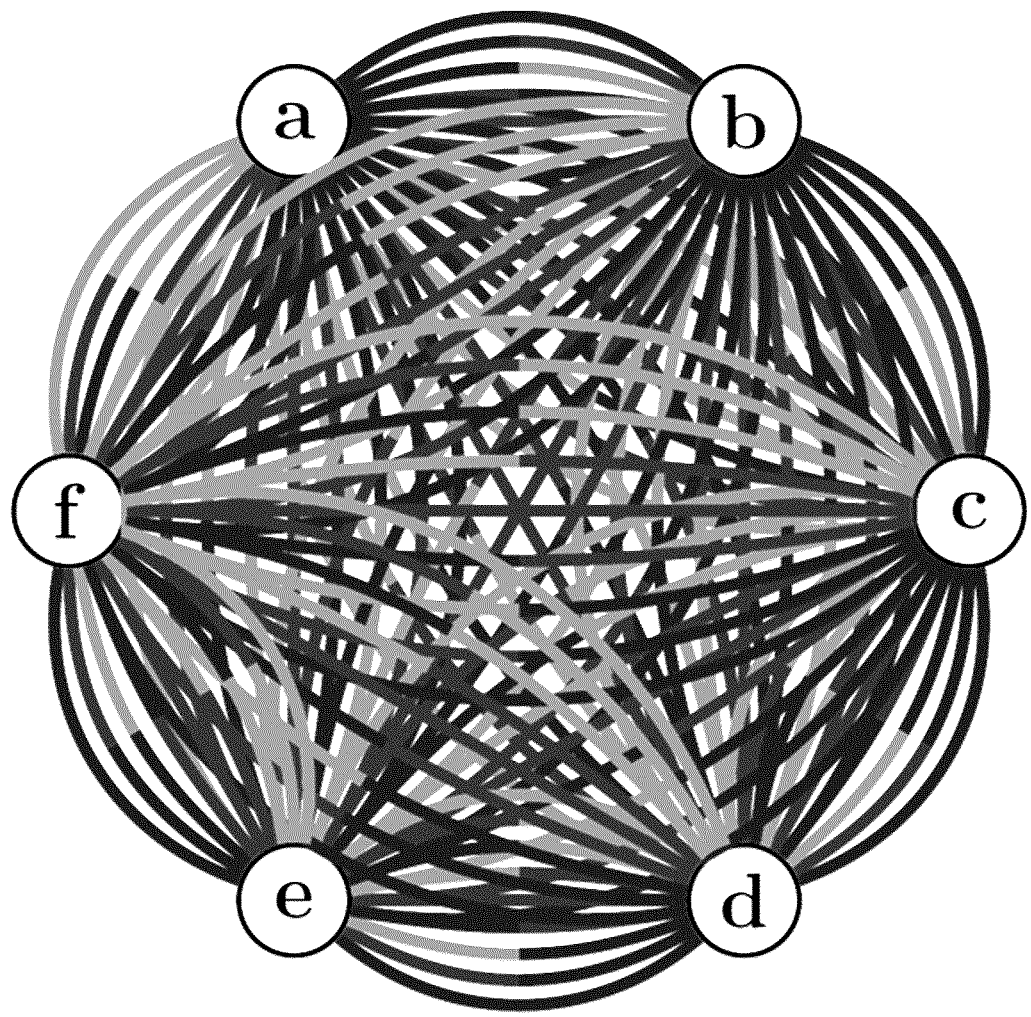
FIGS. 10(a) to (c) show a solution for a high-dimensional GHZ state according to some embodiments.
Figure 10B:
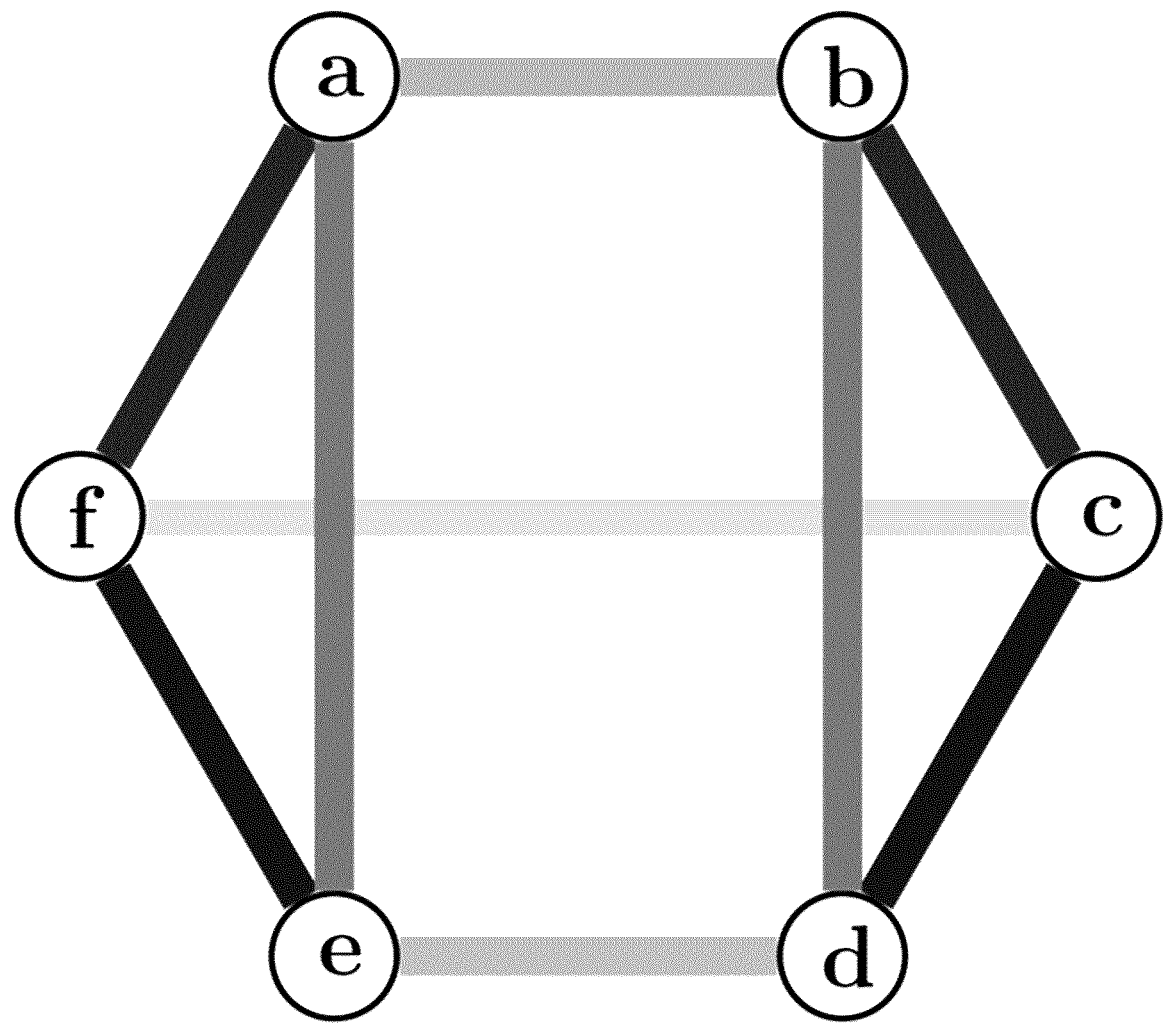
Figure 10C:
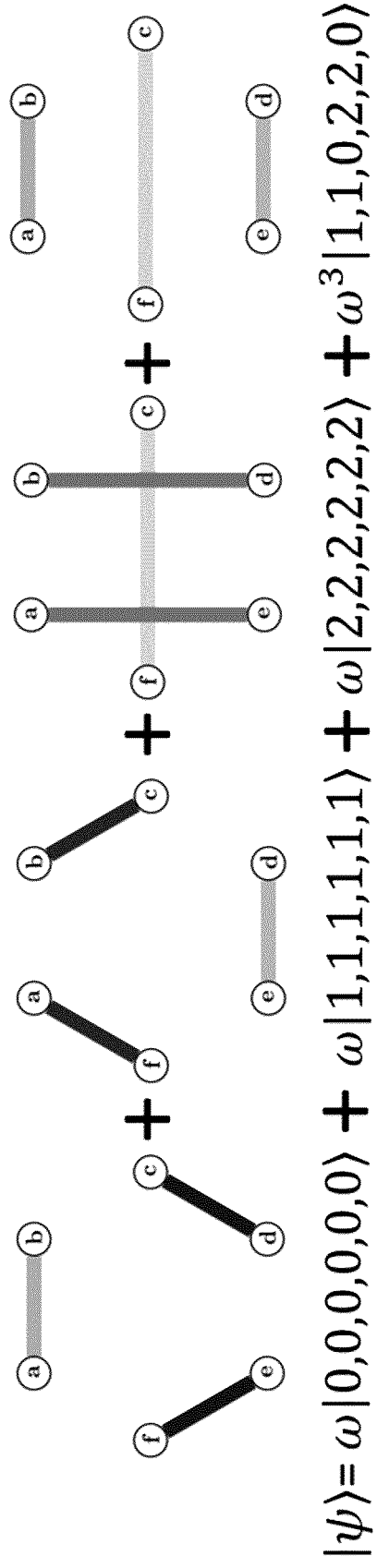

FIG. 10 shows the method according to an embodiment, where the method finds a 3-dimensional 6-photonic GHZ state such as shown in FIG. 10(b). FIG. 10(a) shows the initial state represented as a complete 3-dimensional graph of six vertices and three shades. Each pair of vertices is connected by nine edges, which stand for all nine possibilities (each of the three shades stands for modes 0,1,2, respectively). A bishaded edge stands for a photon pair with different mode numbers. For example, a first shaded-second shaded edge between vertex a and b stands for a photon pair with one photon in path a with mode number 0, and one photon in b with mode number 1, i.e., $a_0^\dagger b_1^\dagger$. In total, this corresponds to 135 edges. FIG. 10(b) shows the optimized graph generated by an embodiment of the method for a 6-photonic 3-dimensional GHZ state. While it has been shown that such a state cannot be created with perfect fidelity with linear optics and probabilistic photon-pair sources (without additional photons), the method according to an embodiment found a solution where the fidelity scales with $F \approx 1 - O(\omega^4)$ with the overall counts C scaling as $C \approx O(\omega^2)$, which is experimentally feasible. FIG. 10(c) shows that the method can be used to represent the concept of the solution, and the solution can be interpreted in the context of graph-theoretical results and can be immediately generalized by human scientists. According to an embodiment, the method is configured to represent various states for various numbers of photons as combinations of subgraphs. Each term of the solution can be represented by a weight of a subgraph of the graph, for example. According to an embodiment, the method represents a quantum state as a series of terms, where each term is the summation of the weights of each of the subgraphs of the graph after optimization by the method, where the weight of each subgraph is the product of each weight of each edge of the subgraph.

Heralded photonic entangled states—According to an embodiment, the method can be used to represent heralded entangled photonic states. Standard sources of photonic entanglement such as spontaneous parametric down-conversion or spontaneous four-wave mixing, are entirely probabilistic. That means that photons are produced at random times, and only after the detection of the photon state, one knows that they have been created. The generation of heralded states would allow for event-ready schemes, which are very important in photonic quantum computation. Experimentally, two-dimensional Bell states have been generated conditioned on the detection of photons in four trigger detectors. However, higher-dimensional generalizations implementations are missing. A major challenge in creating heralded states are cases where all trigger detectors see a photon, but no photons emerge from the setup. Those cases, where the triggers herald a vacuum term, usually have significantly higher probability of happening than the correct heralded Bell state because fewer pair creation events need to occur simultaneously.

Figure 11A:
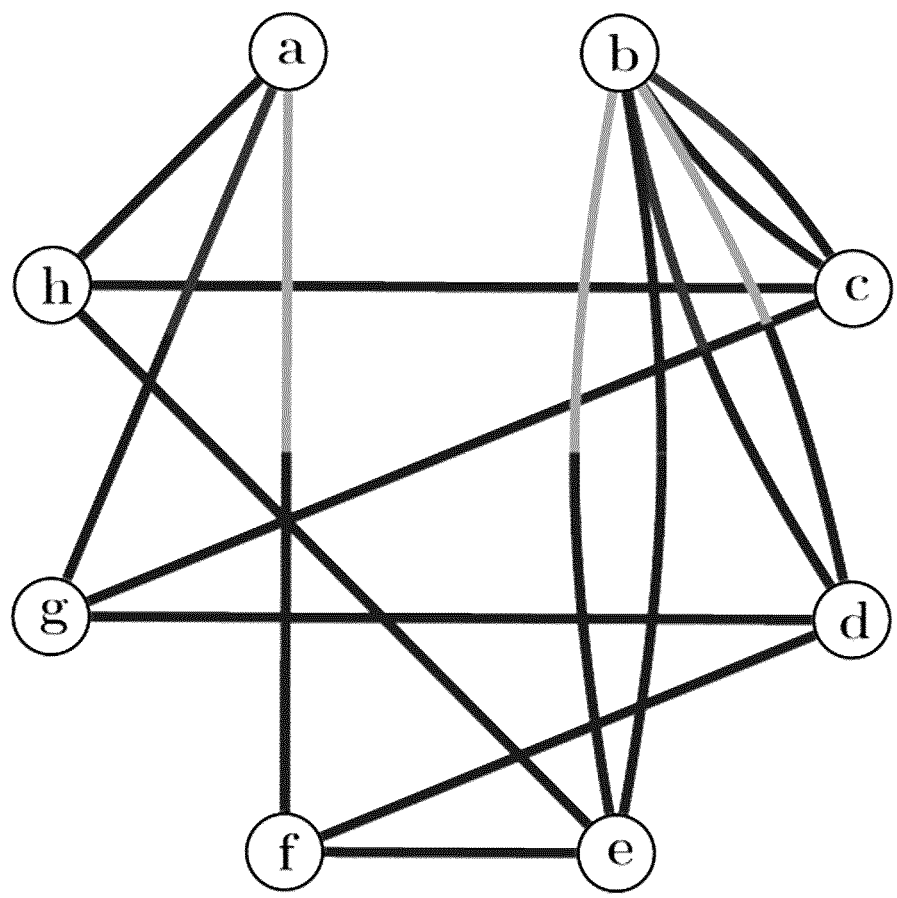
FIGS. 11(a) to (h) shows various Bell and GHZ states according to some embodiments.

According to an embodiment, the method identifies experiments for heralded 3-dimensional Bell state as shown in FIG. 11(a). For example, according to an embodiment, the method is configured to represent a 3-dimensional Bell state such as $|\Psi\rangle = 1/\sqrt{3}(|0,0\rangle + |1,1\rangle + |2,2\rangle)$ as a graph such as shown in FIG. 11(h), and the method is configured to optimize same to a graph as shown in FIG. 11(a). According to an embodiment, FIG. 11(a) depicts a heralded 3-dimensional Bell state, FIG. 11(b) depicts vacuum destructively interferes, FIG. 11(c) depicts Bell state terms constructively interfere, FIG. 11(d) depicts cross-correlations destructively interfere, FIG. 11(e) depicts 3-dimensional generalisation, FIG. 11(f) depicts 5-dimensional generalisation, and FIG. 11(g) depicts a heralded 3-photon Greenberger-Horne-Zeilinger state.

According to an embodiment, the setup uses four photon-pair events simultaneously, which is well within today's experimental capabilities. The solution enables technology that not been explored before: The destructive interference of the triggered vacuum term as shown in FIG. 11(b). Creating the possibility of two heralded vacuum outputs and assigning their amplitudes opposite signs leads to their cancellation.

Figure 11B:
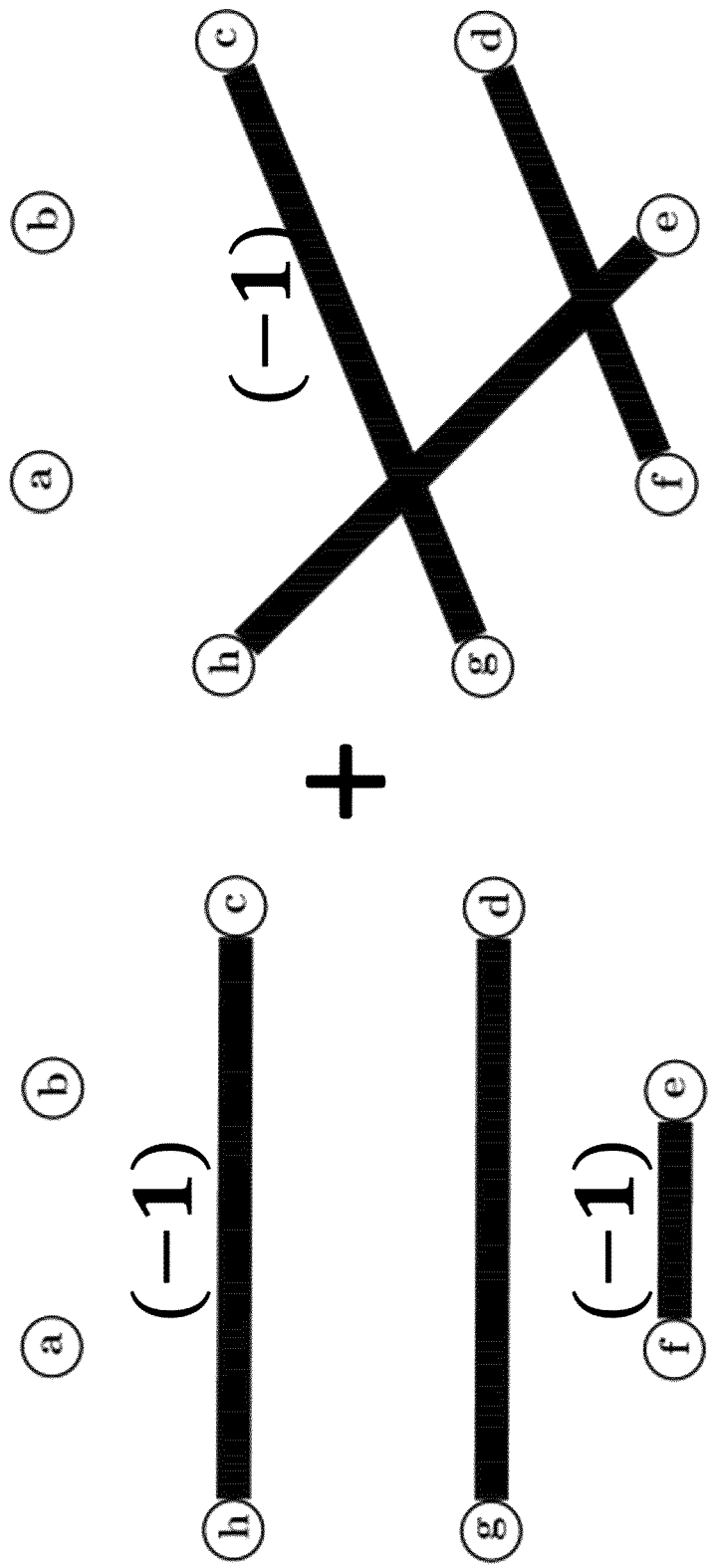
Figure 11C:
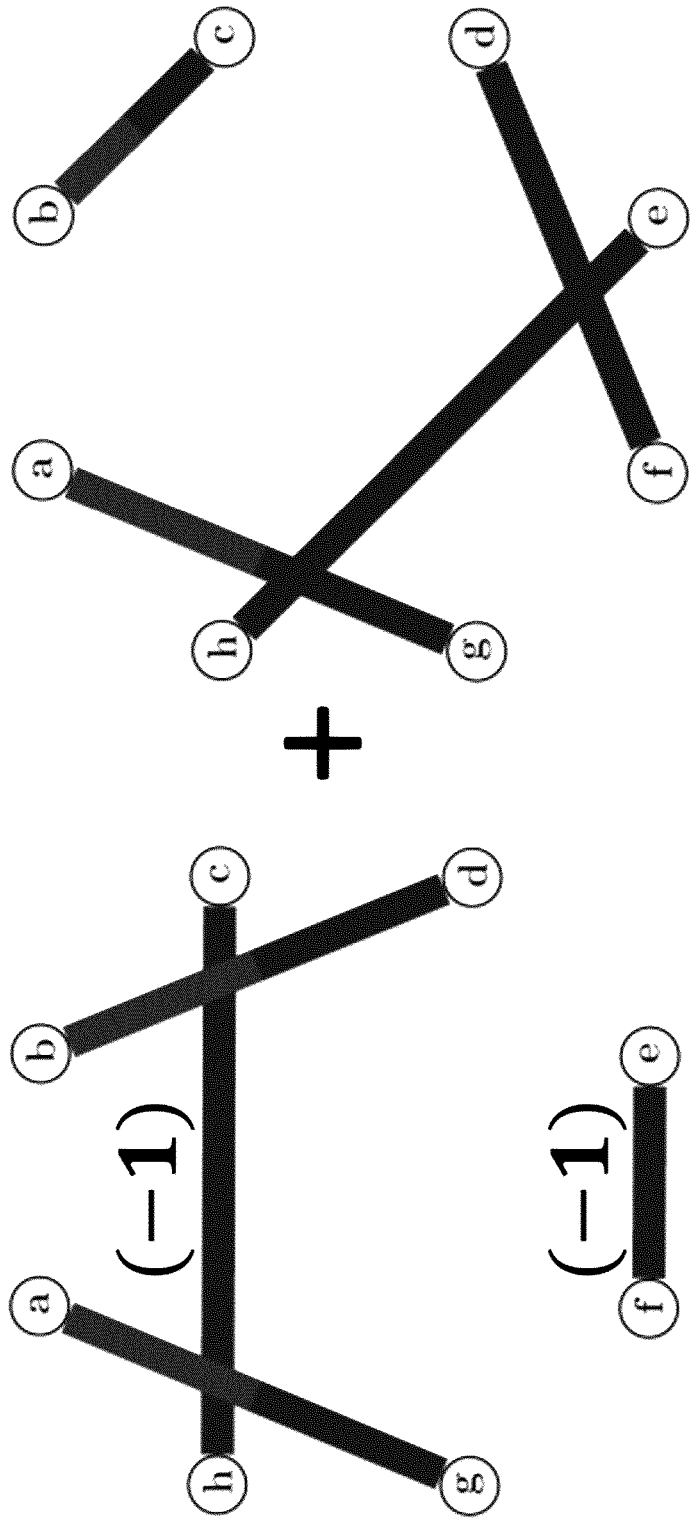
Figure 11D:
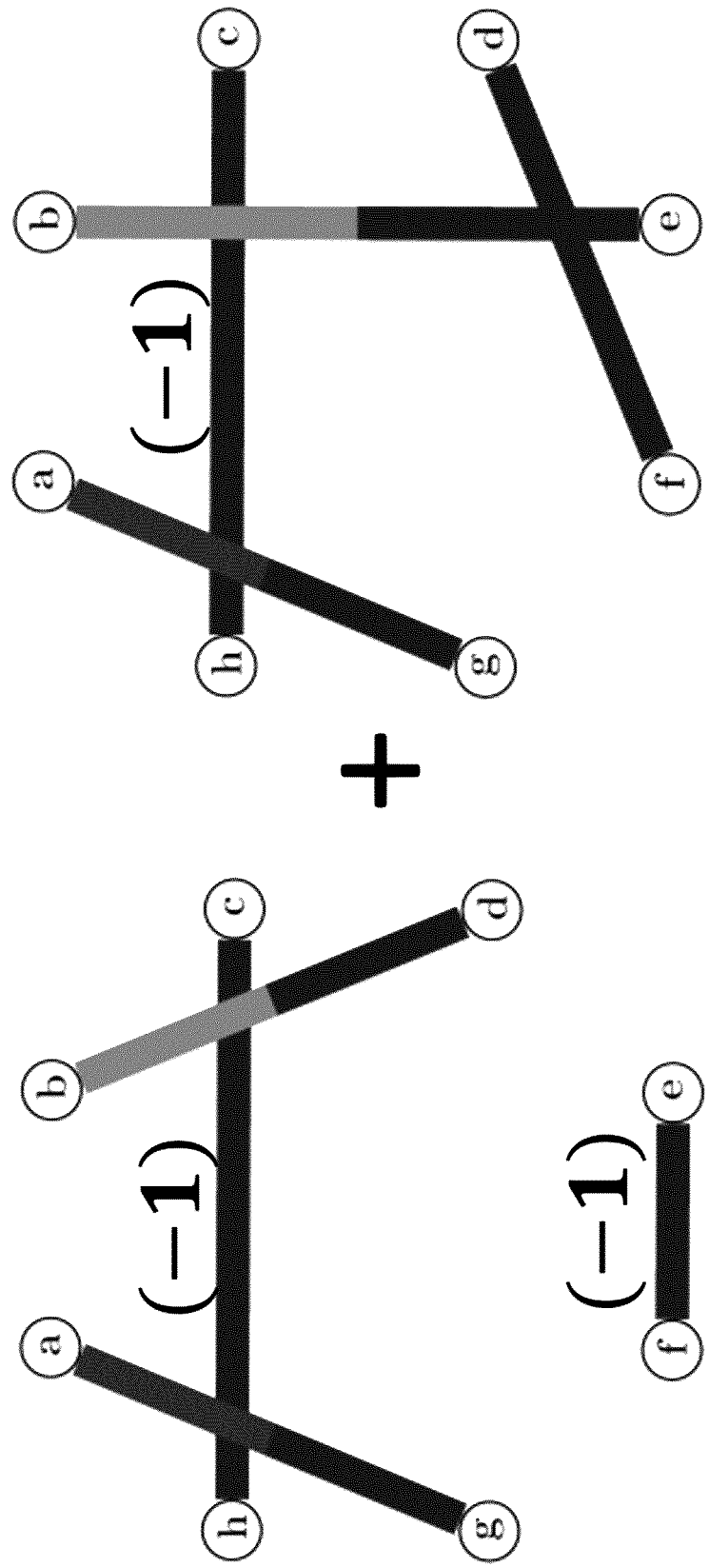
Figure 11E:
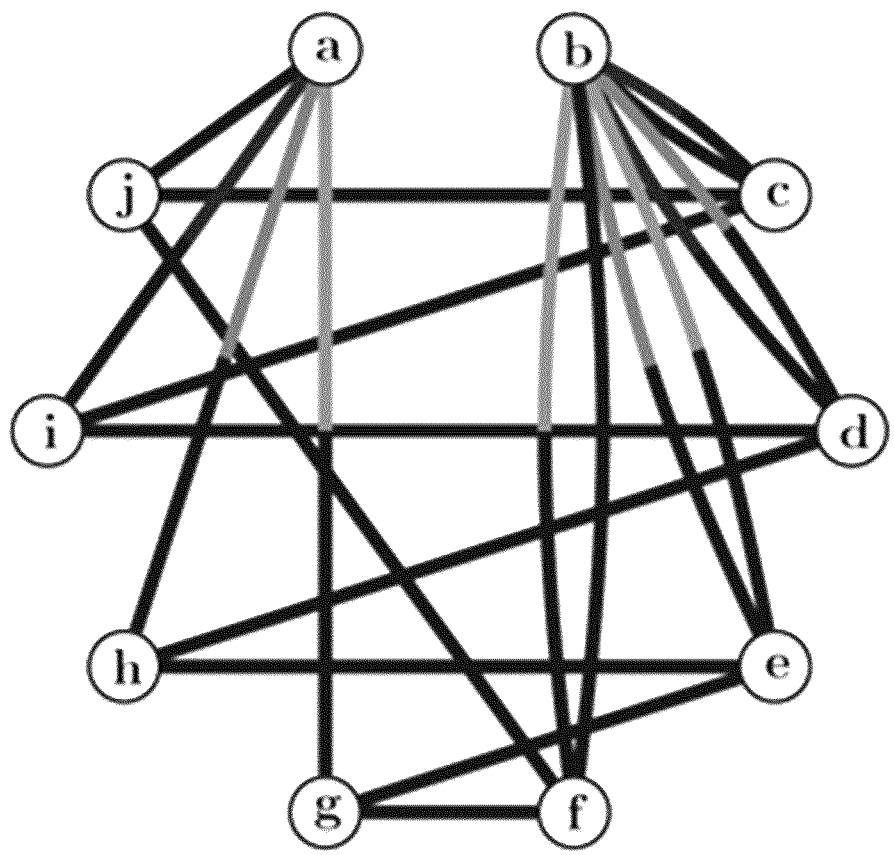
Figure 11F:
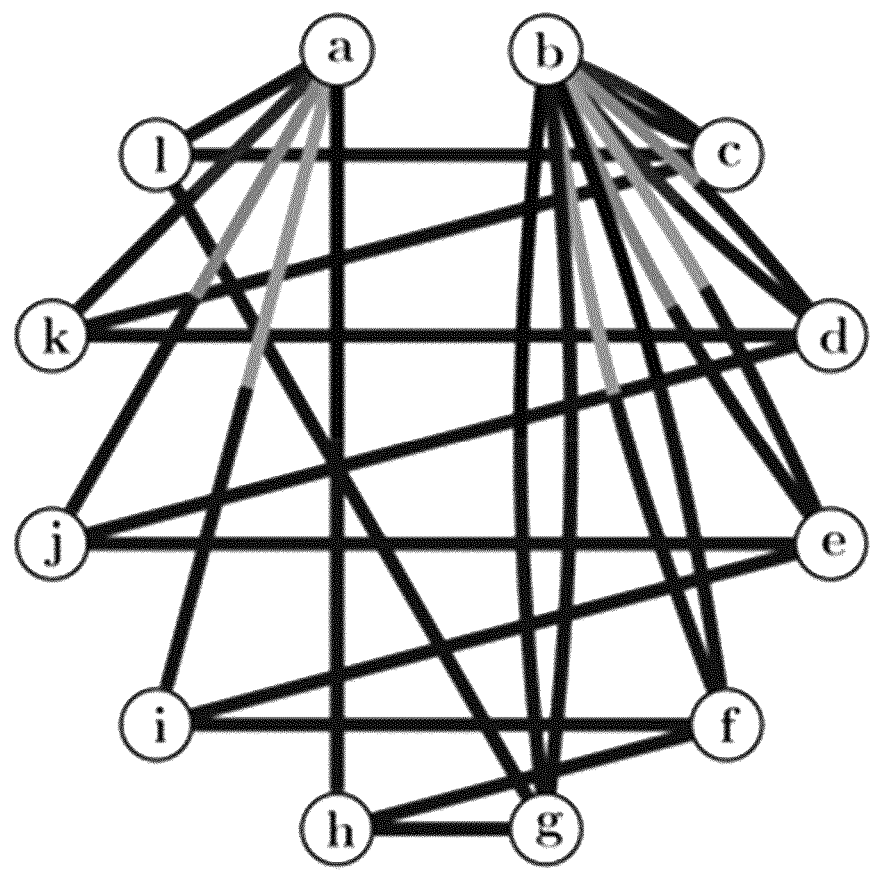
Figure 11G:
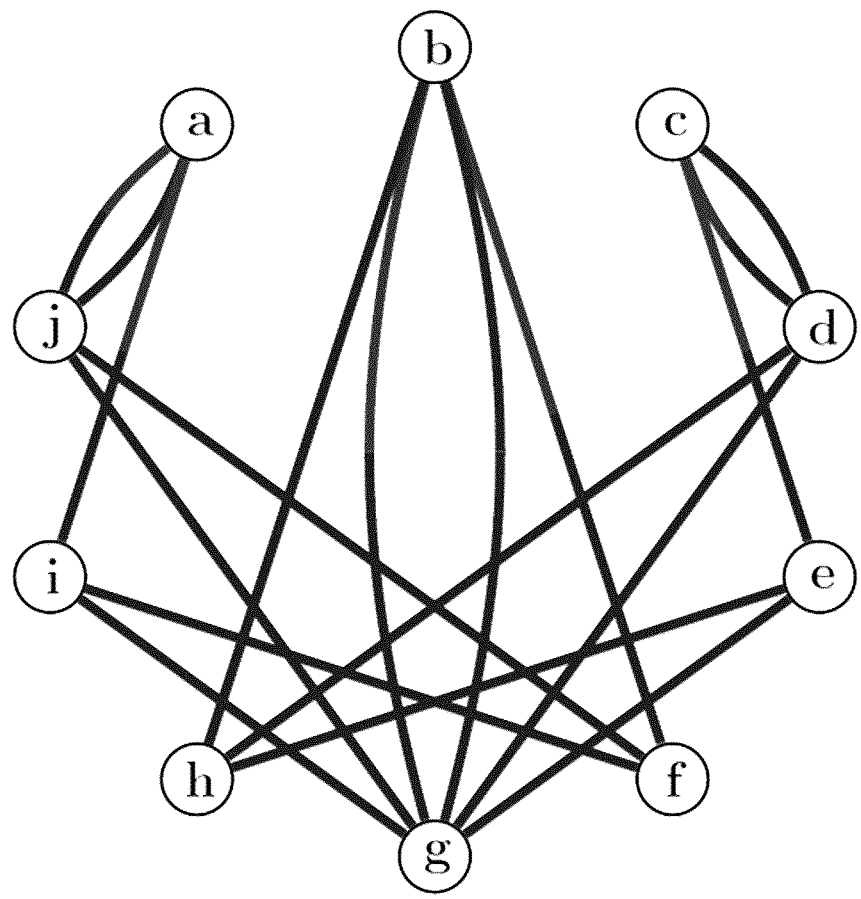
Figure 11H:
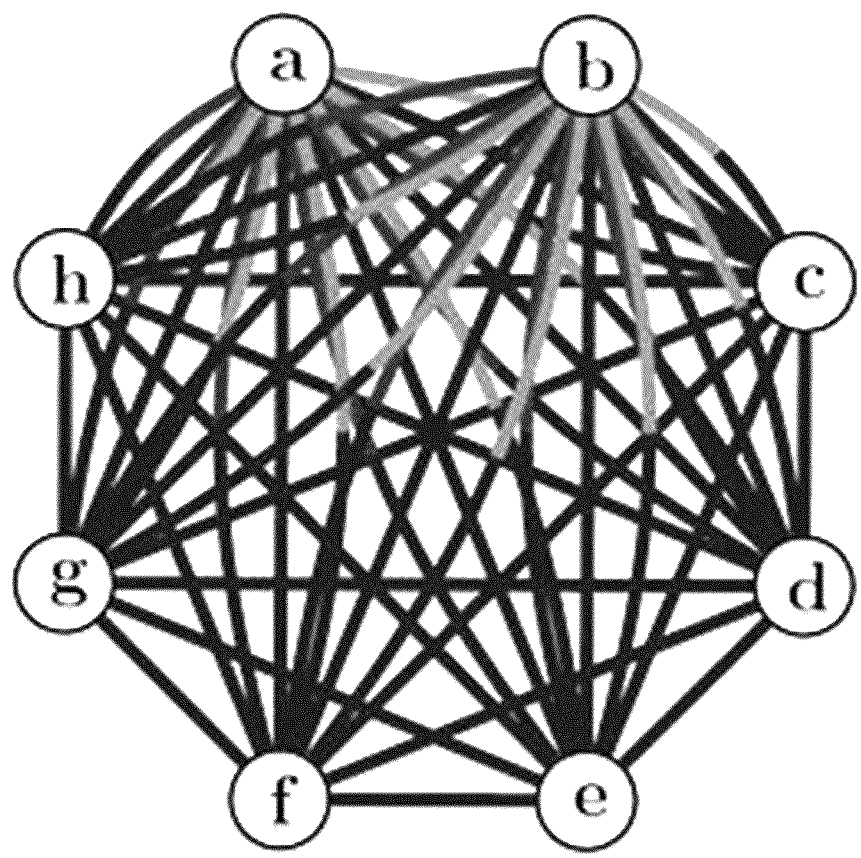

Furthermore, each of the two subgraphs that lead to a vacuum term in FIG. 11(b) forms the basis of a 3-dimensional Bell-state which constructively interfere while all cross-correlations destructively interfere. Higher-order events and cases where multiple photons are detected in the trigger detectors can be reduced to arbitrarily low probabilities by adjusting the weights of the edges according to an embodiment of the method. Assuming a standard pump laser with 80 MHz repetition rate, the expected count rate to reach a fidelity that guarantees genuine 3-dimensional entanglement, i.e., $F>\frac{2}{3}$, is on the order of ten per second. According to an embodiment, the method, in particular the cancellation of vacuum, can be immediately generalized to other cases, for example, to arbitrary high-dimensional Bell states such as shown in FIGS. 11(e) and 11(f).

According to an embodiment, the method provides representation and allows the computer to find heralded multiphotonic states which have been proposed a decade ago, but never before experimentally implemented due to their experimental requirements. Heralded GHZ states provide the resources for definite demonstration of deterministic violations of local-realistic worldviews and are among the most promising building blocks for photonic quantum computation. According to an embodiment, the method provides an experimental configuration, which requires fewer resources and which is within reach of experimental capabilities, as shown in FIG. 11(g). The solution provided by the method according to an embodiment is highly symmetric, and uses a very similar concept to avoid lower-order contributions as the solution of the Bell state. In this case however, the problematic lower-order event creates single-photon outputs. According to an embodiment, the method generates two subgraphs for each single-photon output with opposite phase which destructively interfere.

Photonic Controlled-Gates—According to an embodiment, the method can be used to represent photonic quantum transformations, which are essential elements for photonic quantum simulation and computation schemes. As shown in FIG. 12, according to an embodiment, the method provides virtual vertices that represent input photons, and optimizes multiple dependent graphs simultaneously that represent different states of the transformation. According to an embodiment, the method can be used for photonic CNOT experiments, which provides a new interpretation.

FIG. 12 shows graphs represented by the method according to an embodiment, where the graphs represent qubit $C_{NOT}$ transformation. According to an embodiment, the method represents graphs representing two input photons (denoted as Va and Vb) that undergo a $C_{NOT}$ operation, and output in path a and b, conditioned on the simultaneous detection of one photon in each of the trigger paths c and d. This example goes beyond state generation and shows how the method according to an embodiment allows determination and identification of quantum transformations. According to an embodiment, the method can represent virtual vertices Va and Vb, which can represent incoming photons. Edges between a virtual vertex and vertices a-d (in all graphs together) represent unitary transformations of the incoming photon. For example, if Vb=|0⟩, the photon goes to path c, while for Vb=|1⟩, it goes to path d. The $C_{NOT}$ consists of four individual transformations (one for each of the inputs |0, 0⟩, |0, 1⟩, |1, 0⟩, |1, 1⟩). Each transformation is represented by one graph and the subgraph of vertices a-d stays constant for each transformation. The four graphs in FIGS. 12(a), 12(b), 12(c), and 12(d) represent the solution of an inverse-design for a two-qubit $C_{NOT}$, as represented by the method according to an embodiment. The quantum state in the output of a,b (after conditioning on the trigger detectors c,d) is represented by the method or governed by all subgraphs that fulfil the following conditions: 1) contains three edges (two edges from incoming photons, and one ancillary photon pair); 2) each of the virtual vertices Va and Vb is contained in one edge (that represents that one photon is entering the setup); and 3) both c and d are contained in an edge (such that the two triggers detect a photon in path c and d). According to an embodiment, each constrained subgraph→term in |Ψ⟩. The solution represented by the method according to an embodiment can be conveniently interpreted: No vertex can have two incoming edges (as follows from the three conditions). Therefore, an edge involving Va or Vb block all edges at the other vertex of the edge, which significantly simplifies the interpretation of the graphs. The resulting terms are written in FIGS. 12(e), 12(f), 12(g), and 12(h). From the solution represented according to the method according to an embodiment, an interesting concept is represented: If Va=|0⟩, the edge involving Vb chooses the outgoing term by blocking the appropriate edge. However, if Va=|1⟩, the double edge between a and b is active—as the weight $\omega_{Va,a}^{1,1}=(-1)$, Vb chooses the term that will destructively interfere. According to an embodiment, the method provides a representation that illustrates having one virtual vertex choose the terms, and this can be generalized to more complex multi-qubit transformations.

Figure 12A:
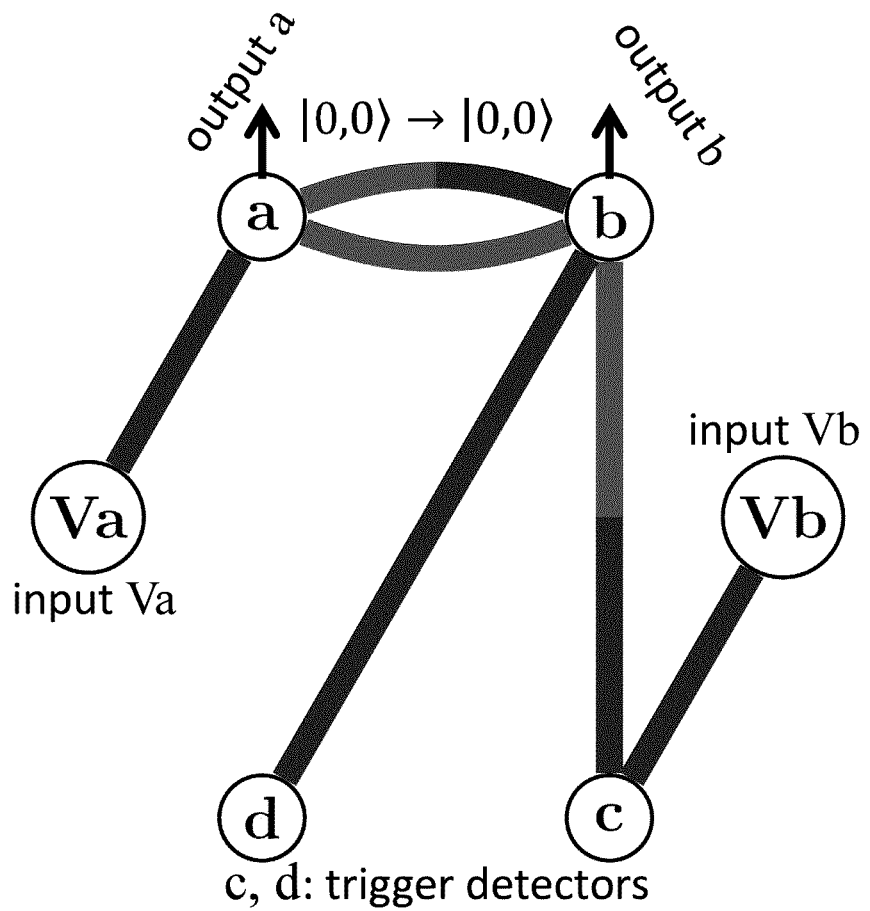
FIGS. 12(a) to (h) show a solution for a 2-dimensional CNOT according to some embodiments.
Figure 12B:
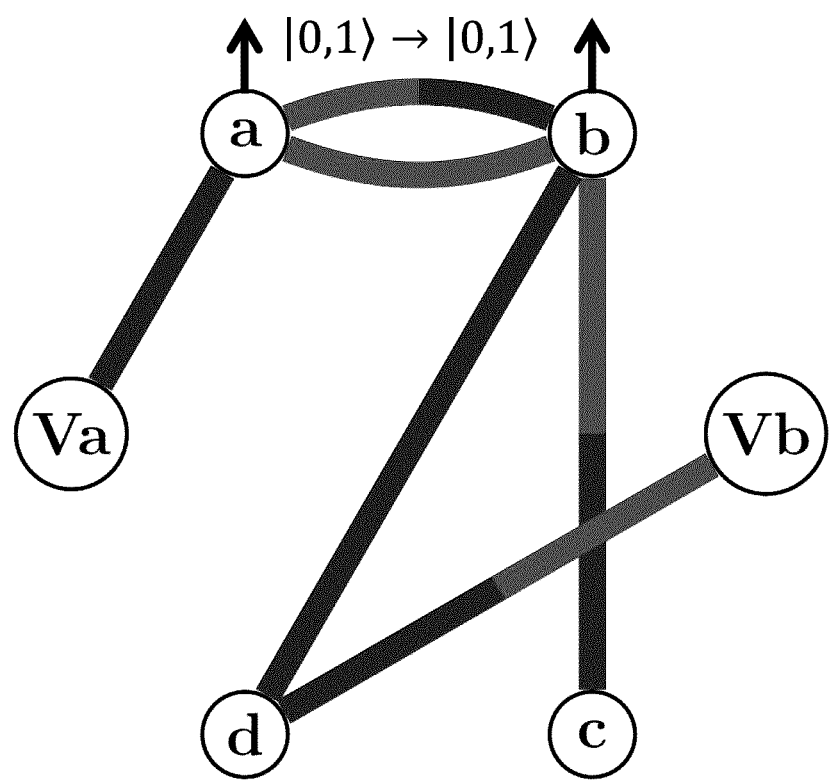
Figure 12C:
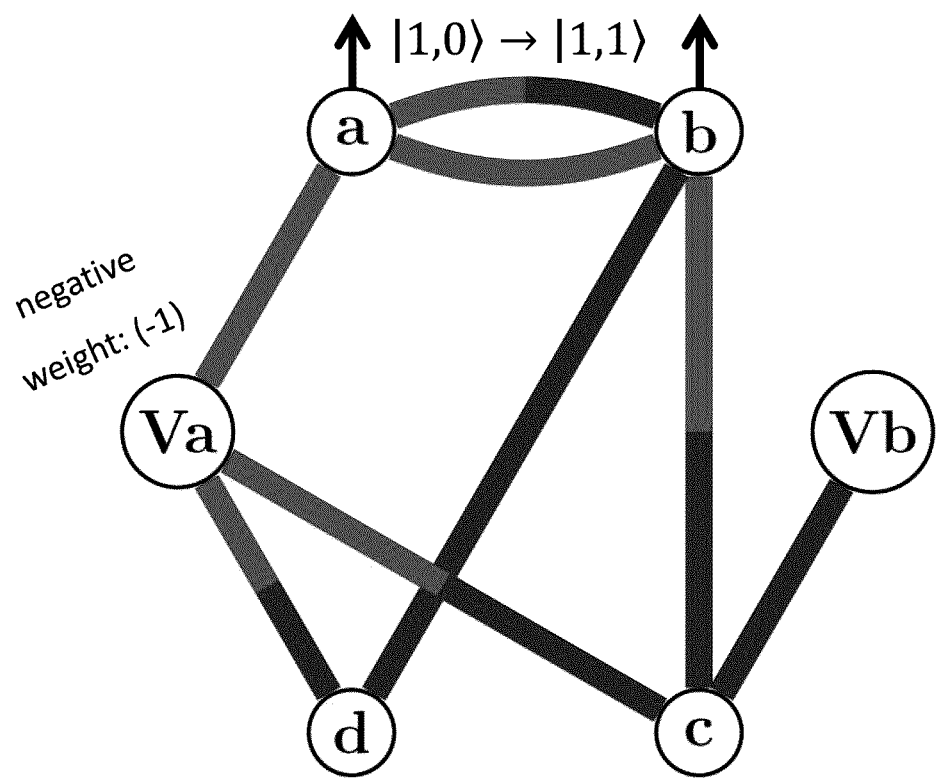
Figure 12D:
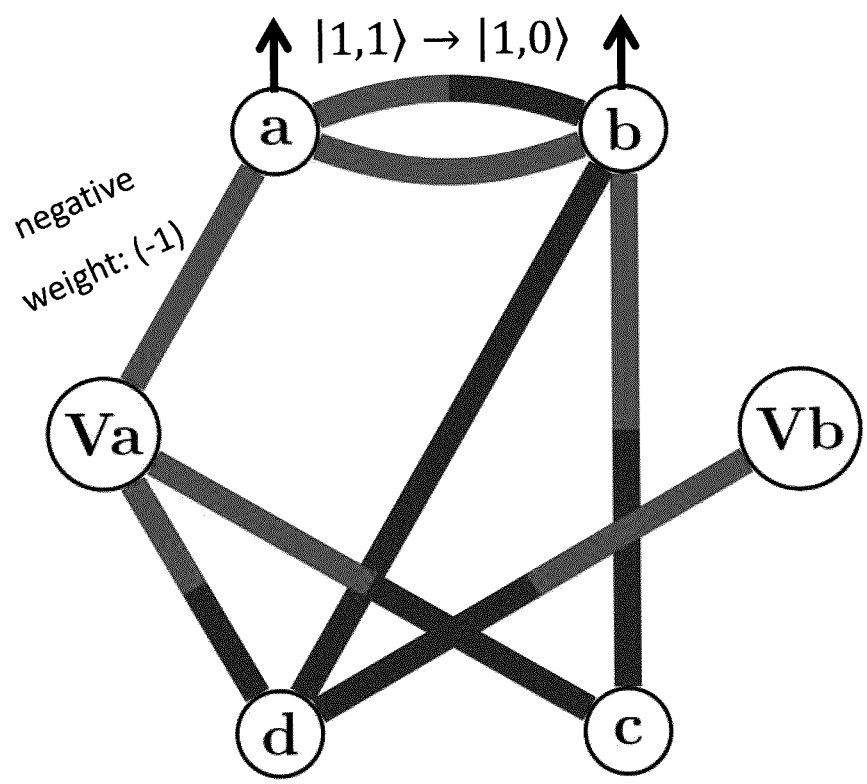
Figure 12E:
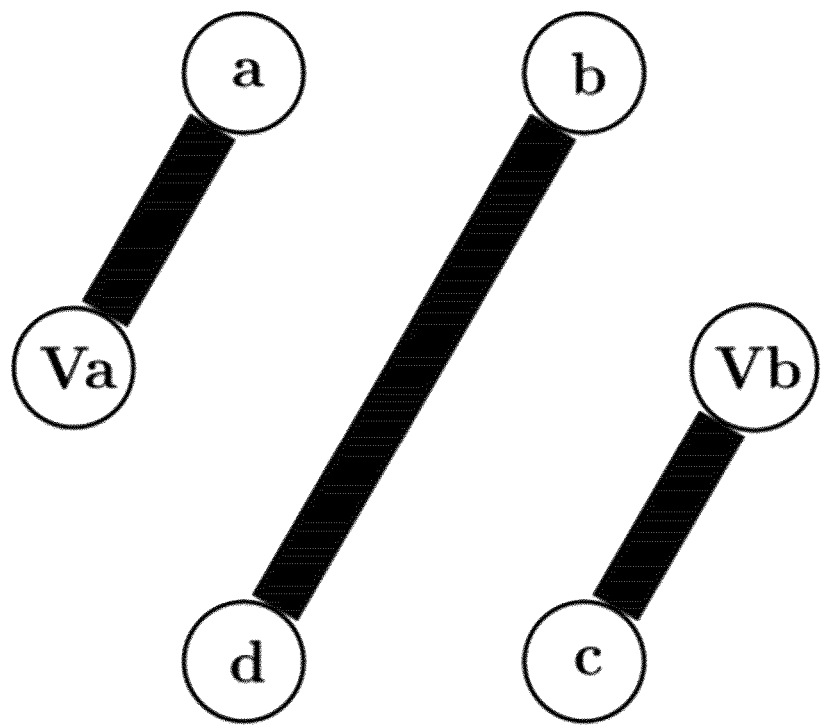
Figure 12F:
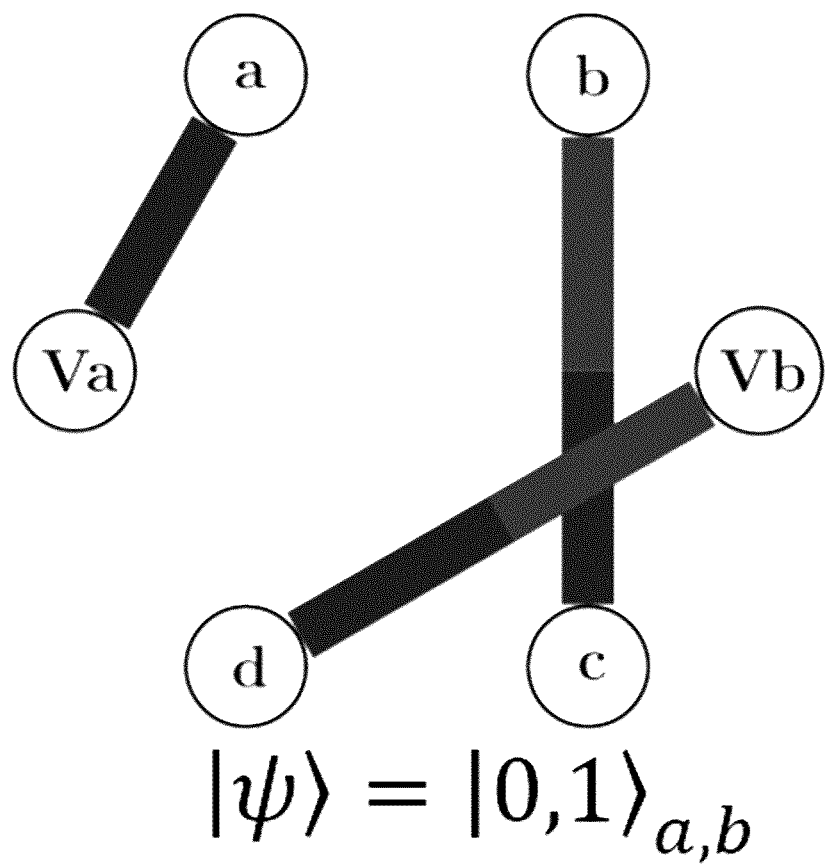
Figure 12G:
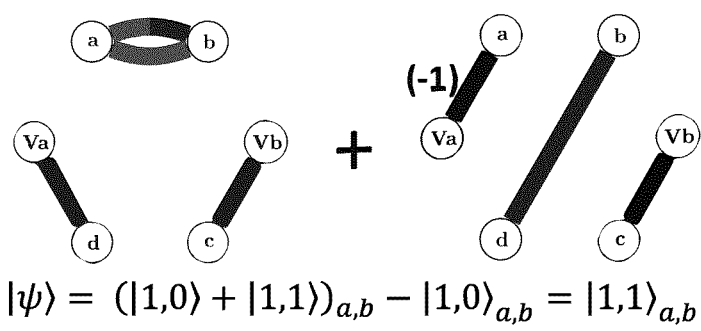
Figure 12H:
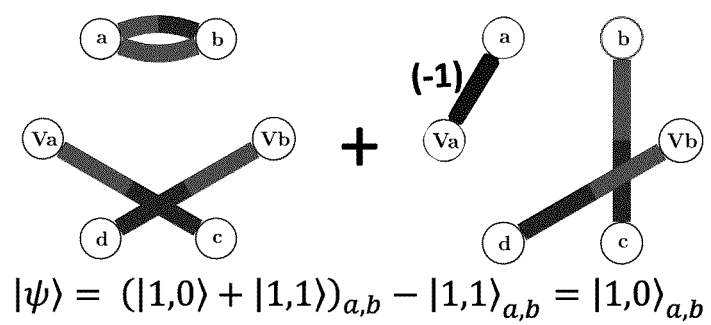

According to an embodiment, FIG. 12(a) shows a graph with subgraph 12(e); FIG. 12(b) shows a graph with subgraph FIG. 12(f); FIG. 12(c) shows a graph with subgraphs in FIG. 12(g); and FIG. 12(d) shows a graph with subgraphs in FIG. 12(h). The left subgraph in FIG. 12(g) shows case 1 (two terms), while the right subgraph in FIG. 12(g) shows case 2. The left subgraph in FIG. 12(h) shows case 1 (two terms), while the right subgraph in FIG. 12(h) shows case 2.

According to an embodiment, the method can be applied to identify or find high-dimensional quantum transformations, such as for the context of resource-efficient quantum computation algorithms. The solution represented by the method according to an embodiment follows similar concepts as the two-dimensional case, and requires fewer experimental resources.

FIG. 11 shows heralded entangled states depicted according to an embodiment of the method. FIG. 11(a) shows an optimized graph generated by the method according to an embodiment for a heralded 3-dimensionally entangled Bell state with photon in a and b containing a Bell state if detectors in c-h click, which requires eight photons in total. The crucial insight enabled by the method is the destructive interference of the undesired heralded vacuum term. FIG. 11(b) shows each of the two subgraphs herald the vacuum. The overall weight of the two subgraphs differs only in sign leading to destructive interference. FIG. 11(c) shows that with the same phase setting, all terms of the Bell state constructively interfere, such as |1, 1⟩, and all cross-correlation terms cancel, such as |1, 2⟩, as shown in FIG. 11(d). This solution can immediately be generalised to arbitrary high-dimensional Bell states, as shown in FIGS. 11(e) and 11(f). FIG. 11(g) shows a solution provided by an embodiment of the method for a heralded 2-dimensional GHZ state in a, b, c, with triggers in d-j, requiring 10 photons. According to an embodiment, the method identifies a highly symmetric solution that destructively interferes 8-photon contributions which heralds the trigger.

According to an embodiment, the method provides for the inverse-design of quantum optical experiments, which is based on a physics-inspired representation. According to an embodiment, the method enables the discovery of several previously unknown experimental configurations of quantum states and transformations in the challenging high-dimensional and multi-photonic regime, such as generation of high-dimensional GHZ states, heralded entangled quantum states, high-dimensional controlled operations. Those experimental setups can lead to fascinating experimental investigations of fundamental questions and technological advances. According to an embodiment, the method can be applied to discover a multitude of other targets in experimental quantum optics, such as tools to enable silicon-photonics quantum computation or highly efficient, low-noise quantum entanglement sources. It can also directly be applied to situations where the target state is not known beforehand, such as for applications in quantum metrology or in quantum-enhanced microscopes and telescopes. According to an embodiment, the method provides for an internal representation that is directly connected to creation and annihilation operators, which are universally applicable in quantum physics. Accordingly, according to an embodiment, the method can further be generalized to a much larger scope.

According to an embodiment, the method provides for the generation of improved representations such as of quantum states, where the representation is advantageously configured to enable extraction of scientific understanding from computer-inspired designs. According to an embodiment, the method advantageously implements topological optimisation that reduces the solutions to conceptual cores. According to an embodiment, those minimal topologies allow for the interpretation and generalizations of the discovered solution, without performing additional calculations. According to an embodiment, the method provides for an improvement in a computer method of generating representations such as of quantum states that previously could not be determined or represented by the computer. This is in accord with criteria from the philosophy of science that argue that scientific understanding is connected with the skill to use concepts fruitfully, without exact calculations. Hence, in a broader sense, we argue that the ability of our algorithm goes beyond optimisation, and enters the realm of providing scientific insights that remove previous computer limitations and allow for scientific understanding. Thereby, it directly contributes to scientific, explainable AI (XAI), and in general, to the essential aim of science.

For example, as discussed herein, according to an embodiment, the method provides computational speedups such as for determining and computationally representing maximally entangled three-party quantum states such as of up to ten local dimensions, as well as for determining and computationally representing high-dimensional $C_{NOT}$ gates and in a simpler representation. As a further example, as discussed herein, according to an embodiment, the method enables the computer to determine, generate and represent high-dimensional states (e.g., GHZ states) with higher dimensions and a larger number of particles than previously possible by computers. As a further example, as discussed herein, according to an embodiment, the method importantly enables and determines a solution and representation for a heralded 2-dimensional GHZ state in a, b, c, with triggers in d-j, requiring 10 photons as shown by example in FIG. 11(g). As this state is the resource state for photonic quantum computations, an ability to determine and represent this state as newly provided according to an embodiment of the method is a highly valuable advance in quantum computing.

Graph Representation Implemented as Experimental Building Blocks

According to an embodiment, the method is configured for implementation of the graphs (such as representing various quantum states or experiments) using various systems as described herein. Various example systems are described as follows according to an embodiment.

FIG. 13 shows a graph according to an embodiment of the method to represent experiment translation for individual edges. Designing quantum optical experiments using the graph notation is possible using the method according to an embodiment because the method according to an embodiment provides translations of graphs into several different experimental schemes. Edges between vertices a and b are mapped to or represent probabilistic photon sources, such as shown in FIGS. 13(a), 13(b), 13(c), 13(d), 13(e), and 13(f).

Figure 13A:
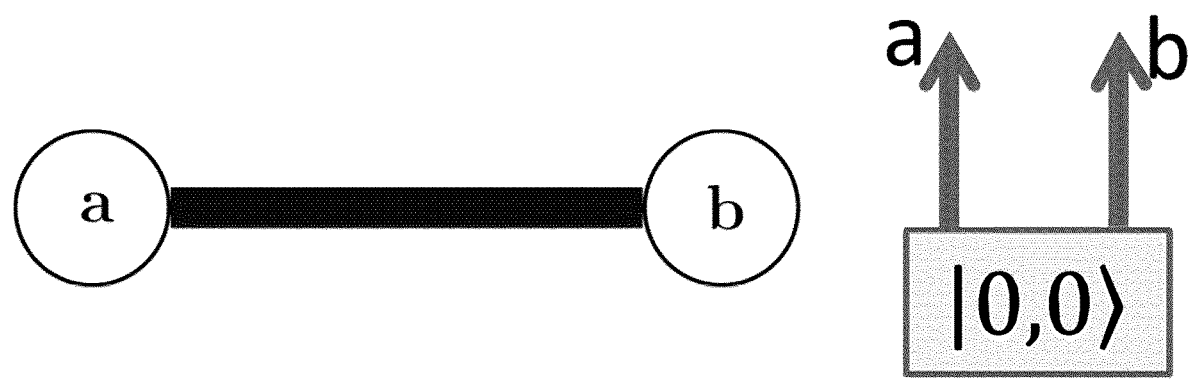
FIGS. 13(a) to (g) show a concrete experimental implementation of the graph-representation according to some embodiments.
Figure 13B:
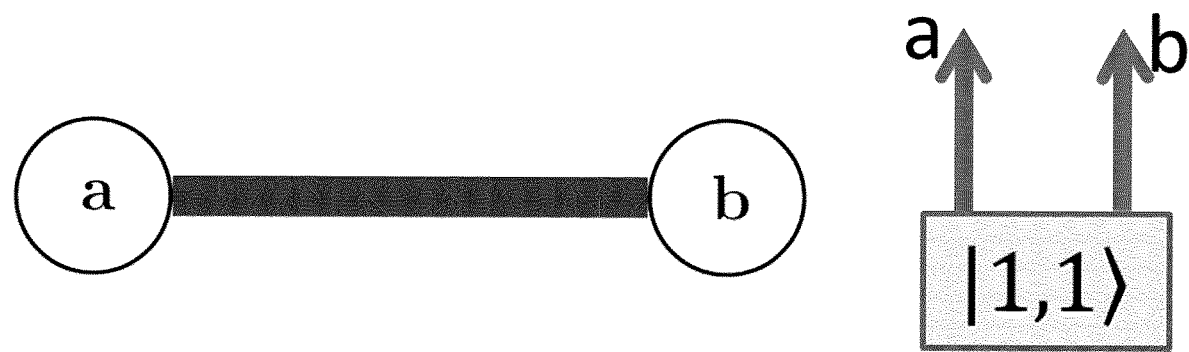
Figure 13C:
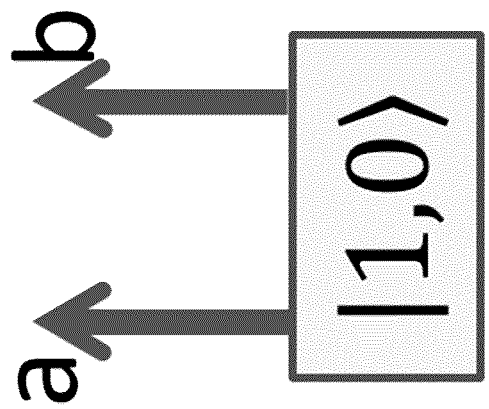
Figure 13C:
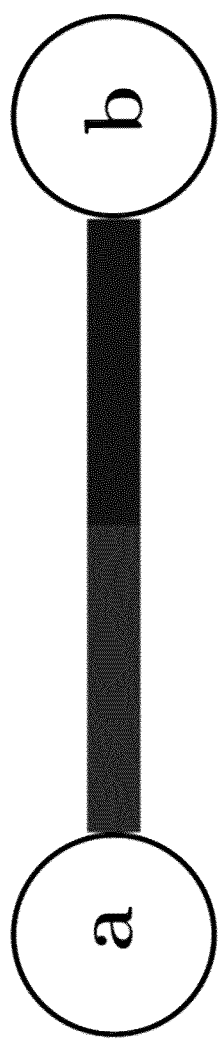
Figure 13D:
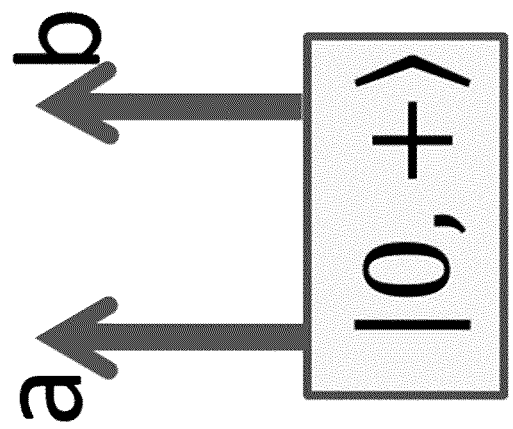
Figure 13D:
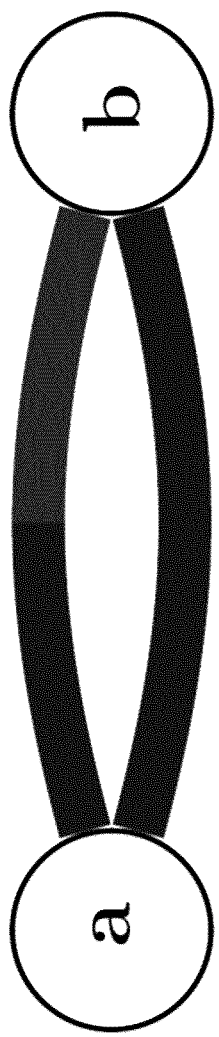
Figure 13E:
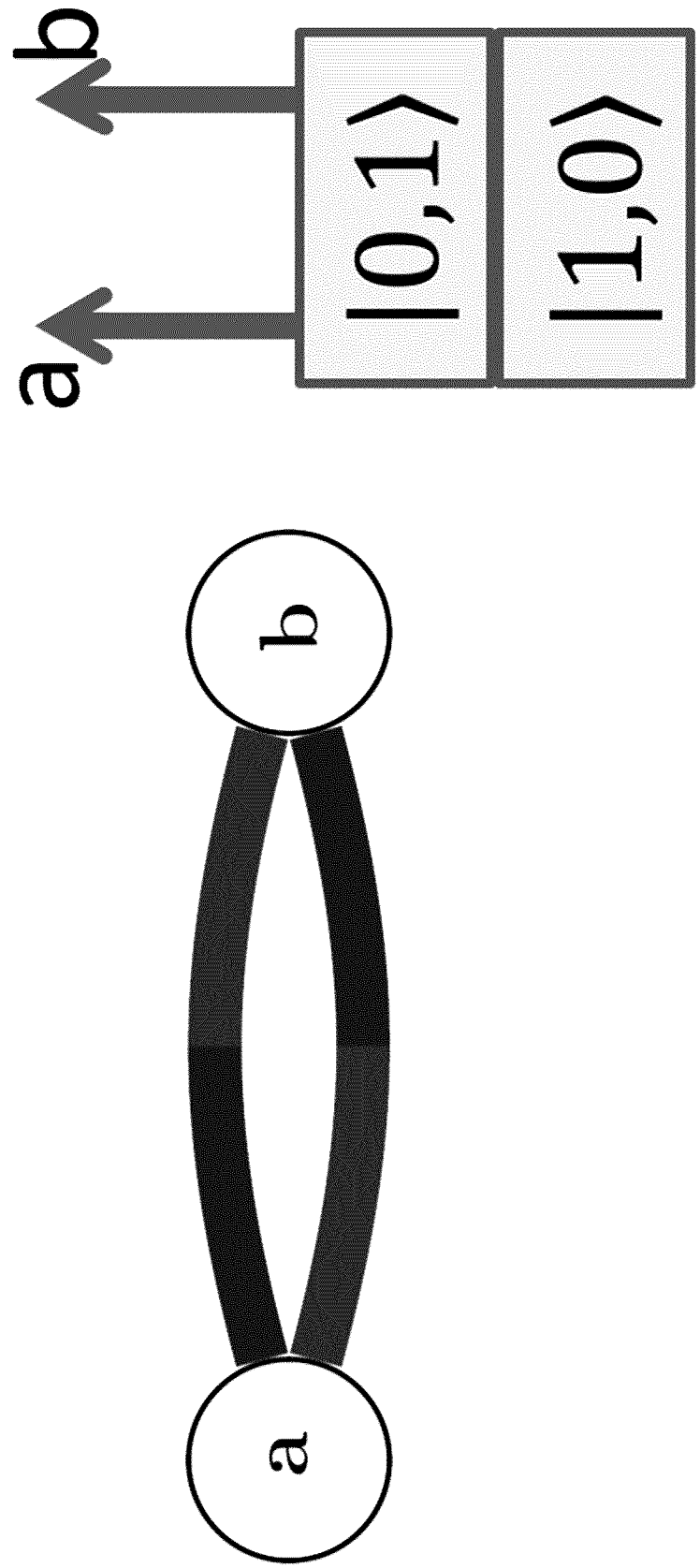
Figure 13F:
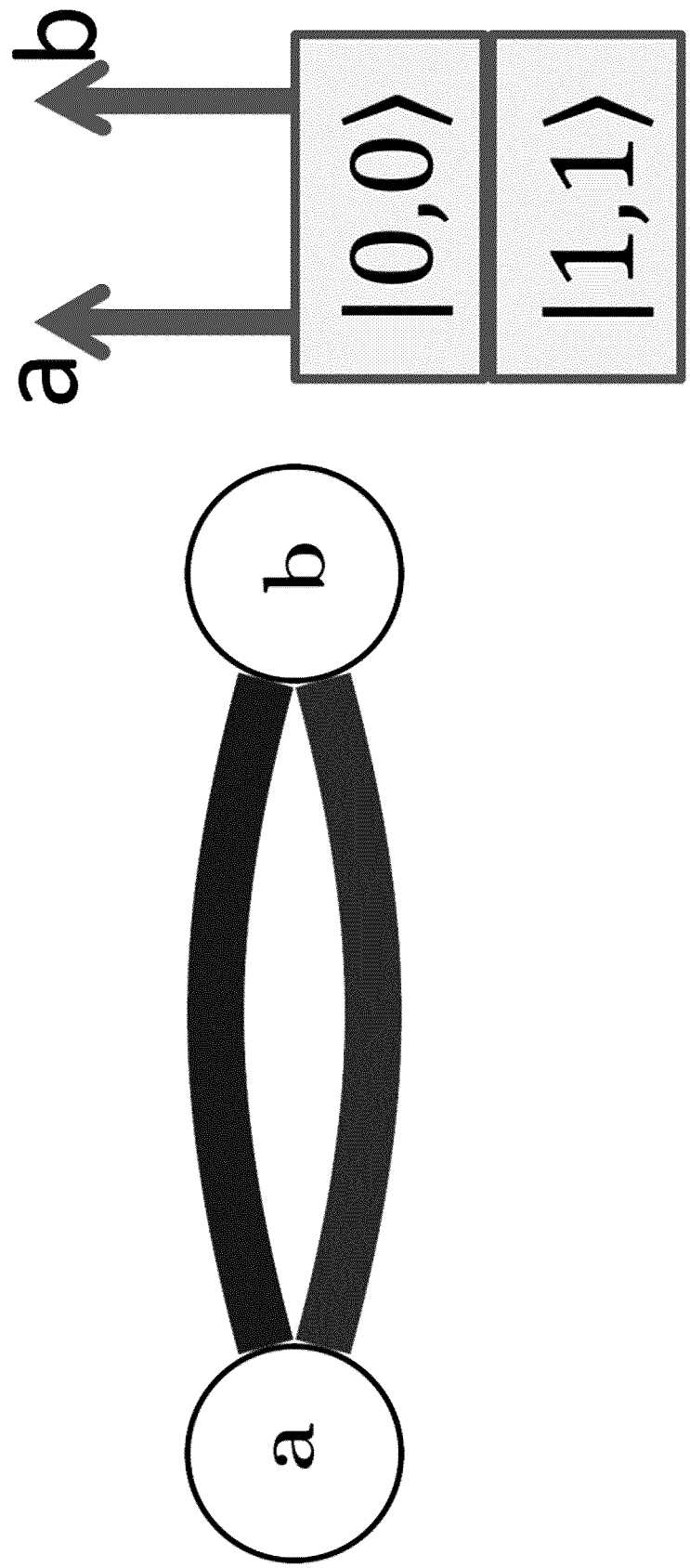
Figure 13G:
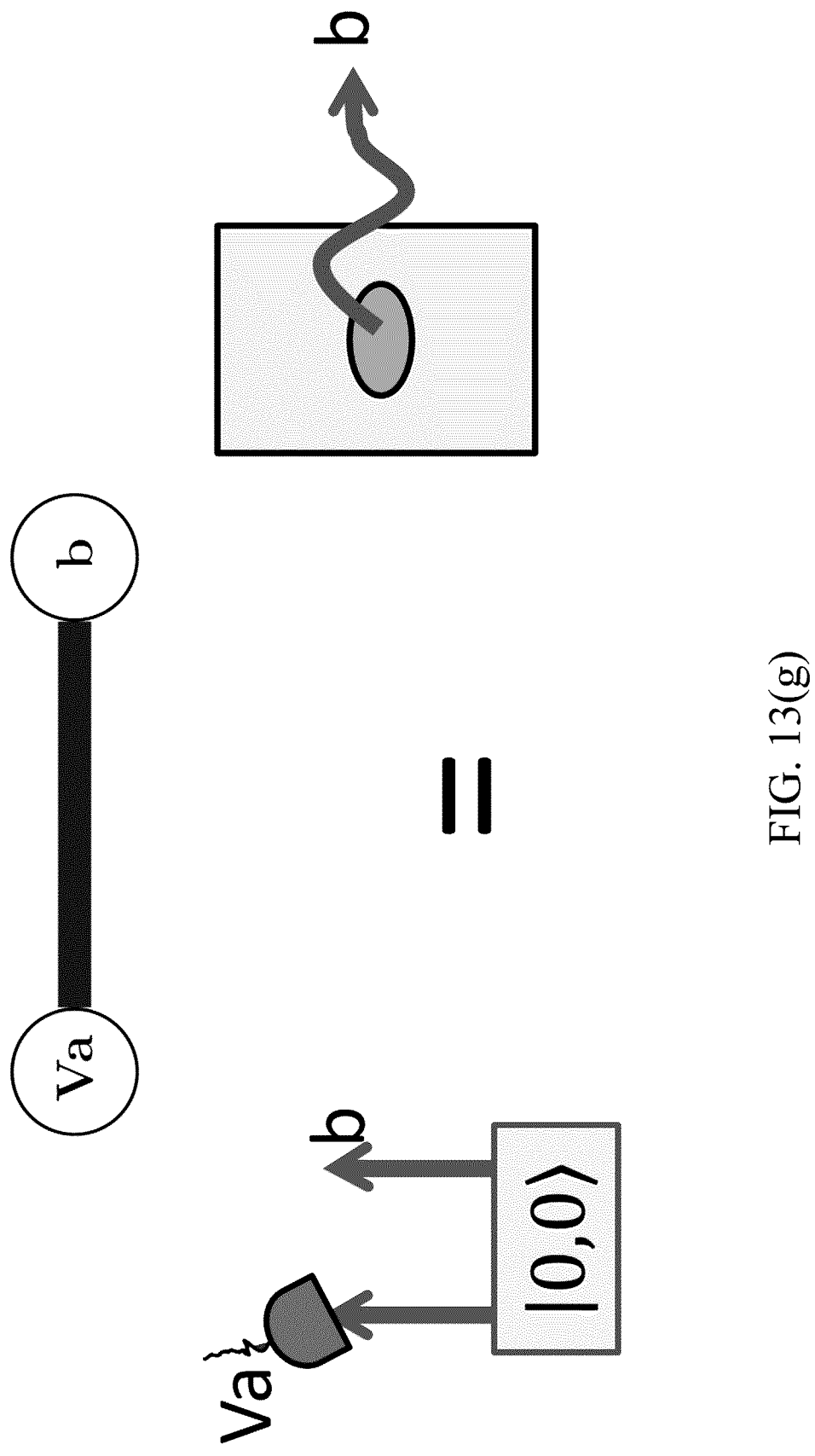
Figure 14A:
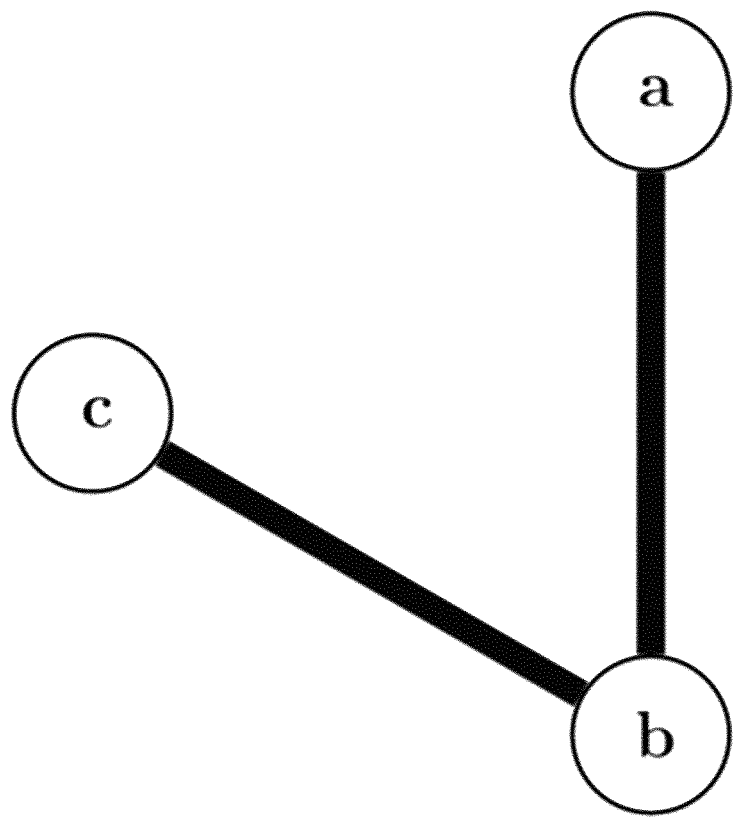
FIGS. 14(a) to (j) show a concrete experimental implementation of the graph-representation according to some embodiments.
Figure 14B:
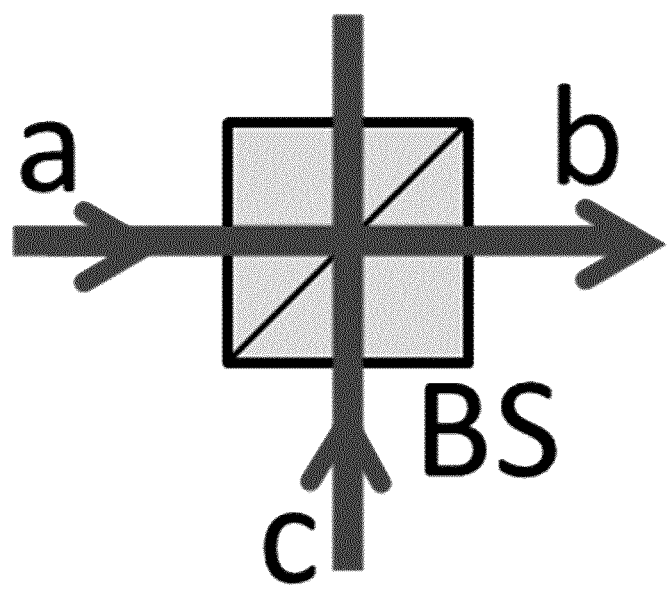
Figure 14C:
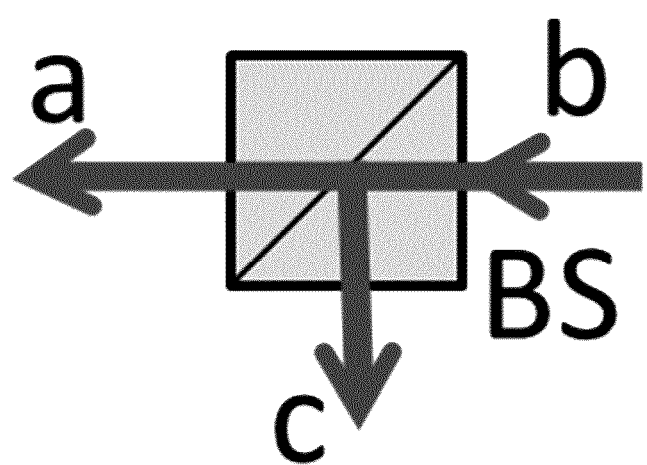
Figure 14D:
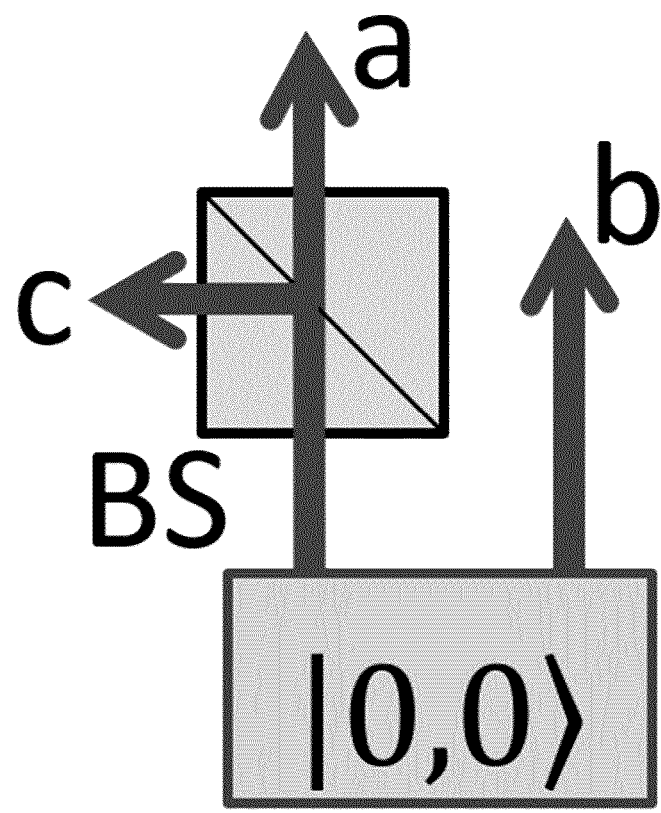
Figure 14E:
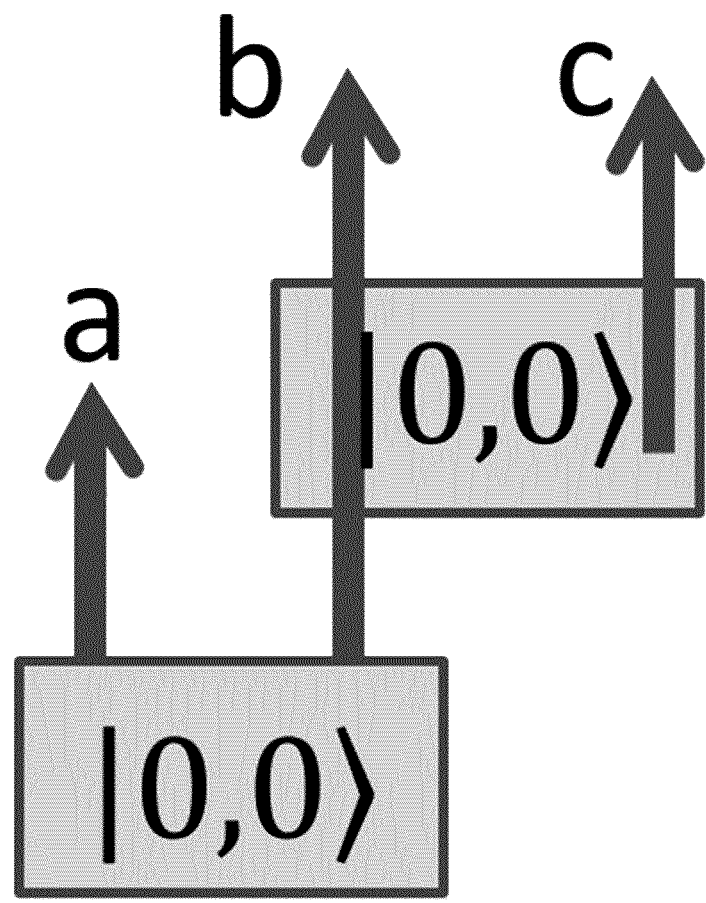
Figure 14F:
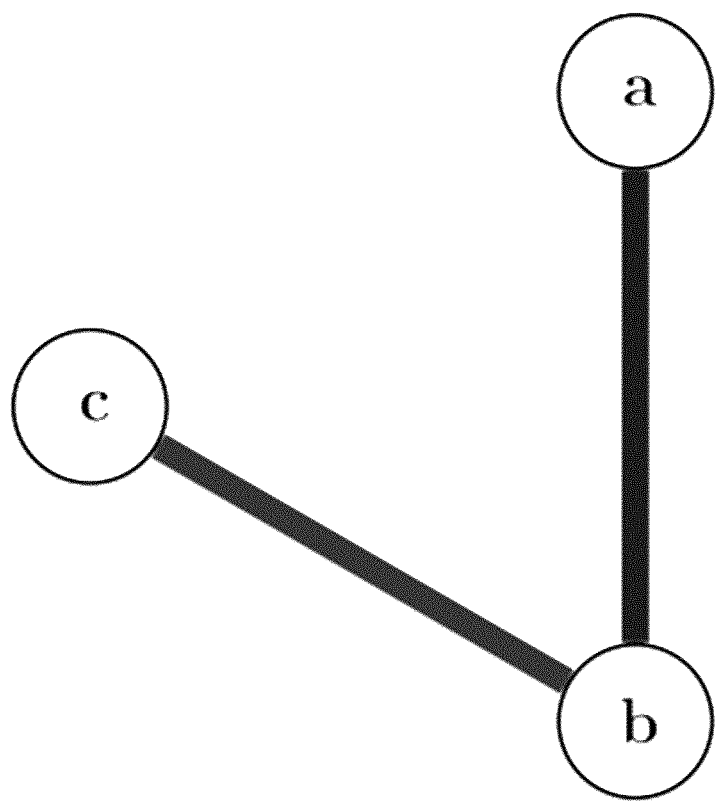
Figure 14G:
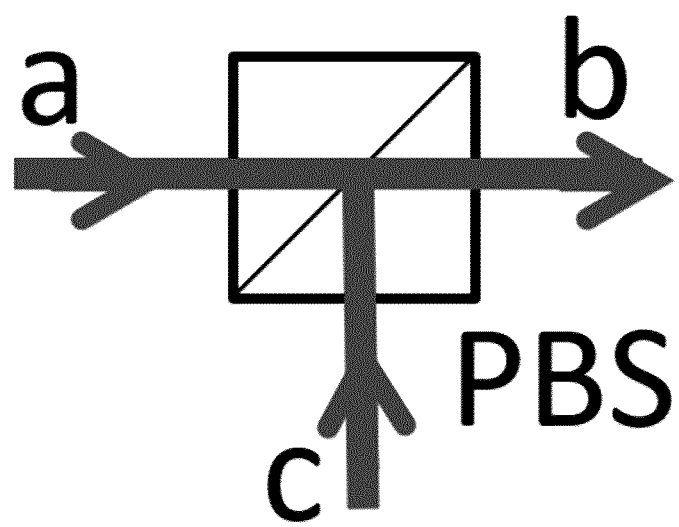
Figure 14H:
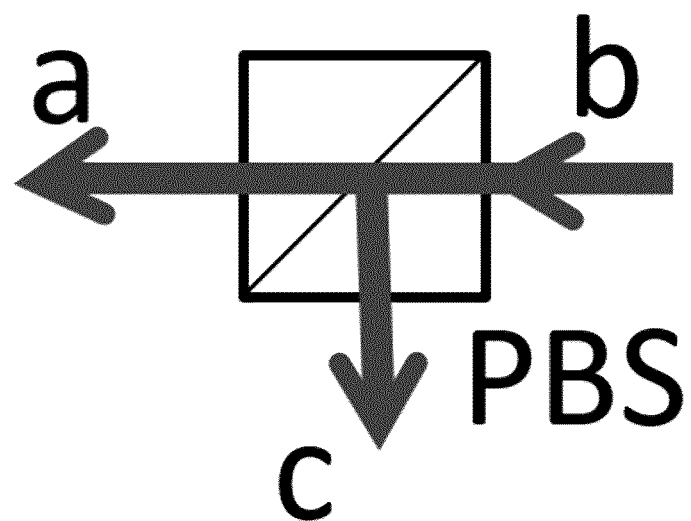
Figure 14I:
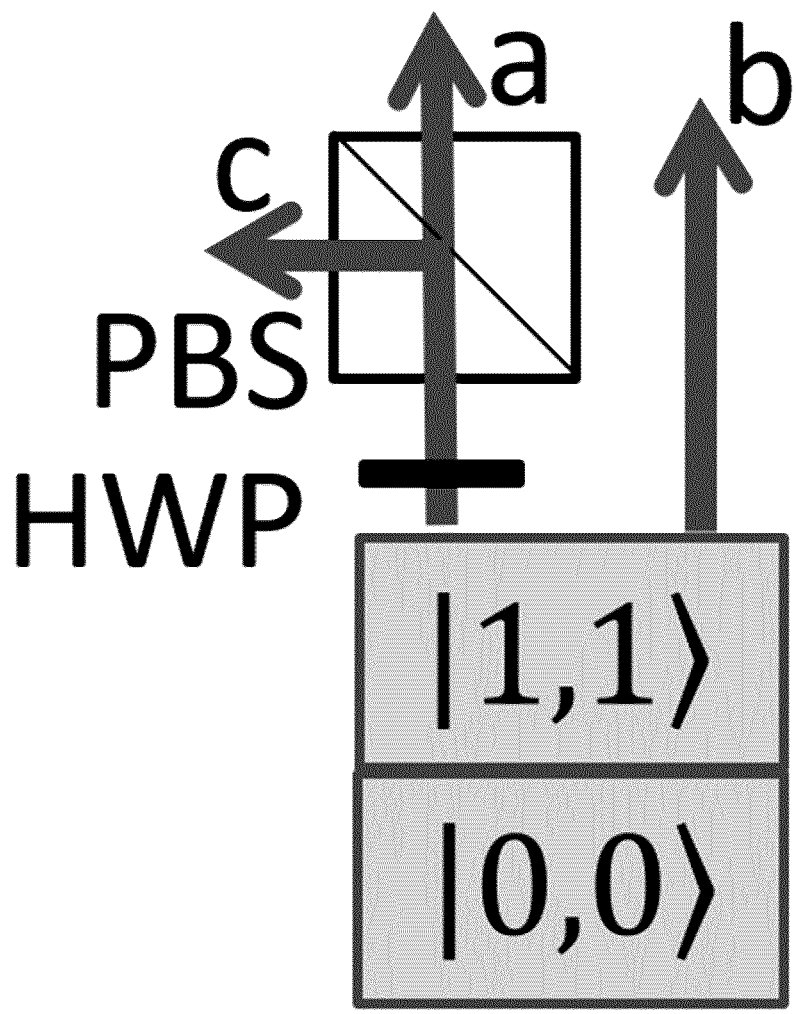
Figure 14J:
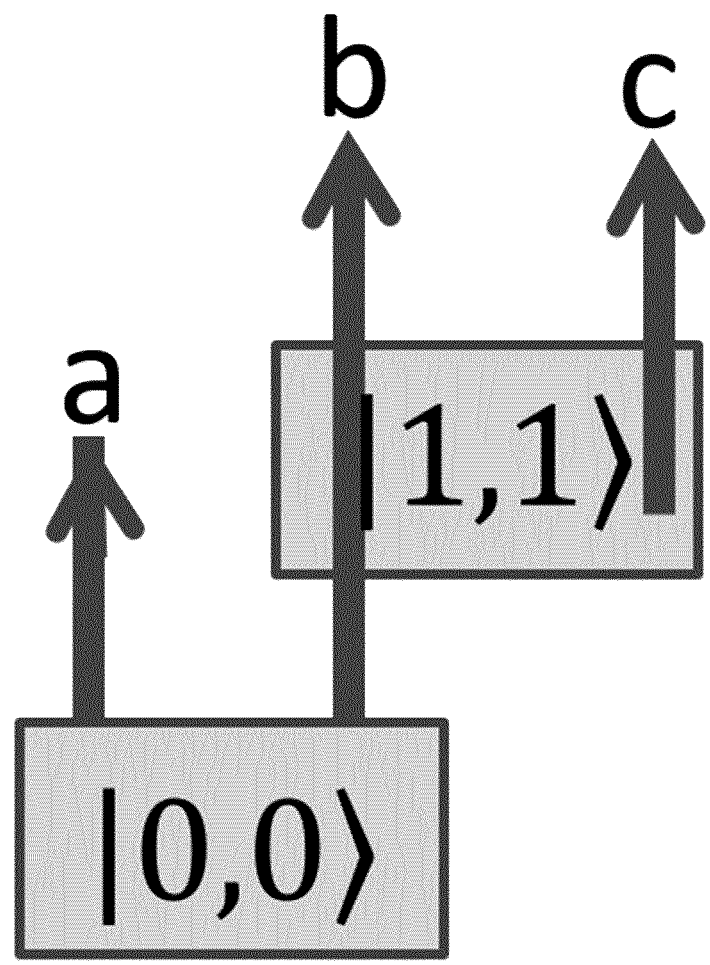

Edge shades represent mode numbers. Multi-edges represent superposition or entanglement, and can be created with photonic technologies, for example, cross-crystal sources. A deterministic single-photon source emitting in path b can be understood as an edge between a vertex b and a virtual vertex Va, such as shown in FIG. 13(g). For each term in the resulting quantum state, every virtual vertex has exactly one incoming edge. This can represent a probabilistic photon-pair source, where the whole state is conditioned on the detection of one photon using a photon number sensitive detector in path Va. FIG. 13(g) (left) depicts an entire state is conditioned on one photon in detector Va, as well as a photon number sensitive detector, according to an embodiment. FIG. 13(g) (right) further depicts a deterministic single-photon source (e.g., quantum dot).

According to an embodiment, the method can merge edges at one vertex in several different ways, such as shown in FIG. 14. If the edges have the same shade (see e.g., FIG. 14(a)), the corresponding photons have the same mode number. In that case, the edges can be merged with probabilistic beam splitters (shaded squares shown by example in FIGS. 14(b), 14(c), and 14(d)) or by creating them directly with path identified photon-pair sources (for instance, SPDC crystals, such as shown in FIG. 14(e)).

FIG. 14 shows a graph represented by the method according to an embodiment, and the graph can be implemented by a system to experiment translation. As shown, BS refers to beam splitter, PBS refers to polarizing beam splitter, and HWP refers to half-wave plate. According to an embodiment, the method can generate a graph having edges of different shades, such as shown in FIG. 14(f), where the corresponding photons have different mode numbers. In that case, according to an embodiment, the method can merge the edges losslessly with mode-dependent beam splitters (so-called multiplexing or de-multiplexing); white squares, for example, polarizing beam splitters if the degree of freedom is photonic polarization, such as shown in FIGS. 14(g), 14(h), 14(i), and 14(j). According to an embodiment, the method can also create the edges by path identified photon-pair sources (for instance, SPDC crystals, such as shown in FIG. 14(j)). Other probabilistic photon sources, such as lasers as probabilistic single-photon sources, can be added by exploiting hypergraph structures.

According to an embodiment, the method provides an ability to create independent edges and merge edges, and all types of graphs can be implemented or translated to experimental setups such as using the physical systems described herein. According to an embodiment, the method can use appropriate phase shifters to manipulate the phases of edge weights. According to an embodiment, the method can manipulate amplitudes by pump power for SPDC crystals, splitting ratios that are set by half-wave plates, or absorptive filters. According to an embodiment, the method can represent or implement collinear photon pair sources, that produce two photons in the same path, with loops (e.g., an edge that connects a vertex to itself) in a graph.

Normalization of Quantum States

Figure 15A:
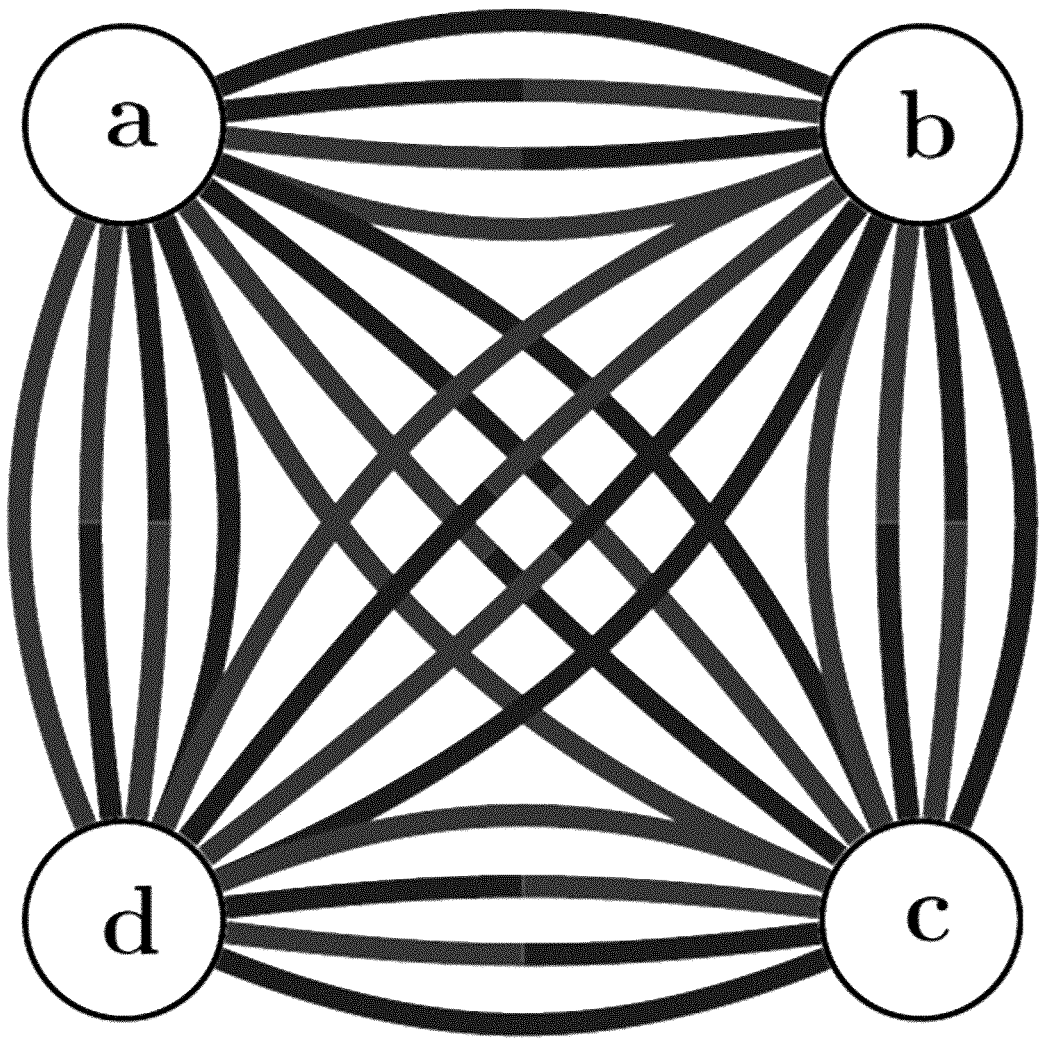
FIGS. 15(a) and (b) show a complete graph and a graph after optimization according to some embodiments.
Figure 15B:
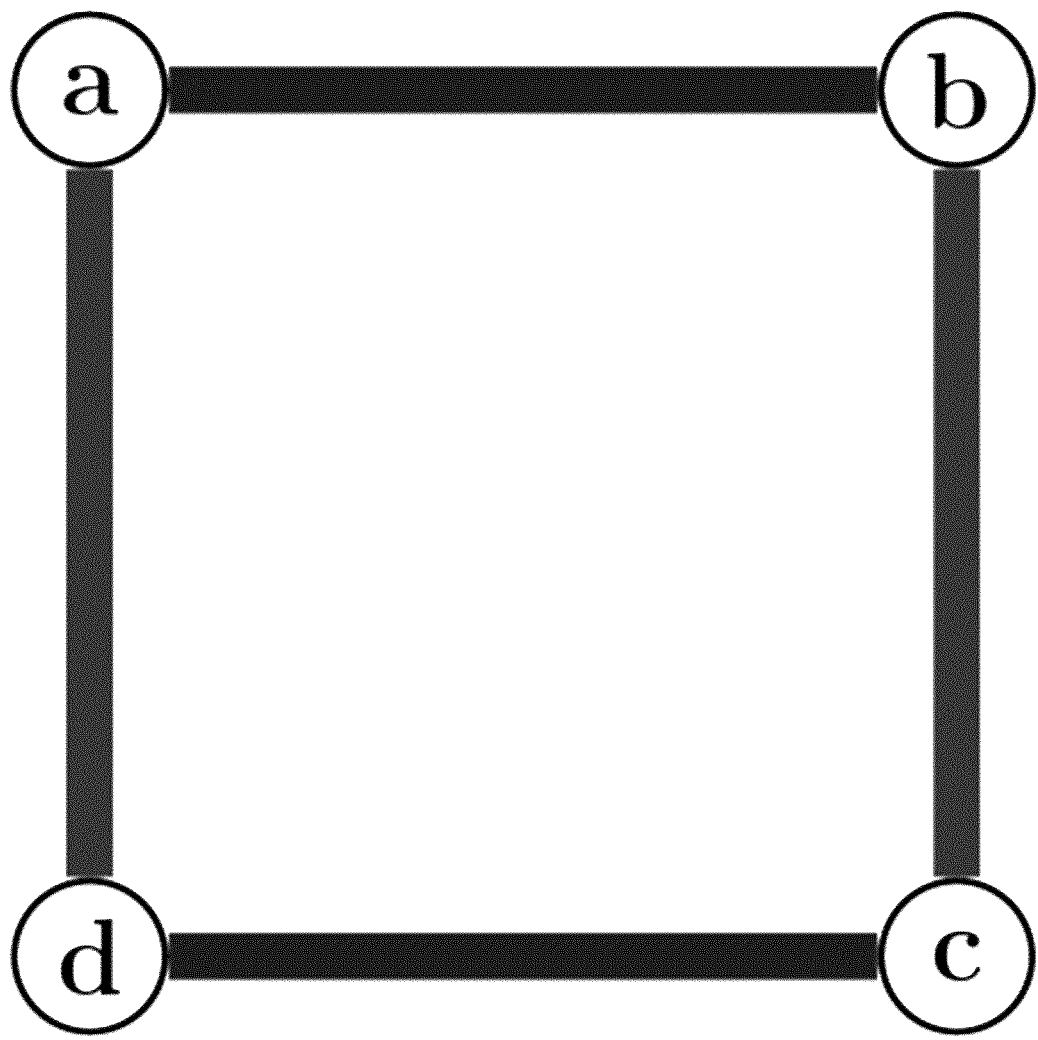

FIG. 15(a) shows a complete graph with four edges between each pair of vertices representing all possible correlations in a locally 2-dimensional system, generated according to an embodiment of the method. FIG. 15(b) shows that it is reduced to a cycle graph by the method according to an embodiment in the optimization for a post-selected GHZ.

According to an embodiment, the method generates a complete 2-shaded graph with four vertices that represents the state represented using the weight function $\Phi(\omega)$ of the graph shown in FIG. 15(a). It can be represented in terms of creation operators as shown in function (12):

$$\Phi(\omega) \approx \sum_n \frac{1}{n!} \left( \sum_{\substack{x,y \in \{a,b,c,d\} \\ x<y}} \sum_{c_1,c_2 \in \{0,1\}} \omega_{x,y}^{c_1,c_2} x_{c_1}^\dagger y_{c_2}^\dagger + h.c. \right)^n \quad (12)$$

If it is desired to condition the state on one photon in each detector, it reduces to the function (13):

$$|\psi\rangle = \frac{1}{N(\omega)} \sum_{i,j,k,l \in \{0,1\}} \omega_{|i,j,k,l\rangle} |i,j,k,l\rangle \quad (13)$$

with the edge weights as shown in function (14):

$$\omega_{|i,j,k,l\rangle} = \omega_{a,b}^{i,j} \cdot \omega_{c,d}^{k,l} + \omega_{a,c}^{i,k} \cdot \omega_{b,d}^{j,l} + \omega_{a,d}^{i,l} \cdot \omega_{b,c}^{j,k}$$

and the normalization constant as shown in function (15):

$$N(\omega) = \sqrt{\sum_{i,j,k,l \in \{0,1\}} |\omega_{|i,j,k,l\rangle}|^2} \quad (15)$$

According to an embodiment, the method is configured to generate the graph representing same, as well as implement same in a physical system.

According to an embodiment, the method performs optimization to find $\omega_{x,y}^{i,j} \in C$ that minimizes the loss function, and subsequently enabling determination and representation of solutions with a large number of edge weights being zero. The information about higher-order contributions to the state, which results in experimentally reduced quantum fidelities, is encoded within the weight function $\Phi(\omega)$. Therefore, higher-order contributions could be directly accounted for by the method according to an embodiment within the optimization procedure.

Heralded Bell State

Figure 16A:
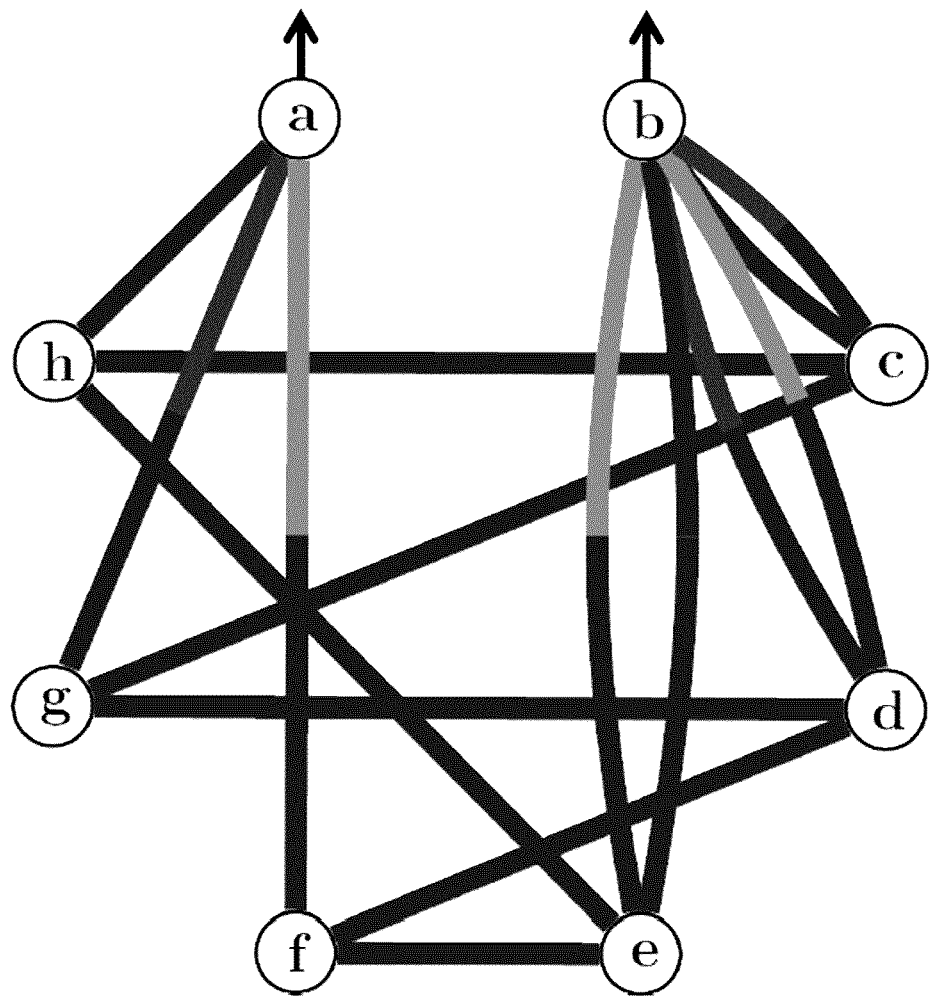
FIGS. 16(a) to (d) show a solution for a 3-dimensional Bell state according to some embodiments.
Figure 16B:
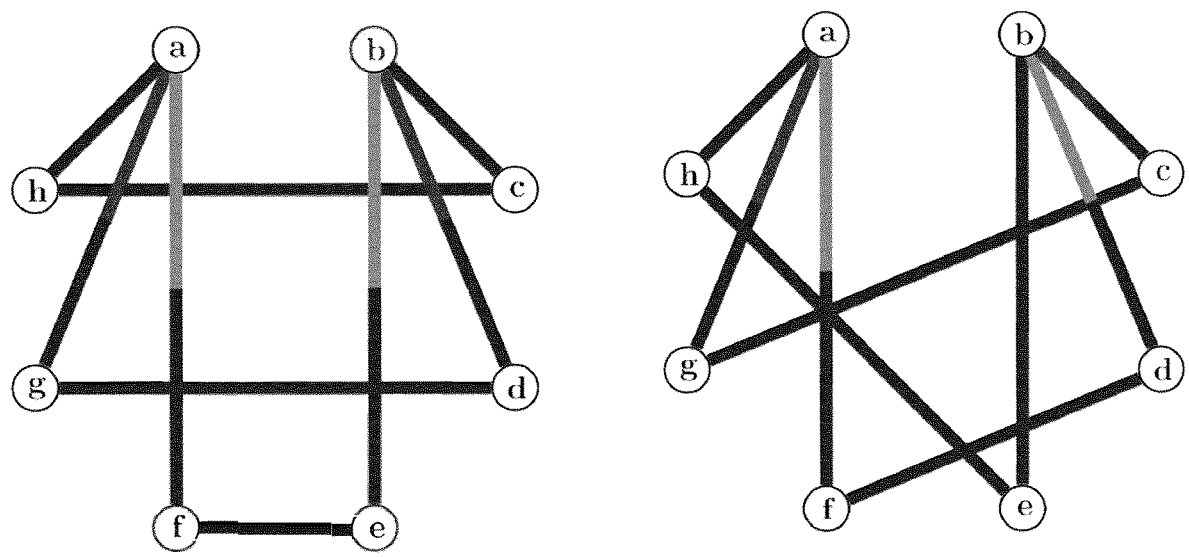
Figure 16C:
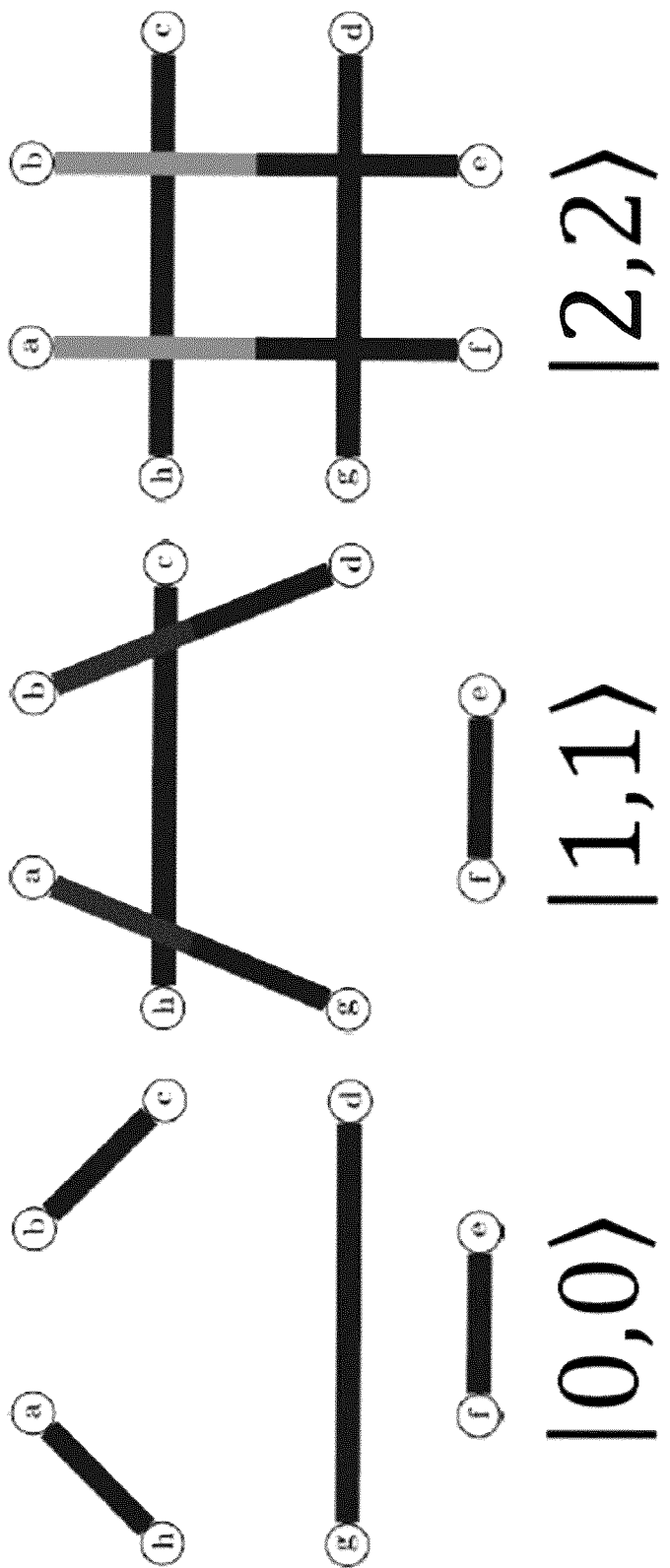
Figure 16D:
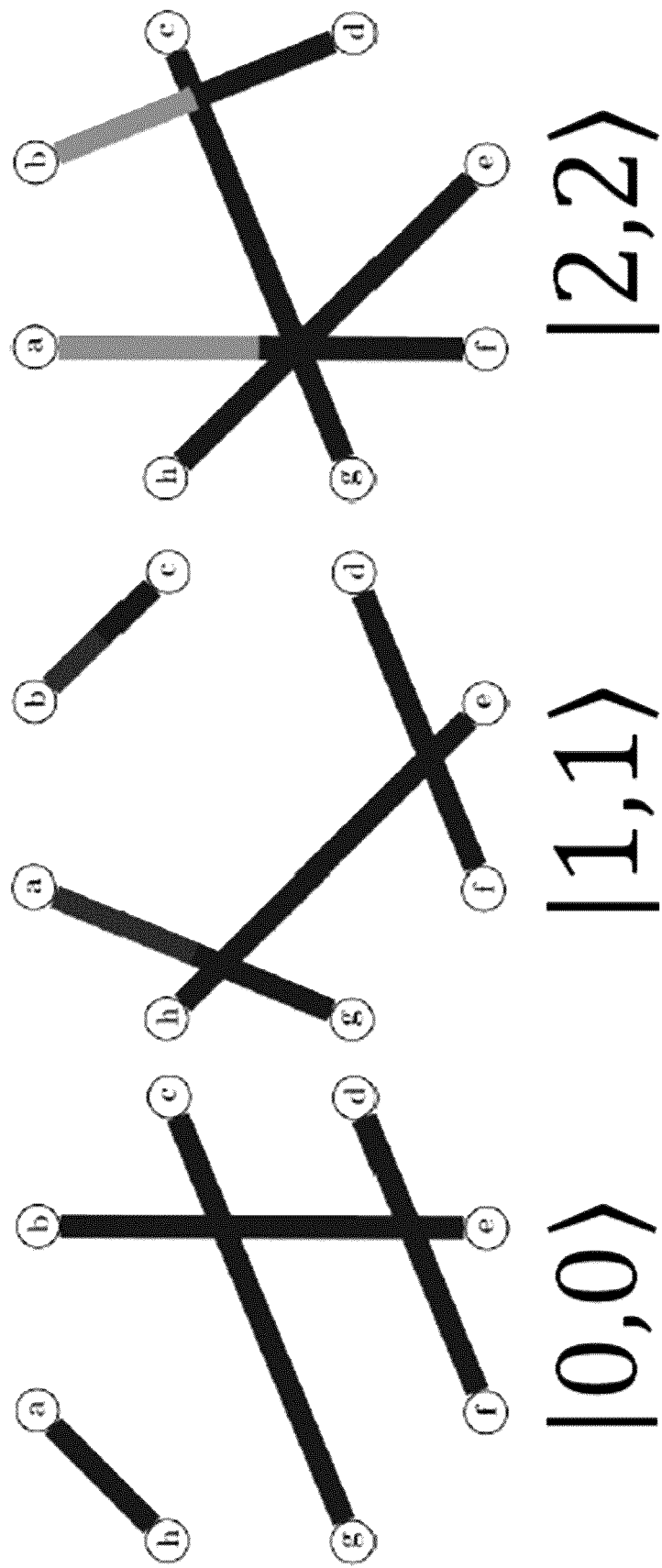

According to an embodiment, the method generates a representation or solution for the heralded 3-dimensional Bell state shown in FIG. 16(a) that contains two subgraphs such as shown in FIG. 16(b) (left and right), where each subgraph creates or represents a 3-dimensional Bell state individually. The vacuum terms of the two subgraphs cancel (as described herein). Each of the two subgraphs can be understood individually, and for each, every edge from the output modes a and b is connected to one individual ancilla vertex c-h. Three edges furthermore connect the ancilla vertices. Each of those edges connects vertices with the same shade of the incoming edge from a and b. For example, the left subgraph shown in FIG. 16(b) has an edge which connects d and g as both of them have an incoming edge with the same shade, such as red. In that way, if four photon pairs created, only photon pairs with the same edge shade, i.e., mode number, can be created, as seen in FIG. 16(c). FIGS. 16(c) and 16(d) depict triggered subgraphs according to an embodiment. For example, FIG. 16(c) depicts triggered subgraphs of the graph shown in FIG. 16(b) (left), and FIG. 16(d) depicts triggered subgraphs of the graph shown in FIG. 16(c) (right).

According to an embodiment, the method provides for representing cross-correlations, which can occur by combining the two subgraphs such as shown in FIG. 16(b), are destructively interfered in the same way as the vacuum with the appropriate setting of the phases of weights.

According to an embodiment, the method provides that the fidelity can be arbitrary close to one, by adjusting the weights of the edges. In the most straightforward setting, according to an embodiment, the method represents a graph where all edges that are connected to a or b have the same weight v, while all edges connecting ancilla vertices c-h have weight w (with phases as described herein). In this way, the heralded state can be written as shown in function (16):

$$|\Psi\rangle = 2v^2 w^2 (|0,0\rangle - |1,1\rangle - |2,2\rangle)_{a,b} + vw^3 |\Phi\rangle_{one\ photon} +$$
$$w^4 |\Phi\rangle_{zero\ photons} + O(\text{higher orders}) \quad (16)$$

where $|\Phi\rangle_{one\ photon}$ stands for combinations where three ancilla photon pairs and one pair containing an ancilla photon and an output photon are produced. The state $|\Phi\rangle_{zero\ photons}$ are cases where four ancillary photon pairs are created. Both of those terms can be reduced by making w smaller than v. The term O(higher orders) correspond to cases with five or more photon pairs produced, which can be reduced by having v and w smaller than one.

Table I below shows fidelity and count rates for heralded 3-dimensional Bell states, according to an embodiment of the method.

| v | w | fidelity | count rate |
|---|---|---|---|
| 0.16 | 0.07 | 2/3 | 18.8 Hz |
| 0.125 | 0.048 | 0.75 | 1.5 Hz |
| 0.1 | 0.035 | 0.8 | 0.8 Hz |
| 0.0820219 | 0.0240018 | 0.85 | 65 per hour |
| 0.0576405 | 0.0139269 | 0.9 | 1.8 per hour |

The fidelity and expected count rates for various settings of weights v and w can be calculated as shown in in Table I, and can be calculated up to sixth order of SPDC, and not taking into account any losses or detector inefficiency.

Figure 17A:
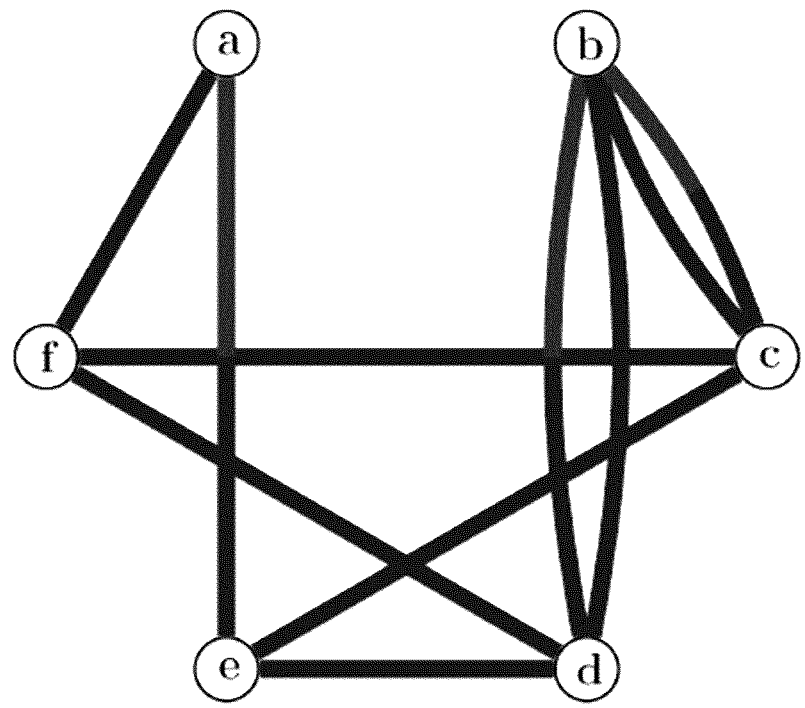
FIGS. 17(a) to (h) show a heralded high-dimensional Bell State according to some embodiments.
Figure 17B:
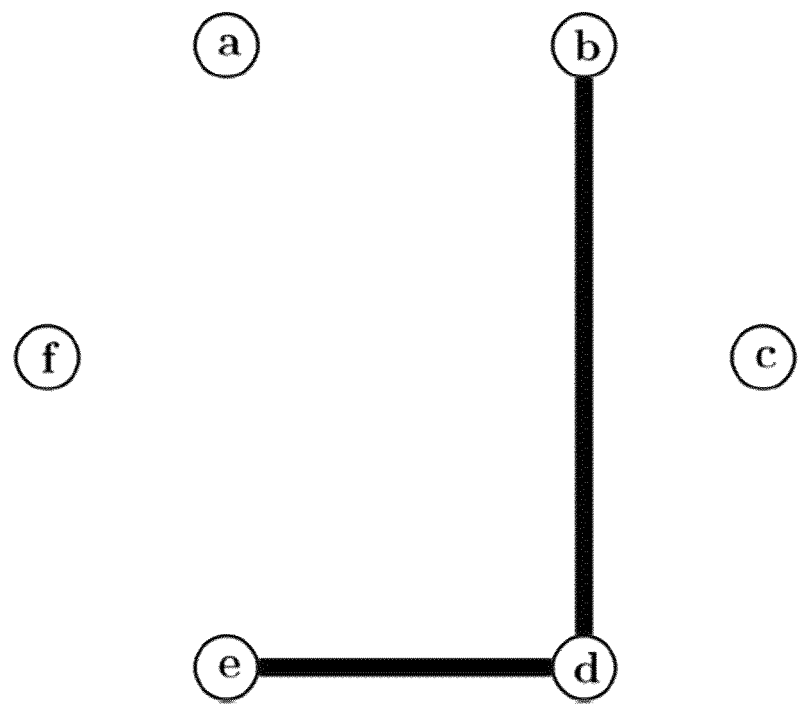
Figure 17C:
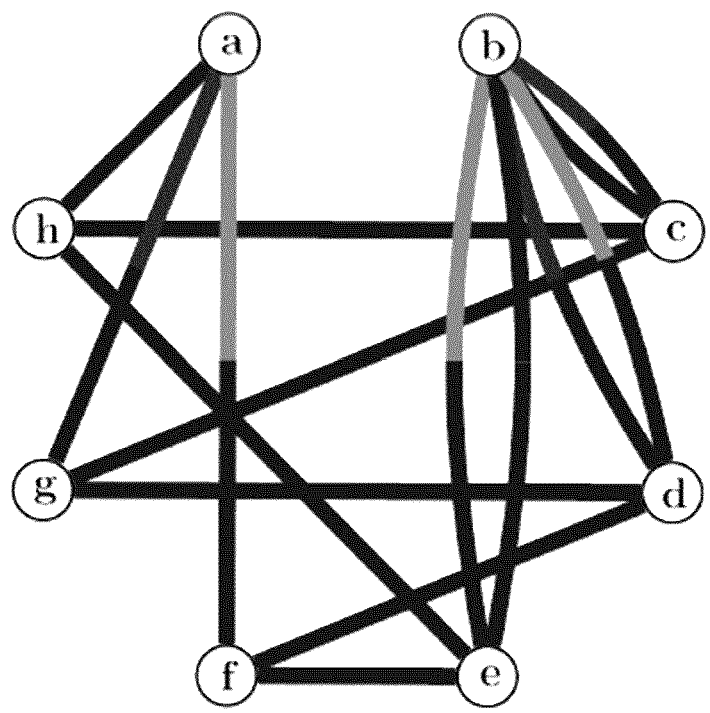
Figure 17D:
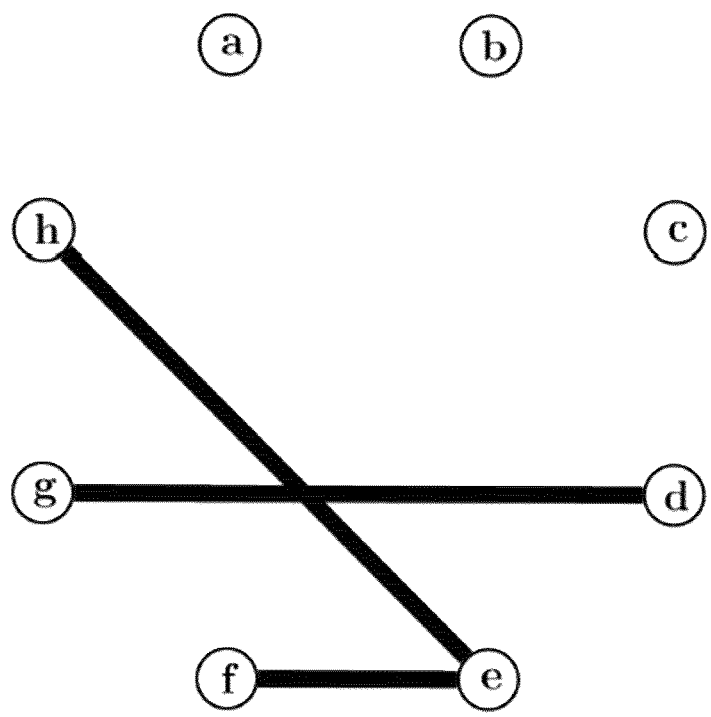
Figure 17E:
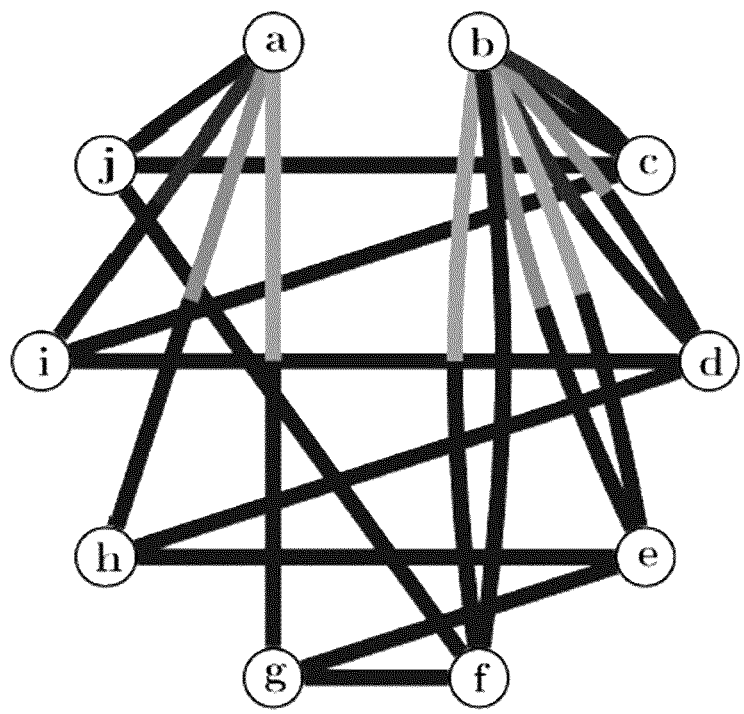
Figure 17F:
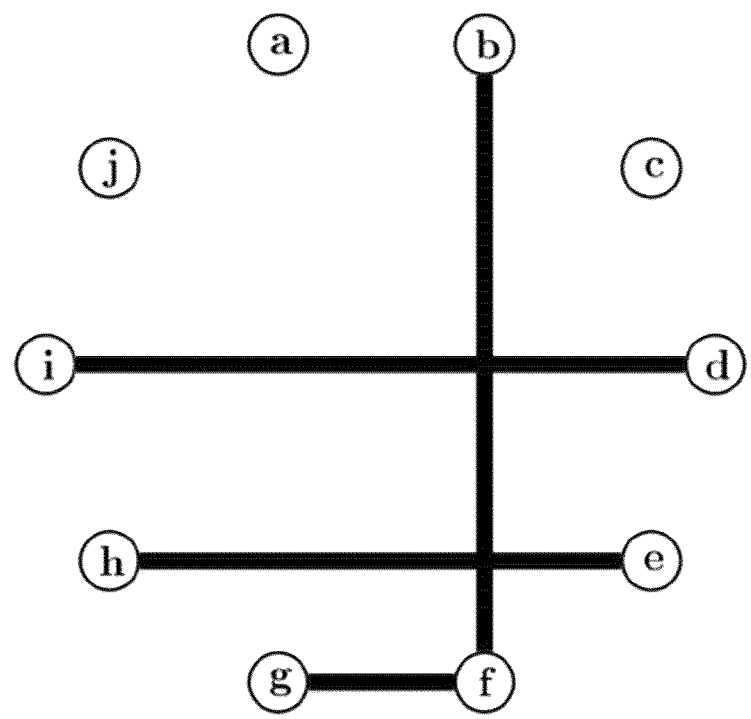
Figure 17G:
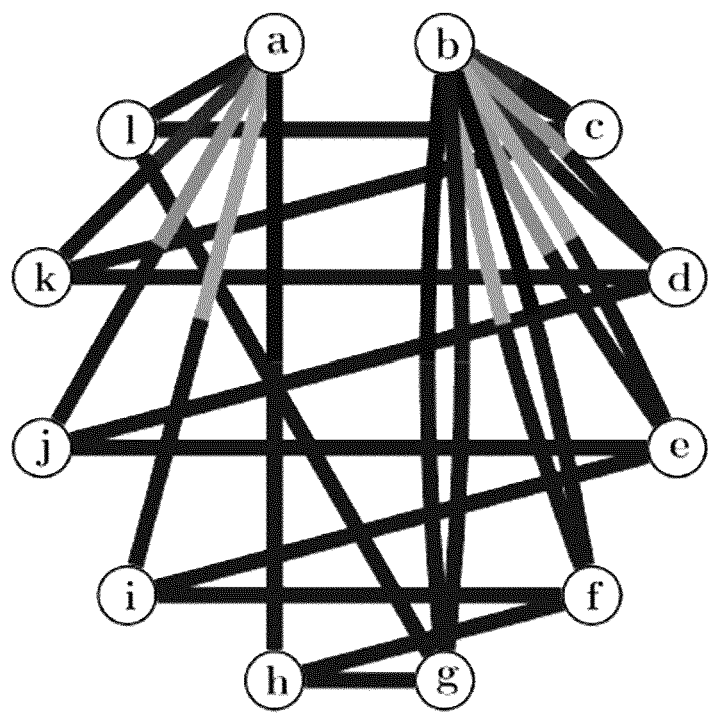
Figure 17H:
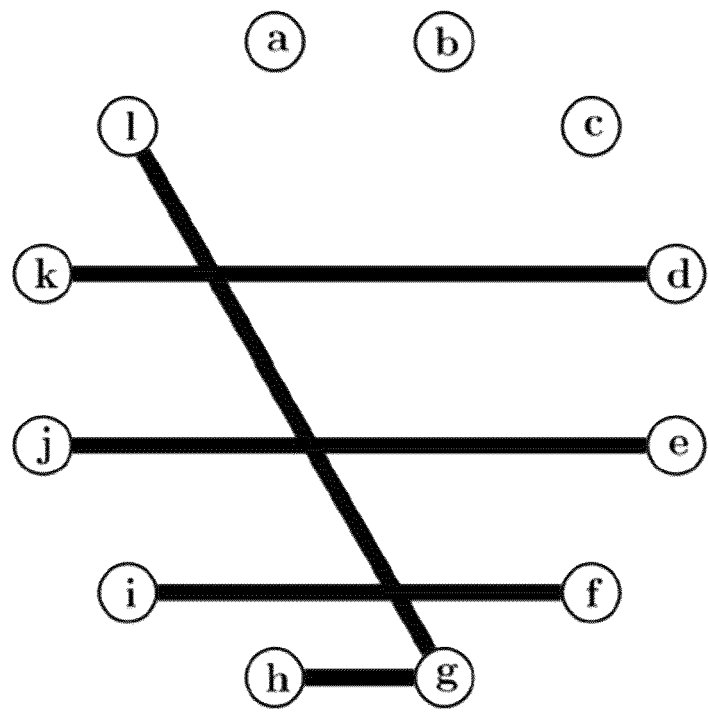

According to an embodiment, the method provides that configurations used in the 3-dimensional case can be immediately generalized to higher-dimensional Bell states. FIG. 17 shows representations or solutions generated by the method according to an embodiment for 2-dimensional to 5-dimensional Bell states with their corresponding phase settings. According to an embodiment, the method can represent or identifies the 3-dimensional case, and generalize same to arbitrary dimensions based on the involved concepts and ideas. In particular, FIG. 17(a) shows a heralded 2-dimensional Bell state, FIG. 17(c) shows a heralded 3-dimensional Bell state, FIG. 17(e) shows a heralded 4-dimensional Bell state, and FIG. 17(g) shows a heralded 5-dimensional Bell state, with their corresponding edges with negative phase shown in FIG. 17(b), FIG. 17(d), FIG. 17(f), and FIG. 17(h), respectively.

According to an embodiment, the method provides that cross-correlations, which can occur by combining the two subgraphs shown in FIG. 16(b), can be destructively interfered in the same way as the vacuum with the appropriate setting of the phases of weights, as described herein.

Heralded GHZ State

Schemes for heralded GHZ states have been proposed which require experimentally significantly more resources and have therefore not yet became practical. In particular, a 3-photon GHZ proposal requires 12 photons (nine ancillary photons that herald a GHZ state). Another proposal requires ten photons (seven ancillary photons), but further requires close to perfectly efficient, photon-number-sensitive detectors for heralding paths, as they need to distinguish between the arrival of one and two photons. In contrast, according to an embodiment, the method can use only ten photons and non-photon number resolving detectors—which is feasible in photonic laboratories.

Experimental 2-Qubit $C_{NOT}$

Figure 18A:
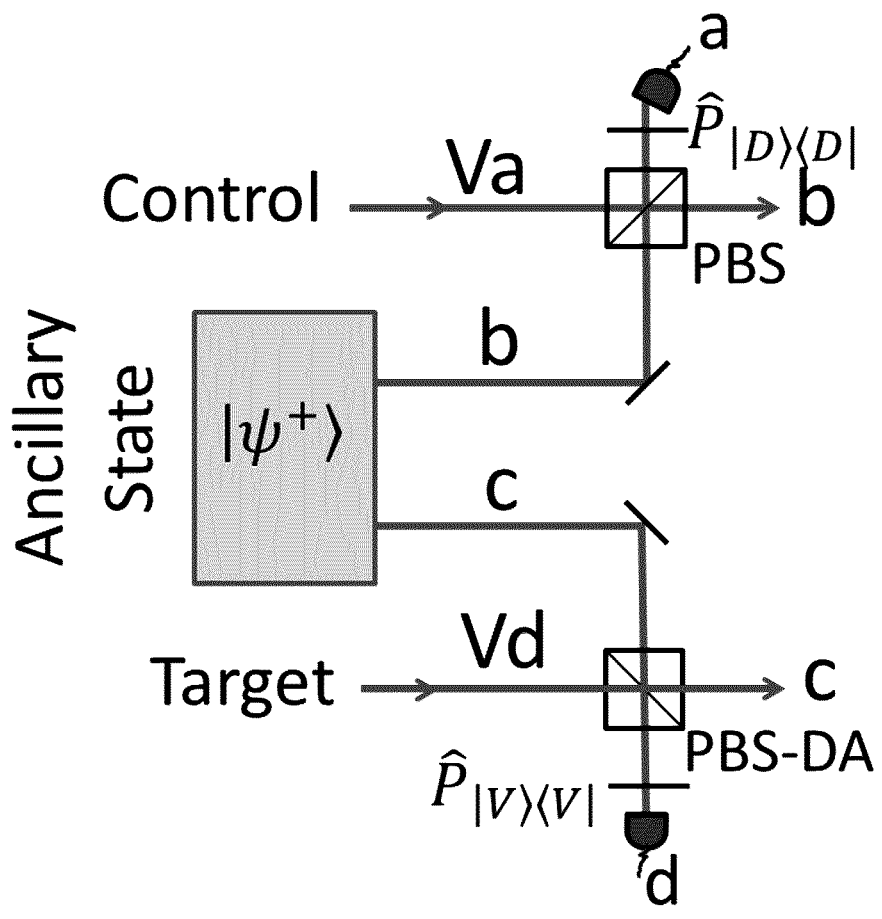
FIGS. 18(a) to (i) show a graph-experiment bridge based on a 2-dimensional CNOT according to some embodiments.

FIG. 18(a) illustrates a 2-dimensional $C_{NOT}$ gate, as represented by the method according to an embodiment. A photonic $C_{NOT}$ transformation is shown in FIG. 18(a). An ancillary state $|\Psi^+\rangle = 1/\sqrt{2}(|0,1\rangle + |1,0\rangle)$ in paths b and c is combined with the incoming control and target photons. A simultaneous detection event in detector a and d heralds a successful realization of a $C_{NOT}$.

Figure 18B:
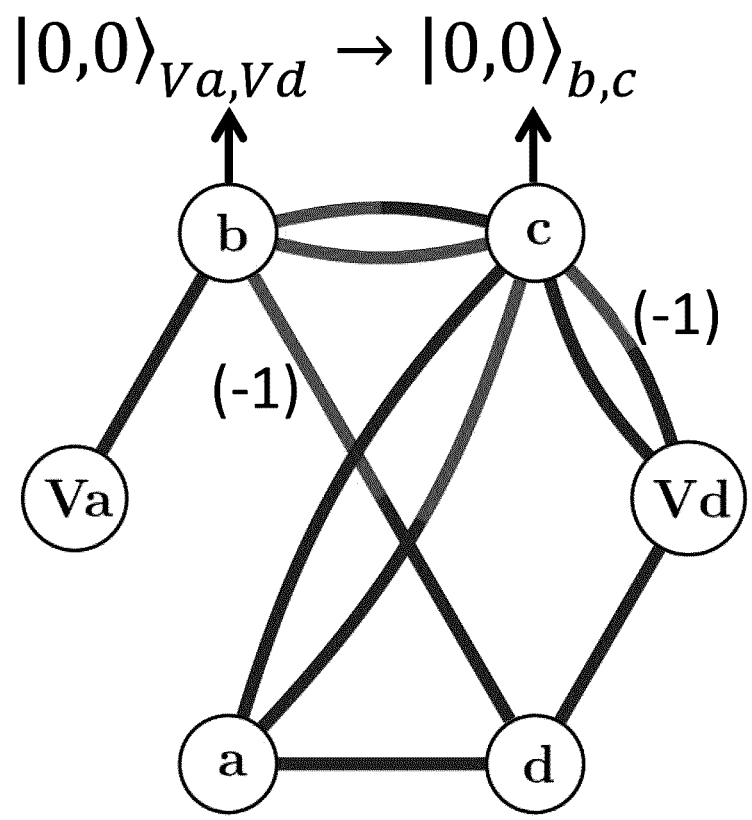
Figure 18C:
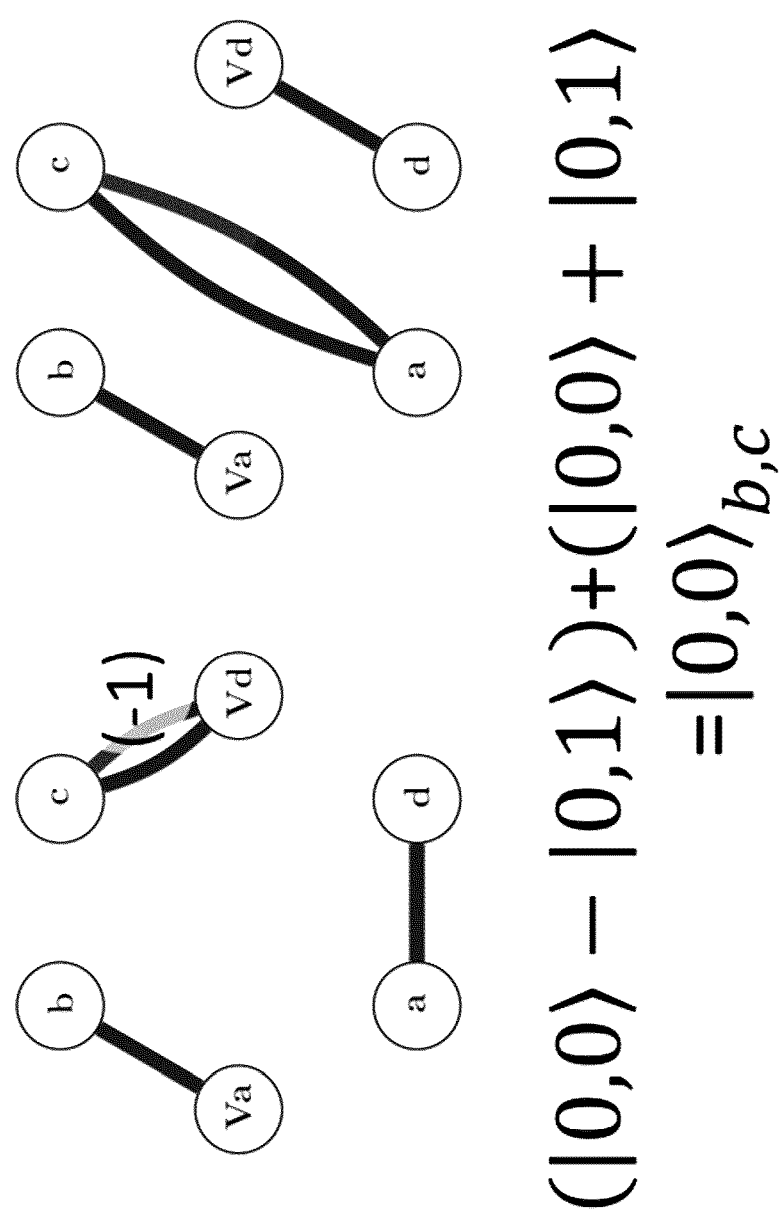
Figure 18D:
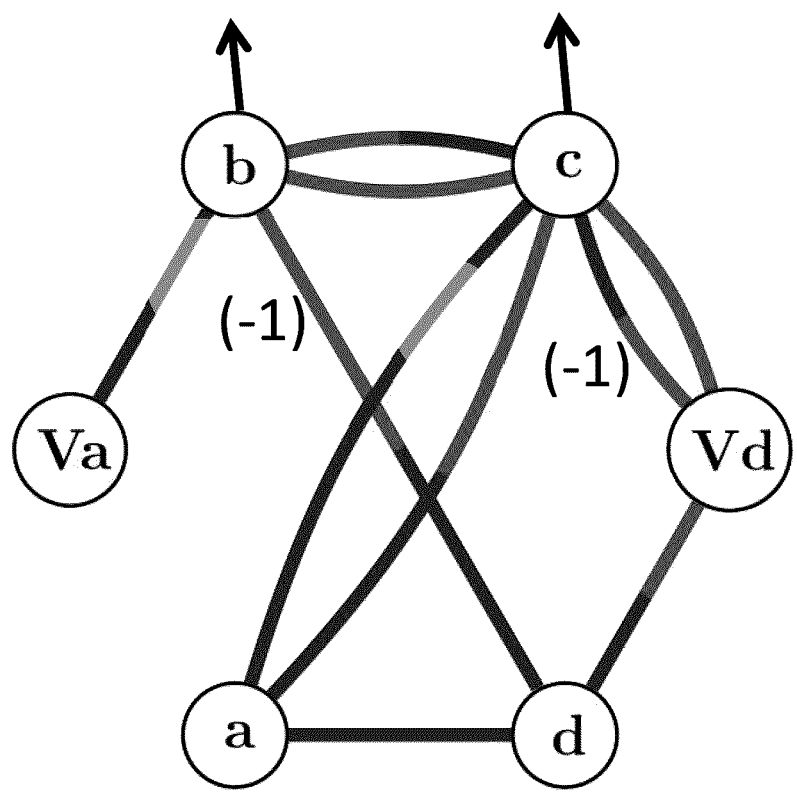
Figure 18E:
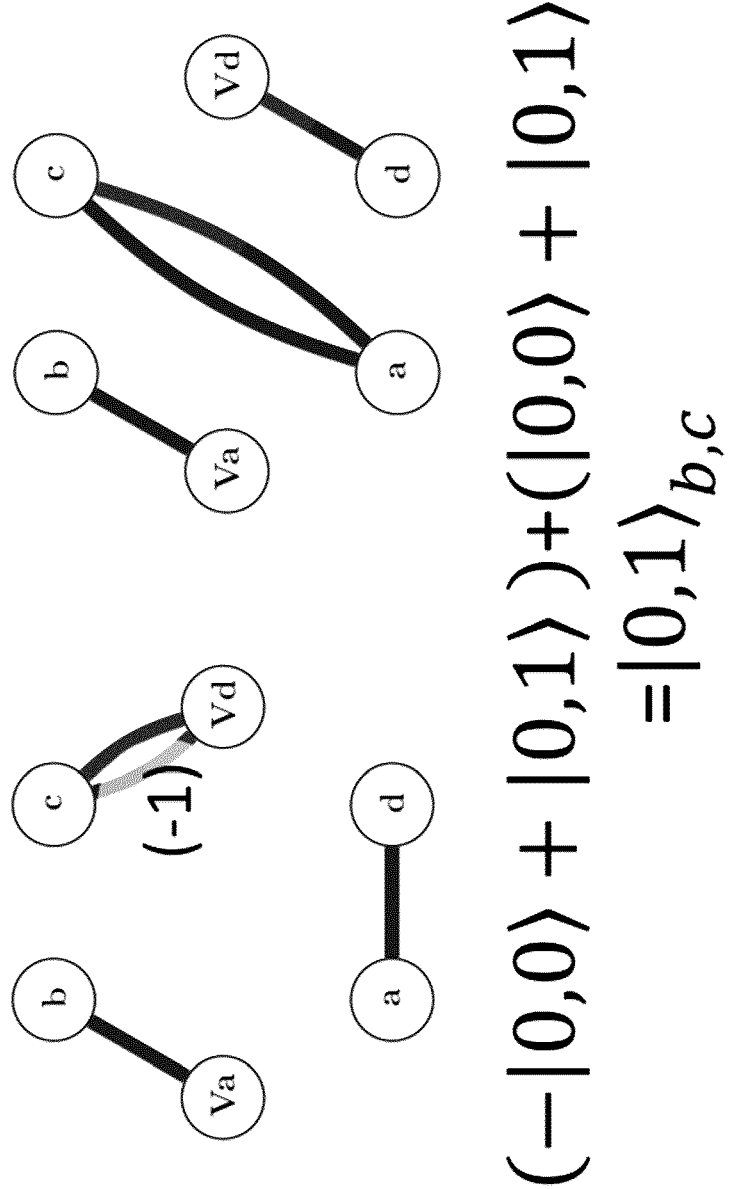
Figure 18F:
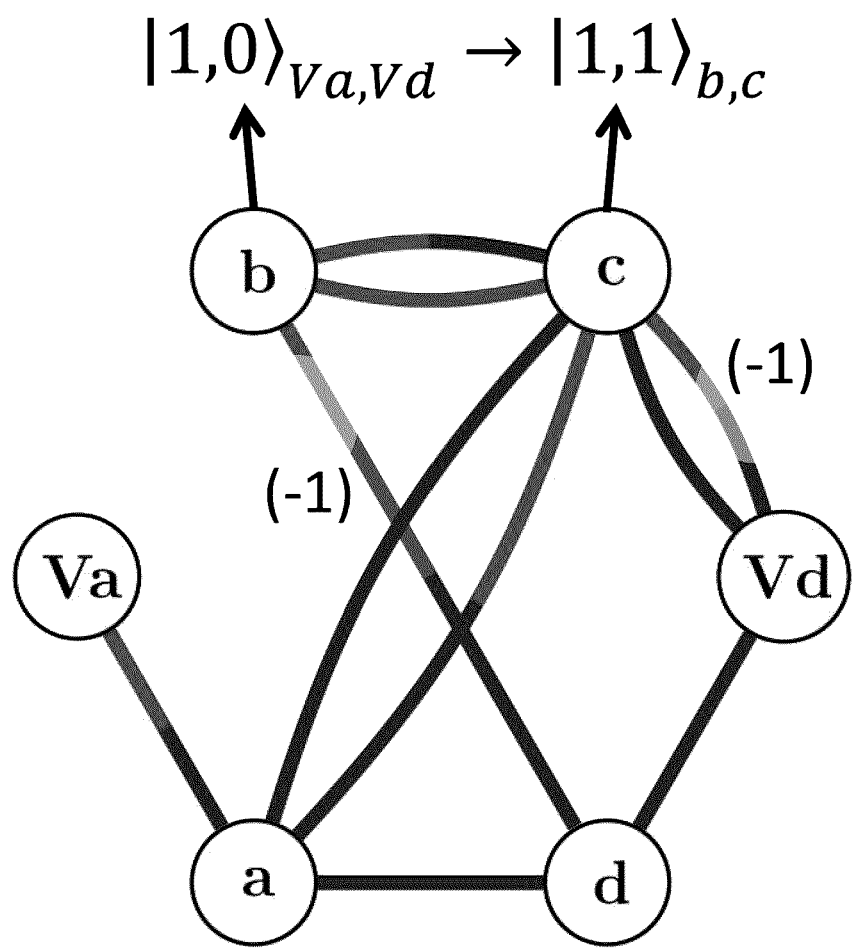
Figure 18G:
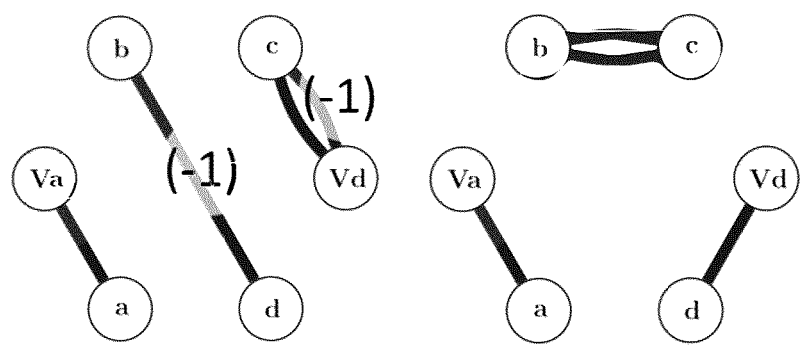
Figure 18H:
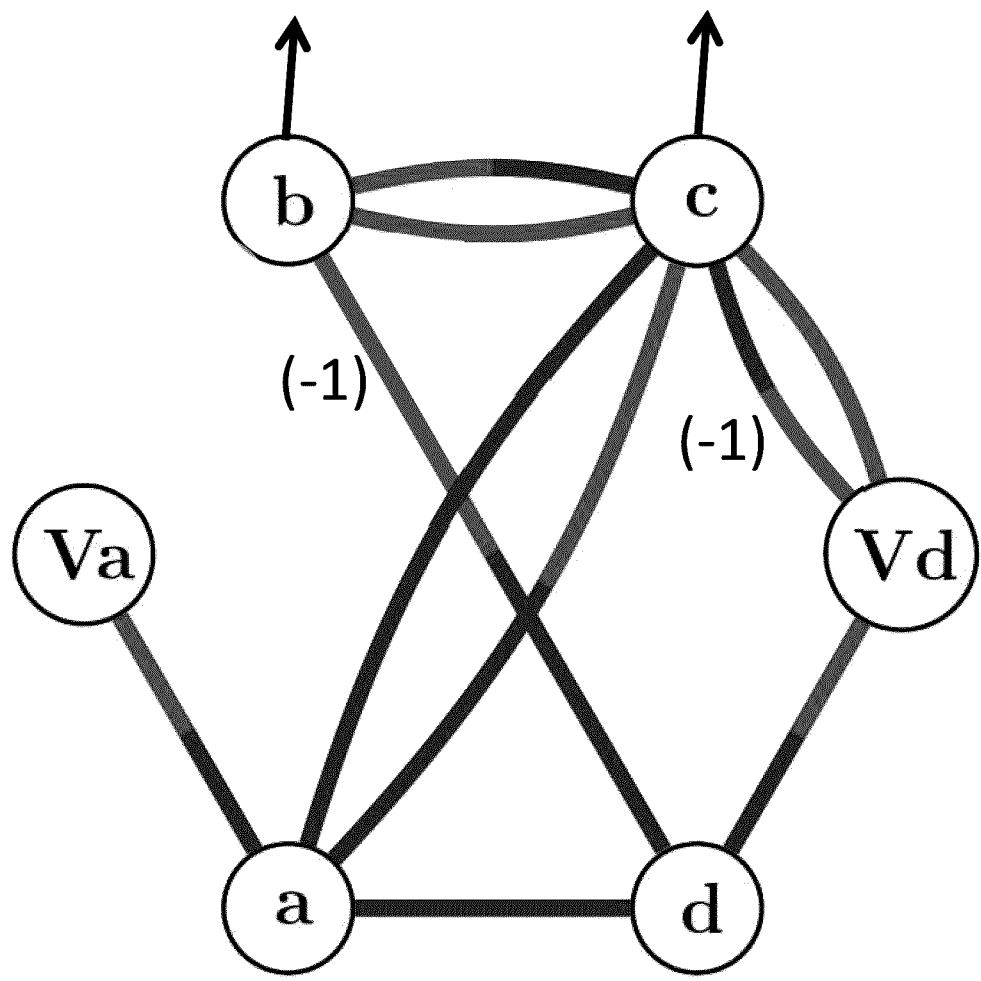
Figure 18I:
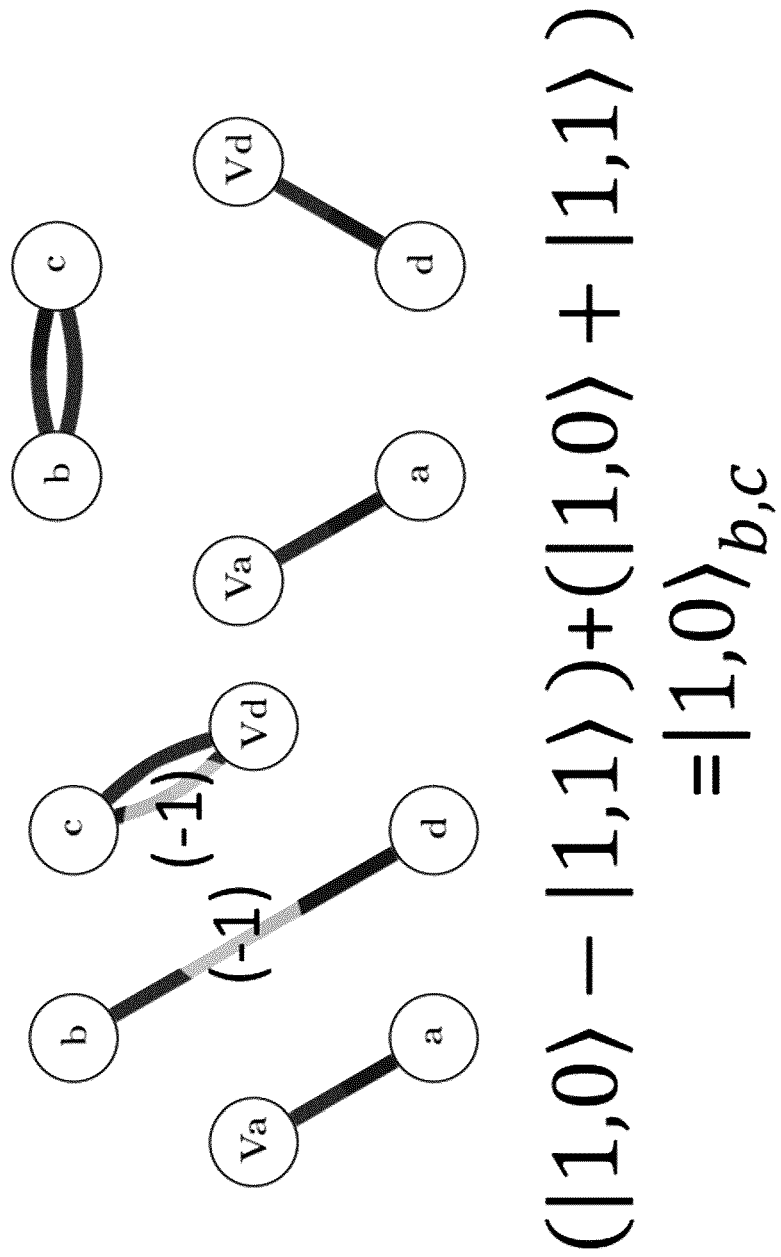
Figure 19A:
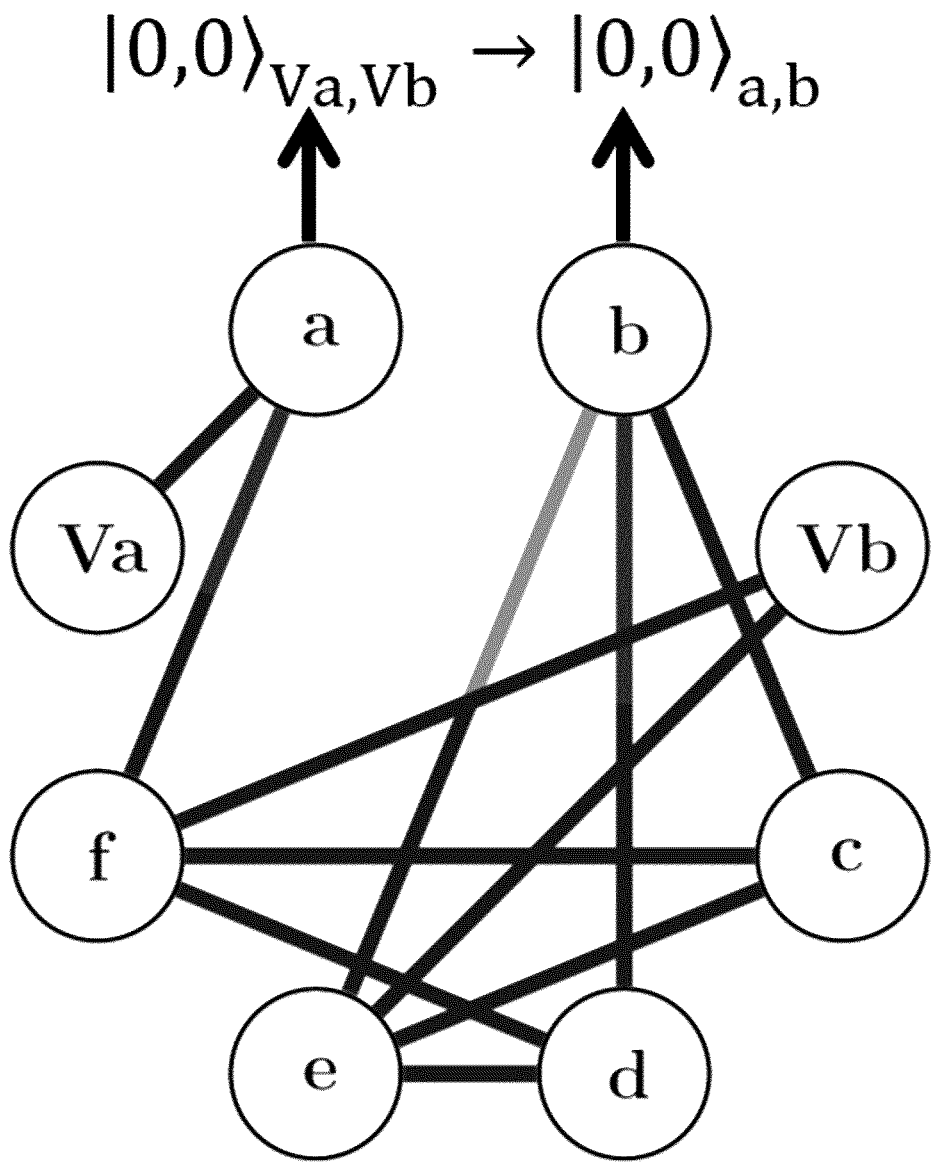
FIGS. 19(a) to (f) show a solution for a 3-dimensional CNOT according to some embodiments.
Figure 19B:
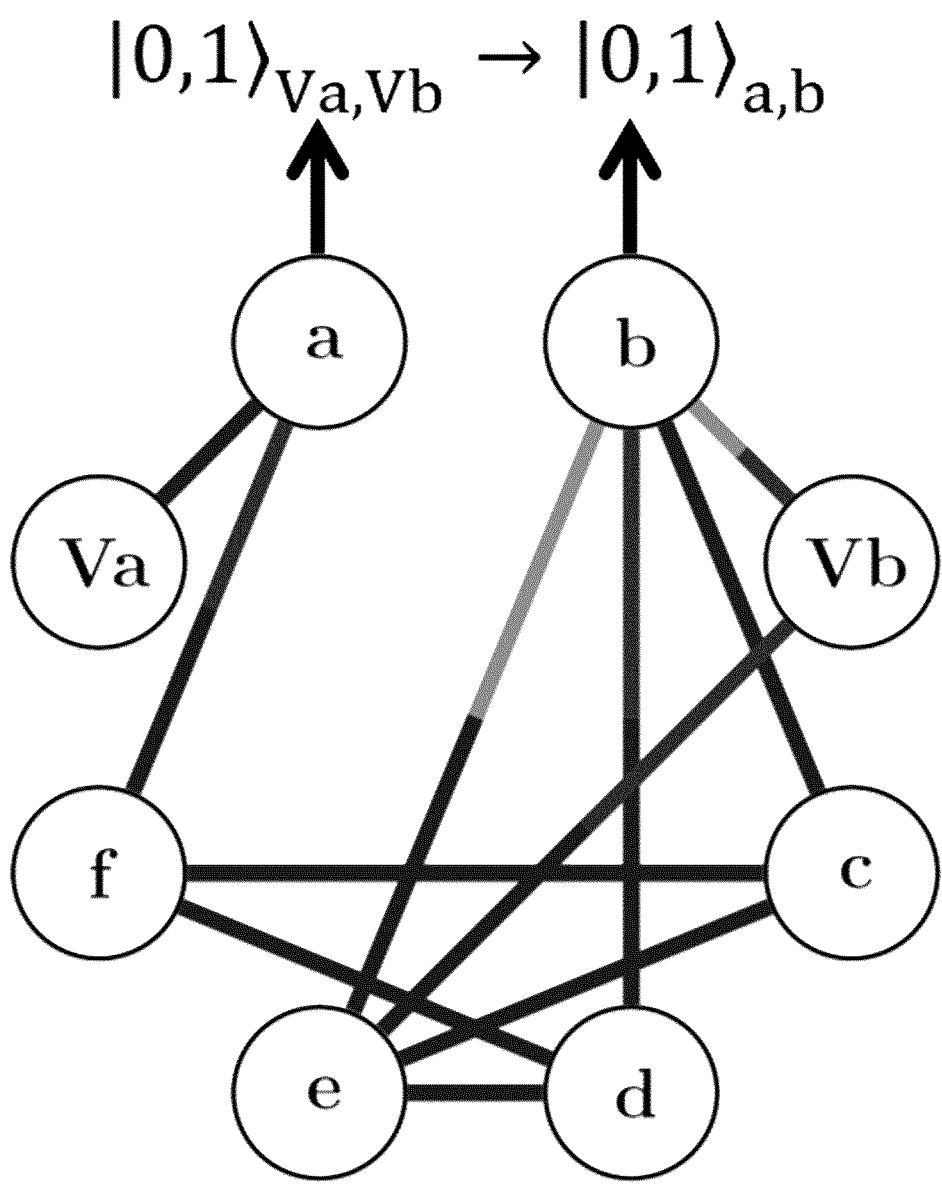
Figure 19C:
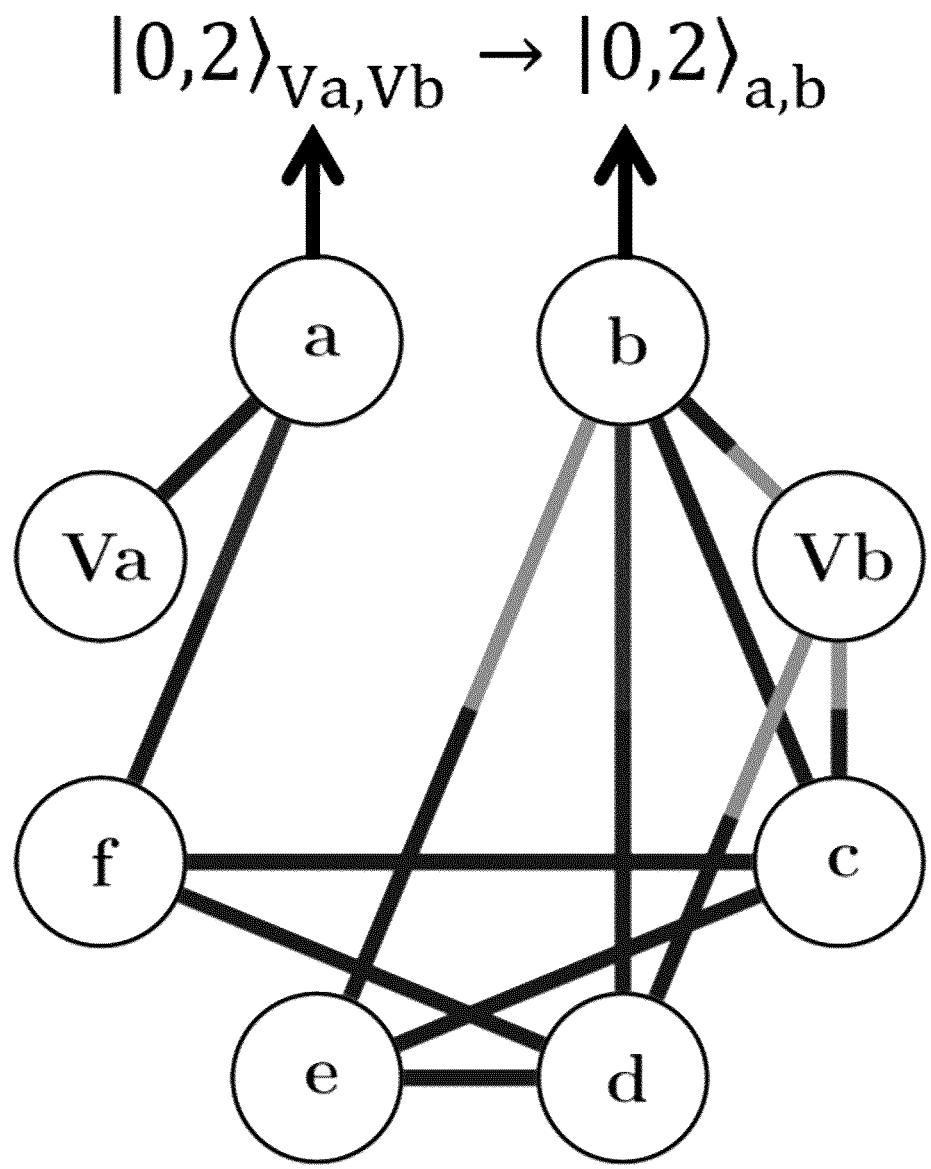
Figure 19D:
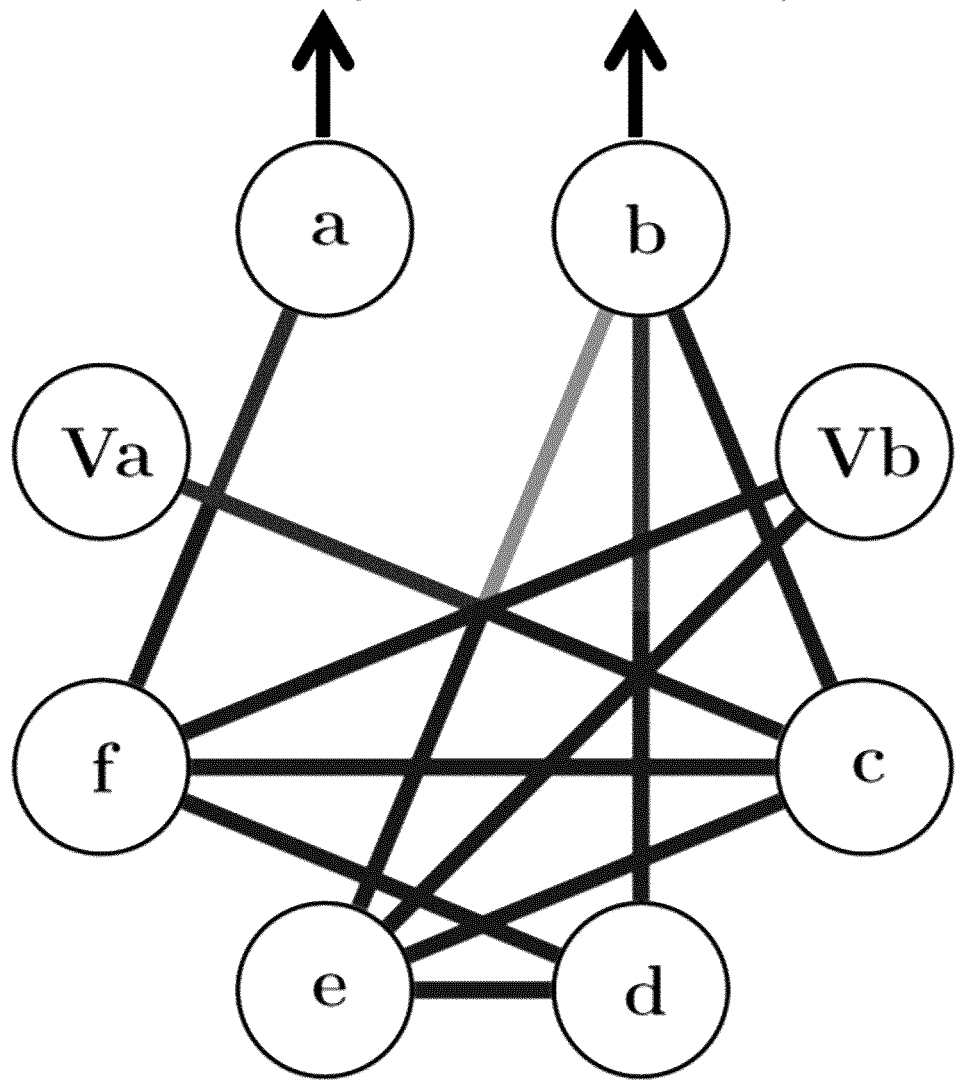
Figure 19E:
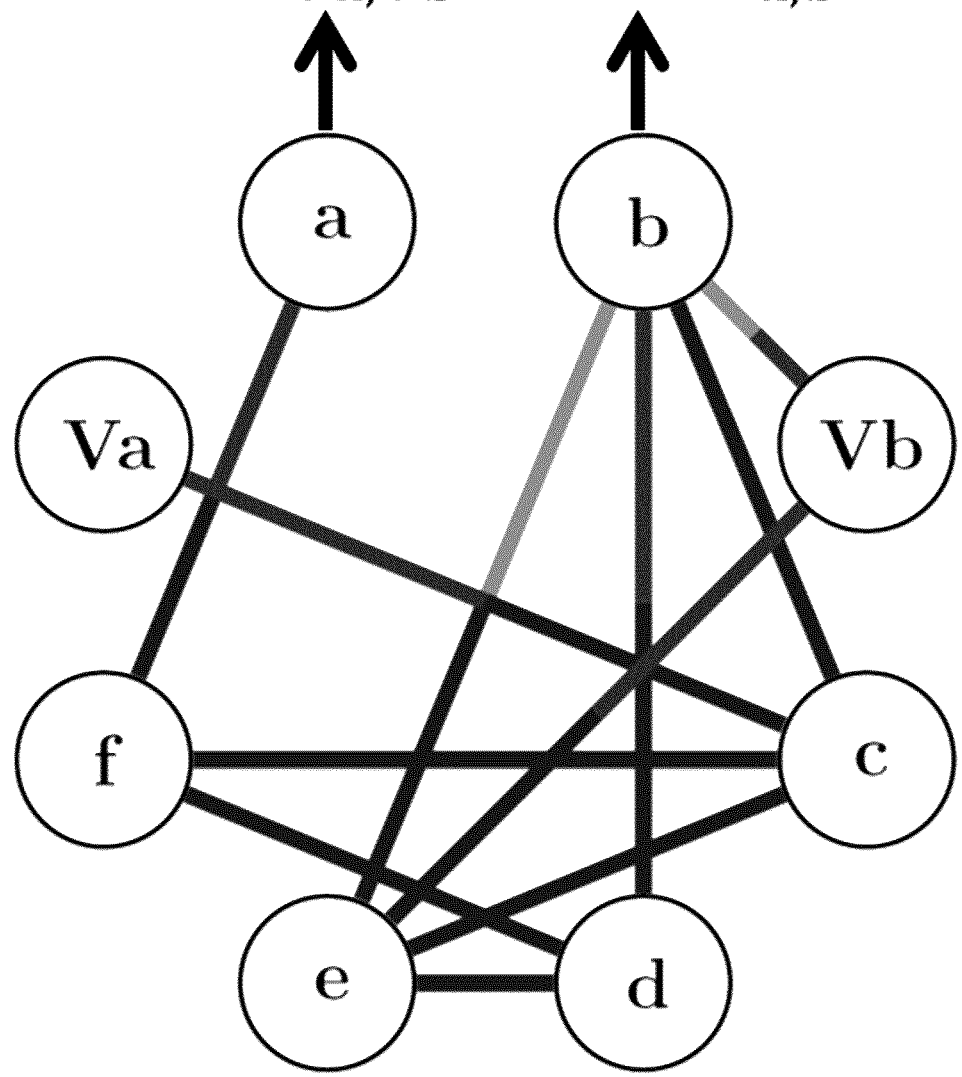
Figure 19F:
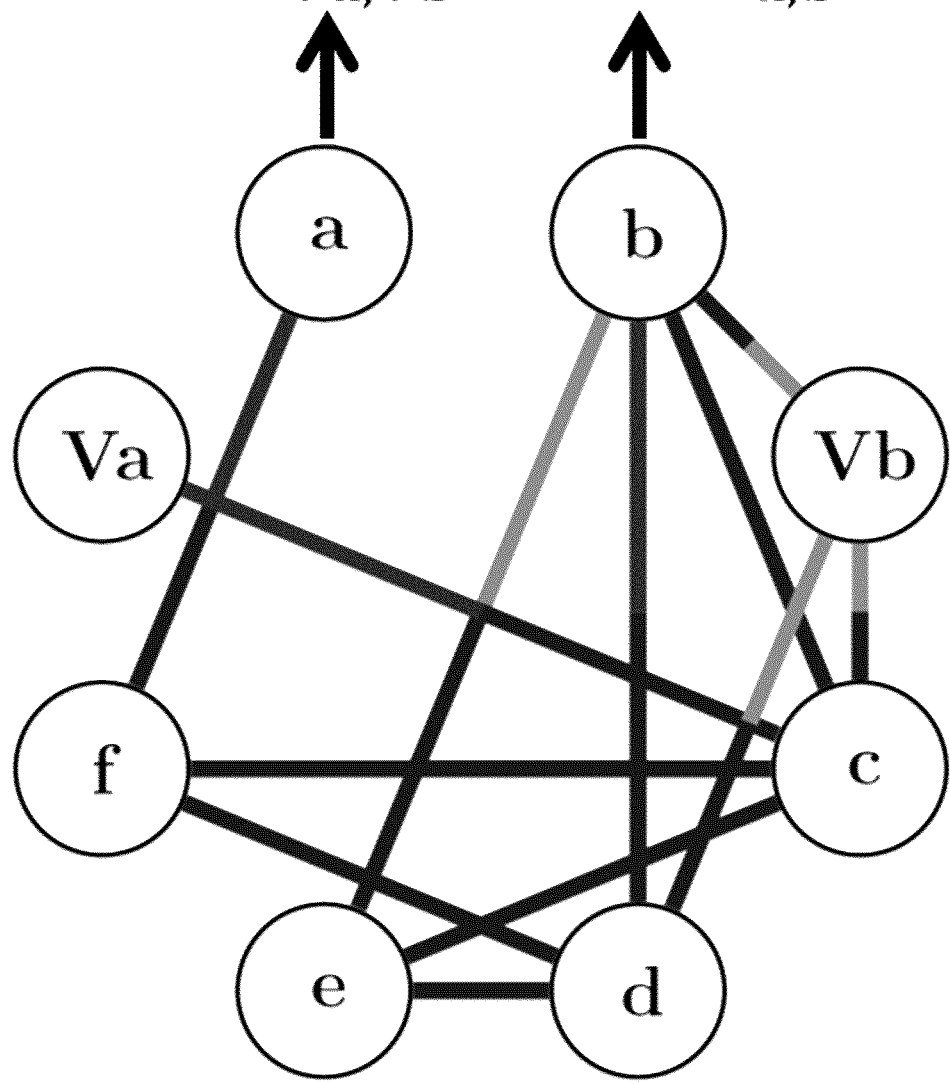

According to an embodiment, the method provides corresponding graphs for the four different cases as shown in FIG. 18, specifically case (i) shown as a graph in FIG. 18(b) and as subgraphs in FIG. 18(c); (ii) shown as a graph in FIG. 18(d) and as subgraphs in FIG. 18(e); (iii) shown as a graph in FIG. 18(f) and as subgraphs in FIG. 18(g); and (iv) shown as a graph in FIG. 18(h) and as subgraphs in FIG. 18(i). According to an embodiment, the resulting states correspond to all subgraphs with one incoming edge in vertex a and one in vertex d (those are heralding detectors), and one edge from each vertex Va and Vd (those represent the incoming photons). It can be seen that Vd (which corresponds to the incoming photon from path d, i.e., the target photon) is responsible for the phase of the quantum states. In that way, it is responsible for the term that is destructively interfered—this is analogous to the situation described herein.

$C_{NOT}$ Beyond Qubits

FIG. 19 illustrates a high-dimensional $C_{NOT}$ gate, with a qubit control photon and a qutrit target photon, as represented by the method according to an embodiment. According to an embodiment, representations generated by the method are show in FIGS. 19(a), 19(b), 19(c), 19(d), 19(e), and 19(f). In particular, a control operation in a 2×3-dimensional space is shown in FIG. 19. The subgraph a-f remains constant, while the edges containing Va and Vb changes depending on the input control/target photons. The correct transformation is heralded by simultaneous detection of a photon in each of the detectors c-f. The structure of the subgraph a-f is reminiscent of the solution of heralded Bell states as shown in FIG. 11. Here, each internal mode (represented as edge shading) from a and b is connected to one individual heralding detector. Furthermore, according to an embodiment, the method uses destructive interference for producing the correct output states, similarly to as shown in FIG. 11. Some of the resulting subgraphs (those have one incoming edge to vertex c-f) do not vanish. Still, they can be reduced in magnitude by the method according to an embodiment by adapting the edge weights appropriately, in an analogous way. According to an embodiment, the method provides an experimentally feasible method of performing CNOT transformations beyond qubits is constructed.

According to an embodiment, a representation of a graph by the method as described herein can refer to a mapping of a state to the graph by the method. Various embodiments of the invention have been described in detail. Since changes in and or additions to the above-described best mode may be made without departing from the nature, spirit or scope of the invention, the invention is not to be limited to those details but only by the appended claims. Section headings herein are provided as organizational cues. These headings shall not limit or characterize the invention set out in the appended claims.

What is claimed is:

1. A method of optimizing a quantum optical configuration using photonic entangled states, the method comprising:
   providing an initial quantum optical configuration for creating a quantum state;
   mapping the initial quantum optical configuration to a weighted graph having a set of independent weights;
   determining a fidelity between a target quantum state and the quantum state of the initial quantum optical configuration using the set of independent weights;
   determining an optimized set of independent weights to minimize loss of fidelity; and
   mapping the optimized set of independent weights to a path identified quantum optical configuration having a quantum state that has maximal fidelity with the target quantum state.

2. The method of claim 1, wherein vertices of the weighted graph correspond to individual paths of a photon.

3. The method of claim 2, wherein an edge between two vertices comprises $d^2$ edges having independent weights, wherein d is the local dimensionality of the photon, and wherein the fidelity between a target quantum state and the quantum state of the initial quantum optical configuration is determined using the function:

$$\text{Fidelity} = |\Sigma_i c_i f_i(\omega)|^2$$

4. The method of claim 1, wherein the target quantum state is determined using the function:

$$|\text{target}\rangle = \Sigma_i c_i |i\rangle.$$

5. The method of claim 1, wherein the step of determining an optimized set of independent weights to minimize loss of fidelity is performed by gradient descent.

6. The method of claim 1, wherein the method of optimizing a quantum optical configuration is computer-implemented.

7. The method of claim 1, further comprising a step of configuring or reconfiguring a light-emitting device to the path identified quantum optical configuration having a quantum state that has maximal fidelity with the target quantum state.

8. The method of claim 1, wherein the target quantum state is a resource-efficient heralded multi-photonic quantum state.

9. The method of claim 1, wherein the target quantum state comprises heralded high-dimensional entanglement.

10. The method of claim 1, wherein the target quantum state is a resource state for a quantum gate.

11. The method of claim 1, wherein the target quantum state is a high-dimensional multi-photonic Greenberger-Horne-Zeilinger (GHZ) state without ancilla photons.

12. A system for optimizing a quantum optical configuration for efficient photonic entanglement sources, the system comprising:
   a light-emitting device having an initial quantum optical configuration for creating a quantum state;
   a computing device comprising a processor and a non-transitory computer-readable memory with instructions thereon which when executed carry out the steps of:
   receiving the initial quantum optical configuration for creating the quantum state;
   mapping the initial quantum optical configuration to a weighted graph having a set of independent weights;
   determining a fidelity between a target quantum state and the quantum state of the initial quantum optical configuration using the set of independent weights;
   determining an optimized set of independent weights to minimize loss of fidelity; and
   mapping the optimized set of independent weights to a path identified quantum optical configuration having a quantum state that has maximal fidelity with the target quantum state;
   wherein the light-emitting device may be reconfigured to use the path identified quantum optical configuration to create a quantum state with maximal fidelity with the target quantum state.

13. The system of claim 12, wherein the light emitting device comprises a laser.

14. The system of claim 13,
   wherein the laser coherently pumps one or more nonlinear crystals, and wherein each nonlinear crystal is associated with a complex weight and is capable of creating a photon pair in an output path and with mode numbers corresponding to its complex weight; and
   wherein the initial quantum optical configuration for creating a quantum state comprises the nonlinear crystals which are each associated with a complex weight and are capable of creating photon pairs corresponding to their associated complex weights.

15. The system of claim 12, wherein the step of determining an optimized set of independent weights to minimize loss of fidelity is performed by gradient descent.

16. The system of claim 12, wherein the light-emitting device is reconfigured by substituting one or more of the nonlinear crystals with a nonlinear crystal with a different complex weight corresponding to the path identified quantum optical configuration.

17. The system of claim 12, wherein the target quantum state is a resource-efficient heralded multi-photonic quantum state.

18. The system of claim 12, wherein the target quantum state comprises heralded high-dimensional entanglement.

19. The system of claim 12, wherein the target quantum state is a resource state for a quantum gate.

20. The system of claim 12, wherein the target quantum state is a high-dimensional multi-photonic Greenberger-Horne-Zeilinger (GHZ) state without ancilla photons.

* * * * *